Feb. 23, 1954
K. C. SHERMAN
2,670,205
PIN SETTING MACHINE FOR BOWLING ALLEYS
Filed May 7, 1947
22 Sheets-Sheet 7
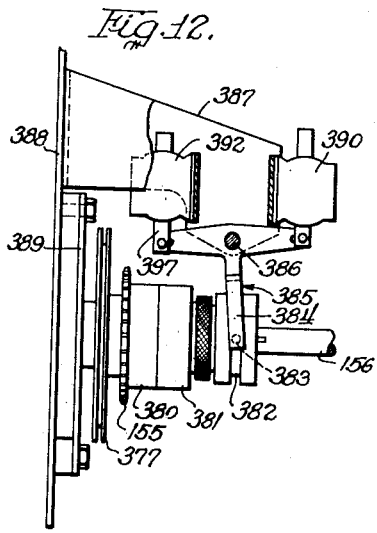
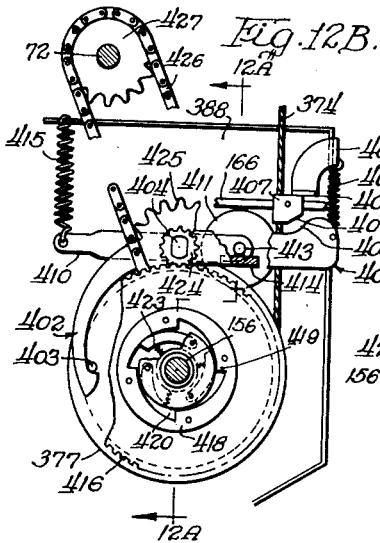
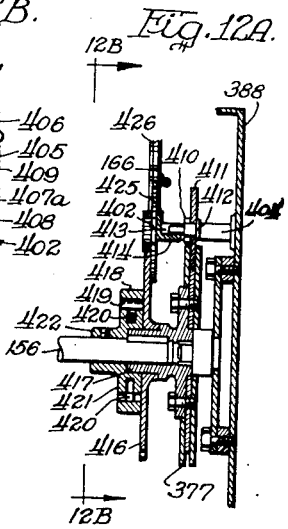
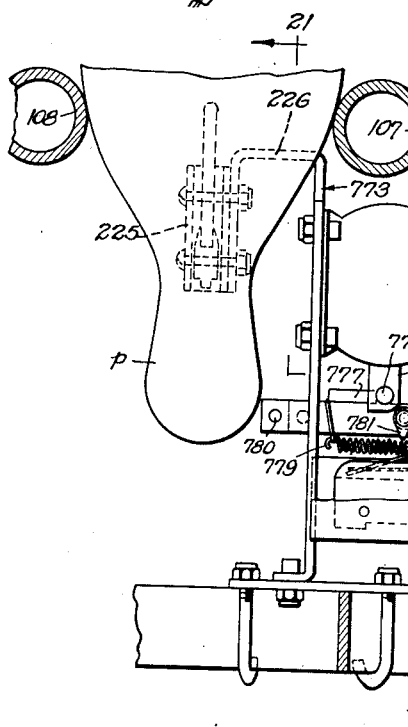
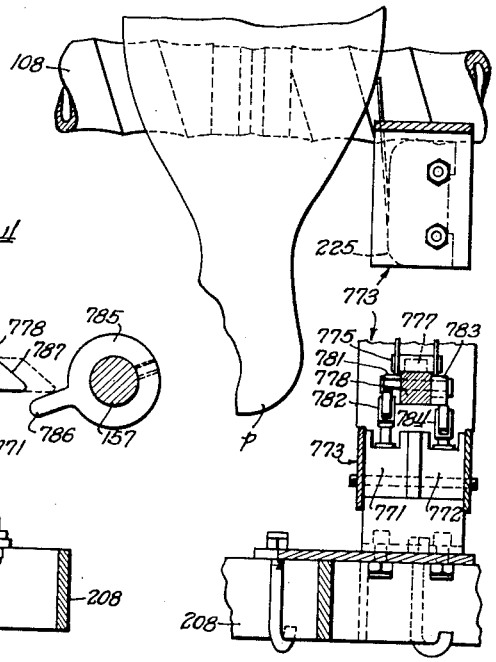
INVENTOR.
Kenneth C. Sherman
BY
Brown, Jackson, Boettcher & Dienner

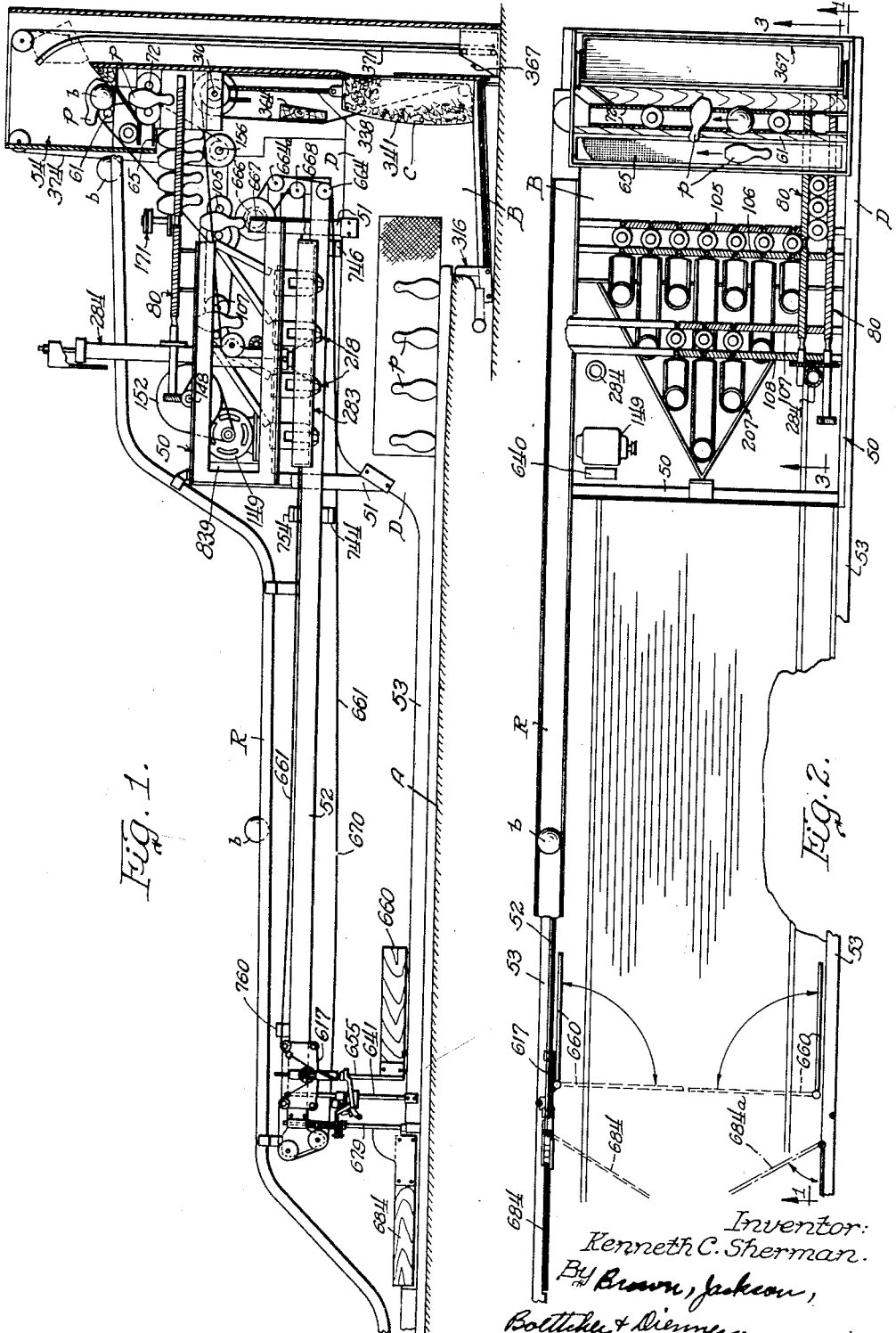

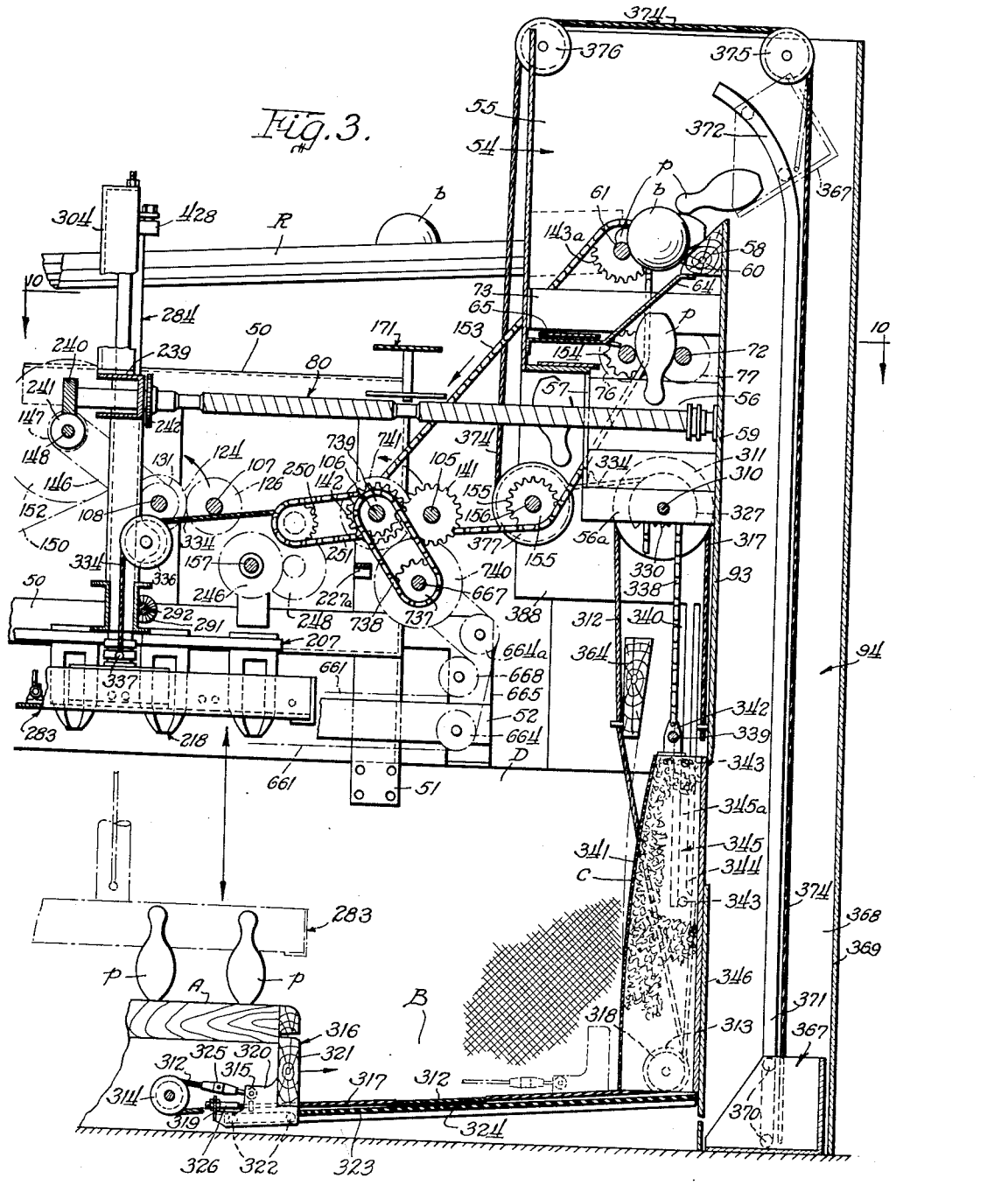

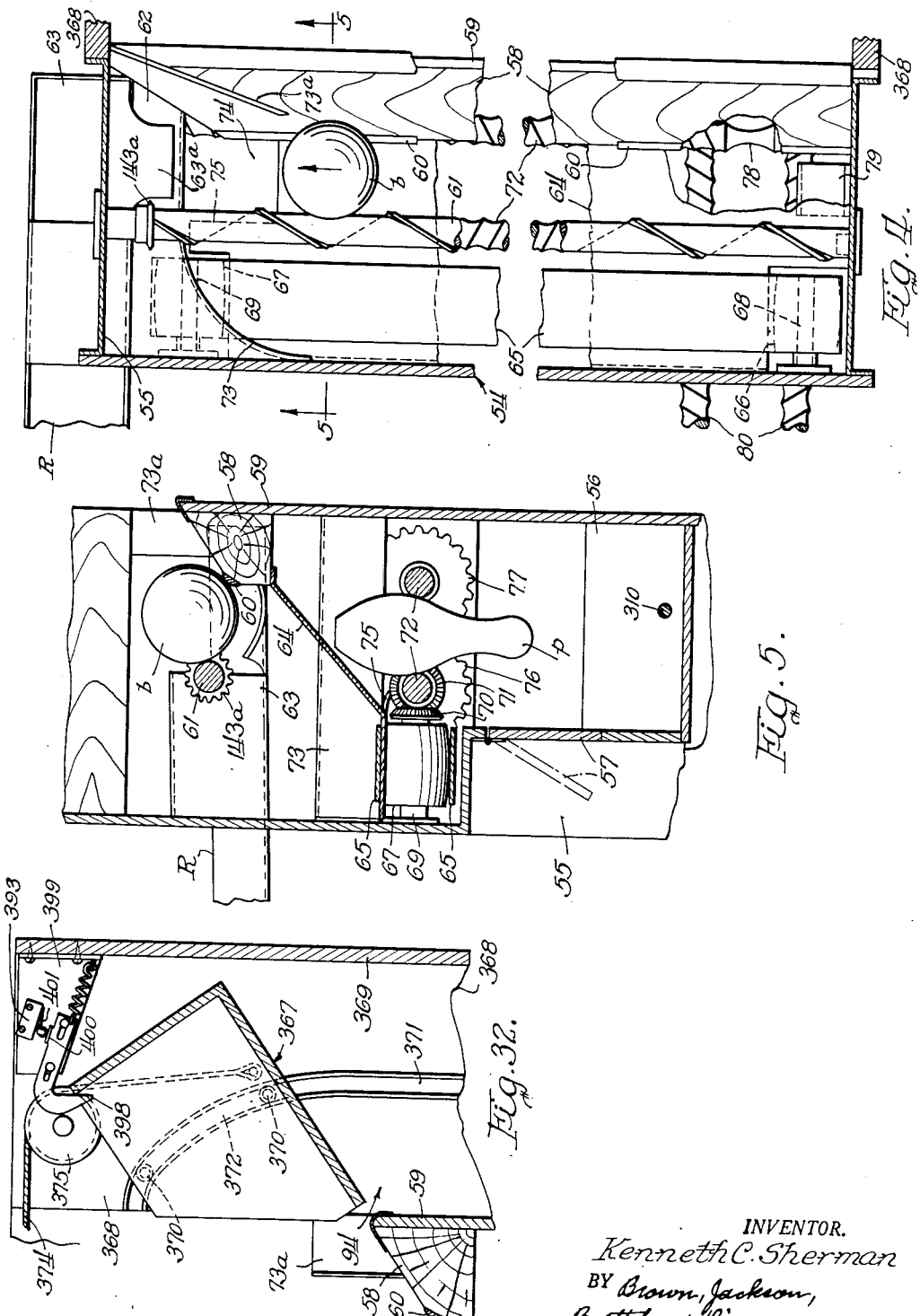

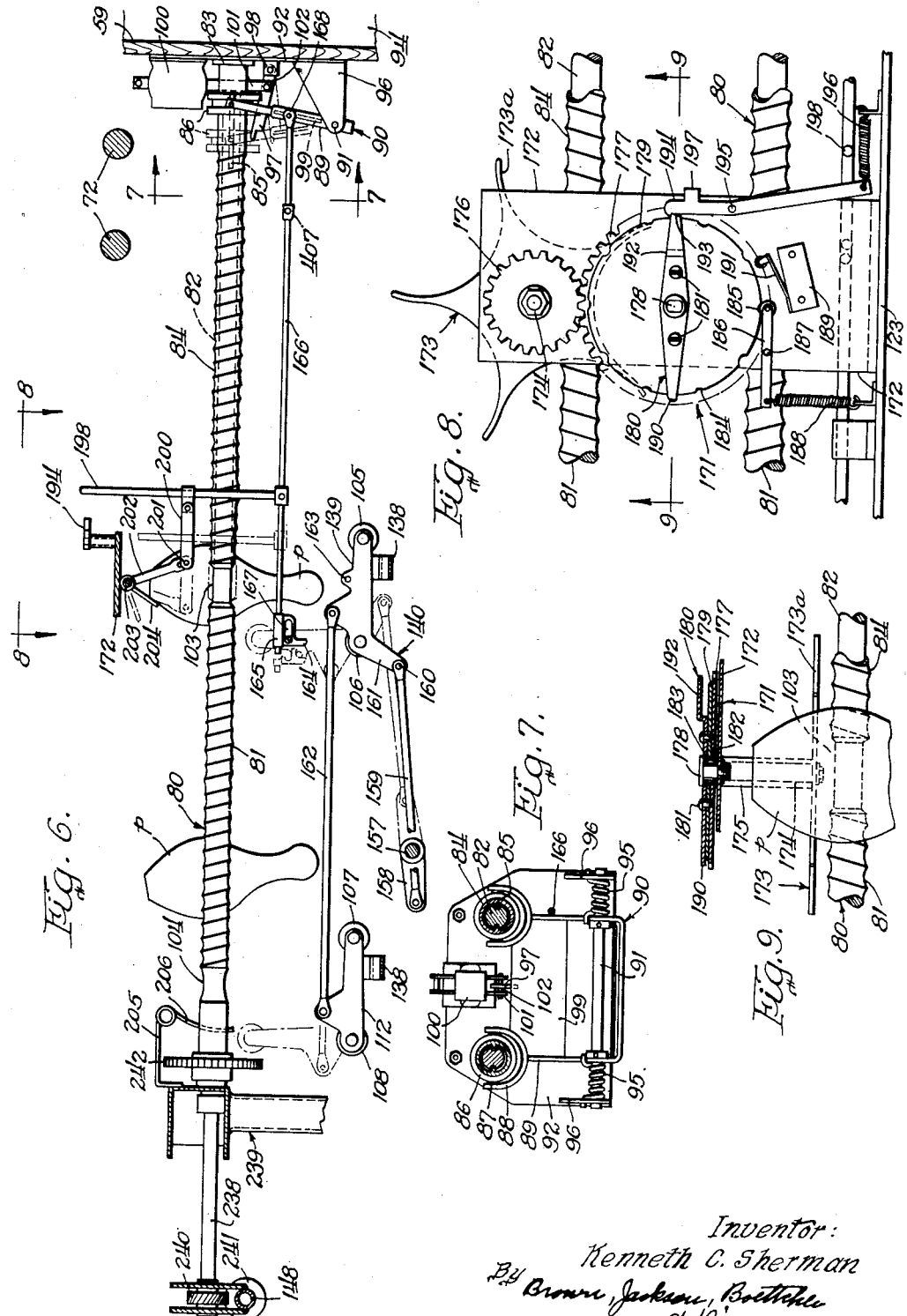

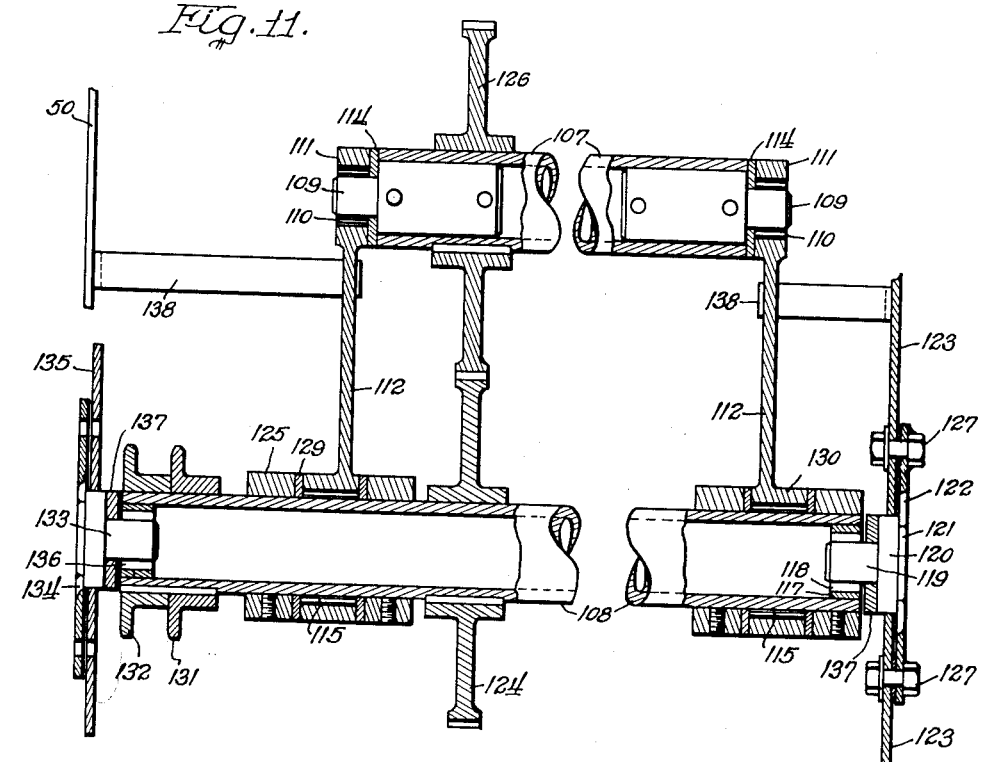
Fig. 11.
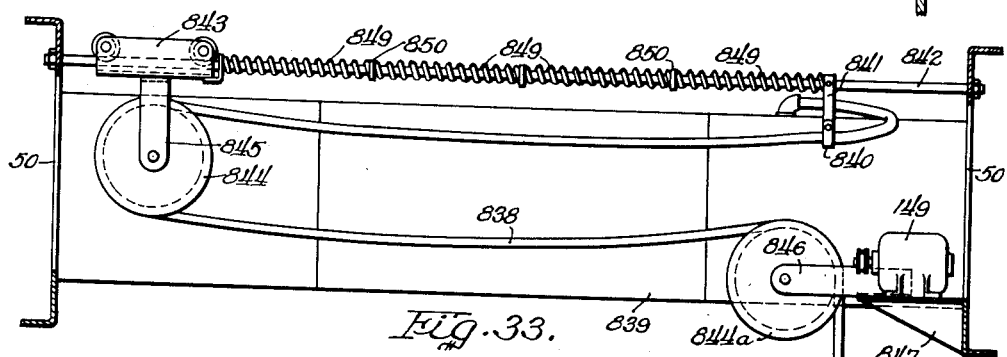
Fig. 33.
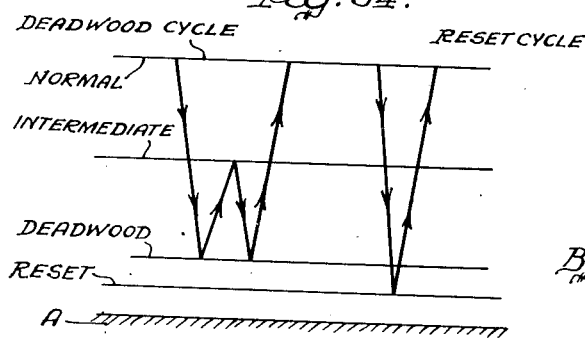
Fig. 34.
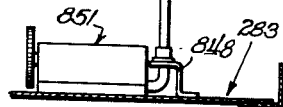
Inventor:
Kenneth C. Sherman.

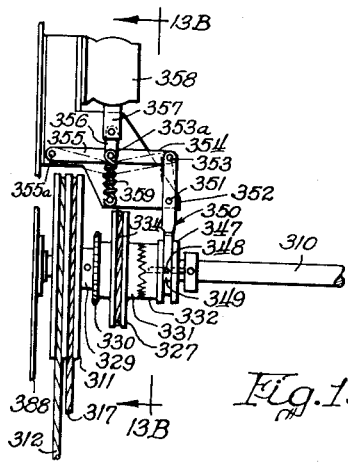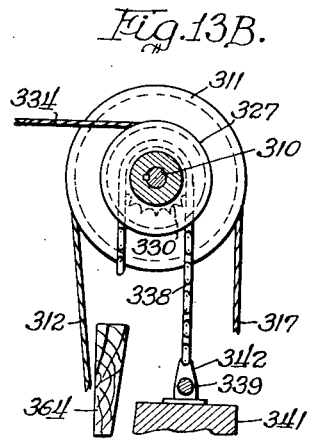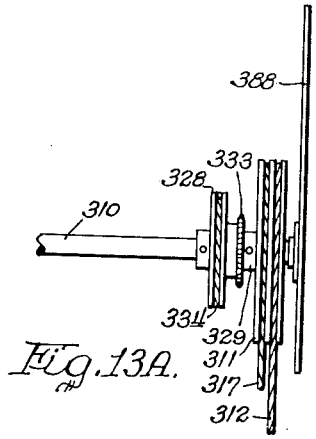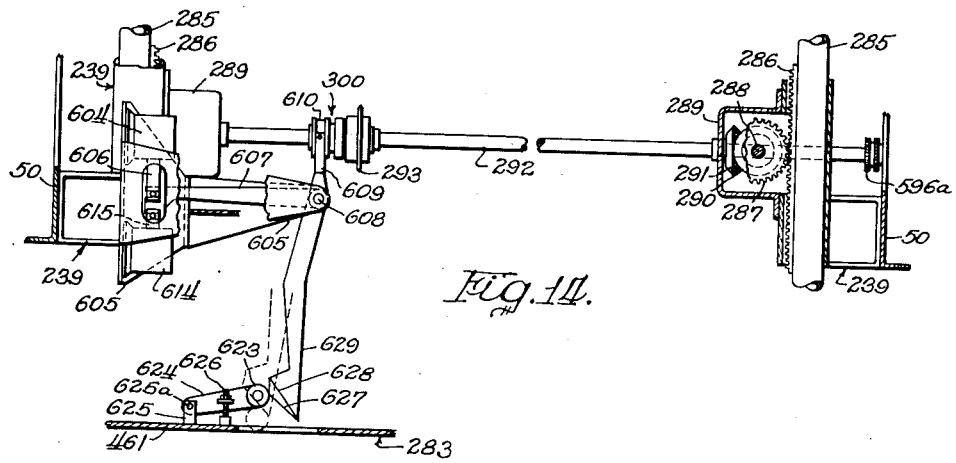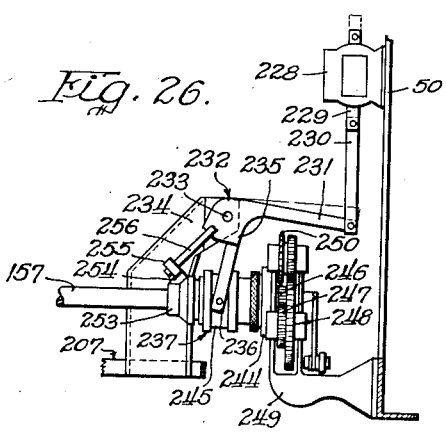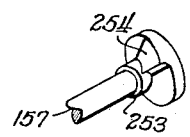

Feb. 23, 1954 — K. C. SHERMAN — 2,670,205
PIN SETTING MACHINE FOR BOWLING ALLEYS
Filed May 7, 1947 — 22 Sheets-Sheet 9
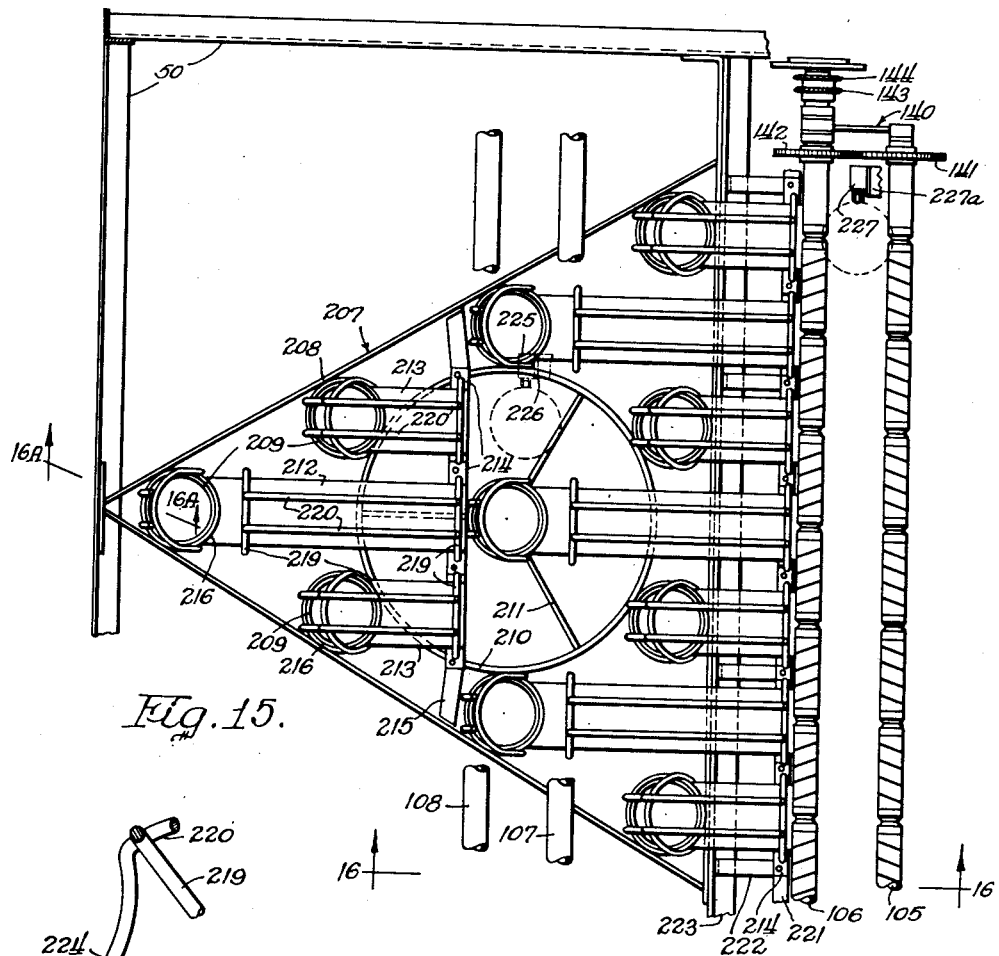
Fig.15.
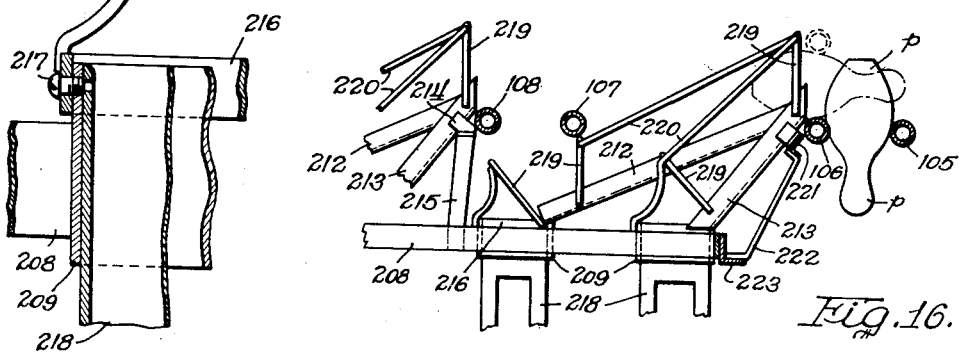
Fig.16A.
Fig.16.
Inventor:
Kenneth C. Sherman.
By Brown, Jackson, Boettcher & Dienner.
Attys.

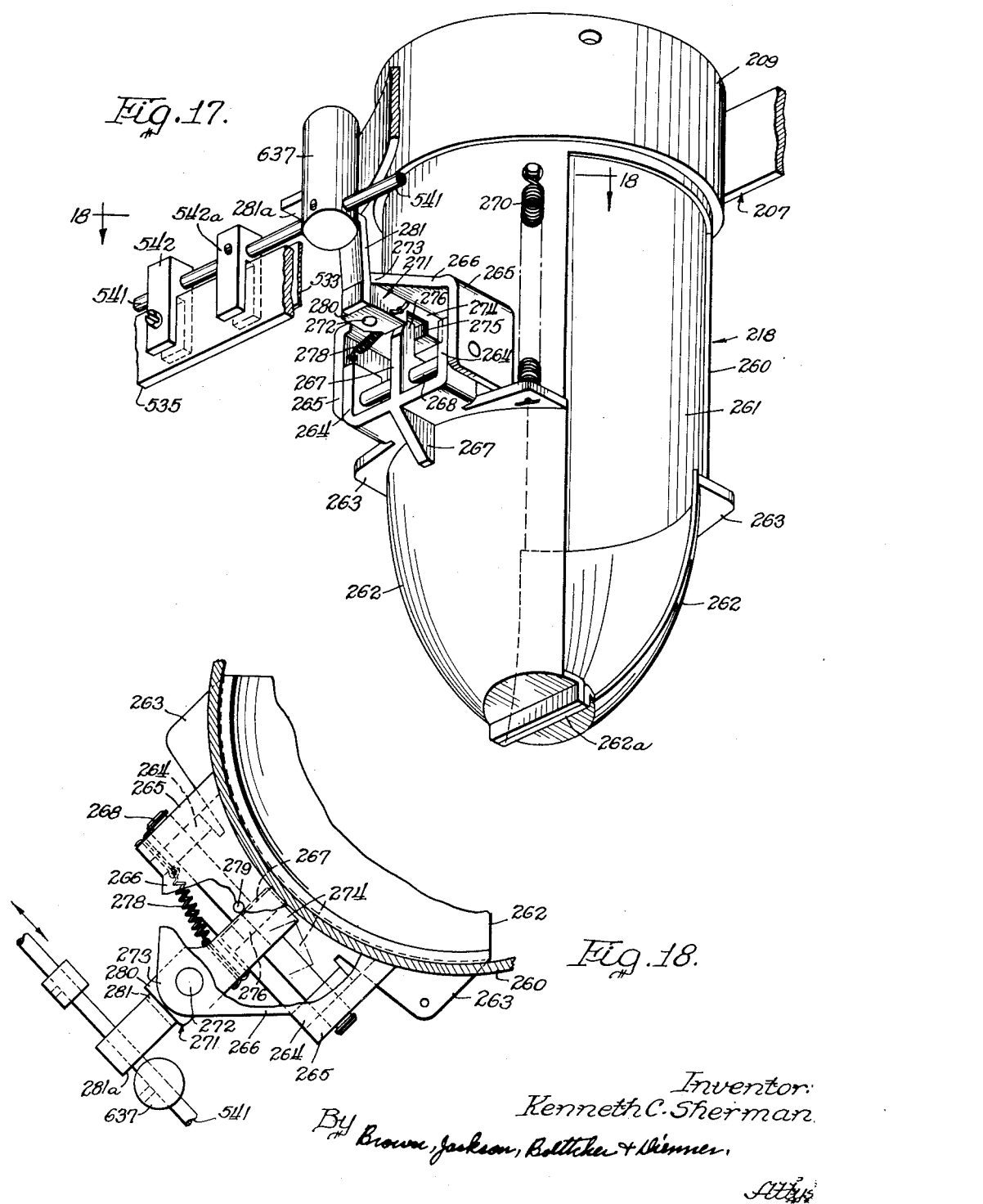

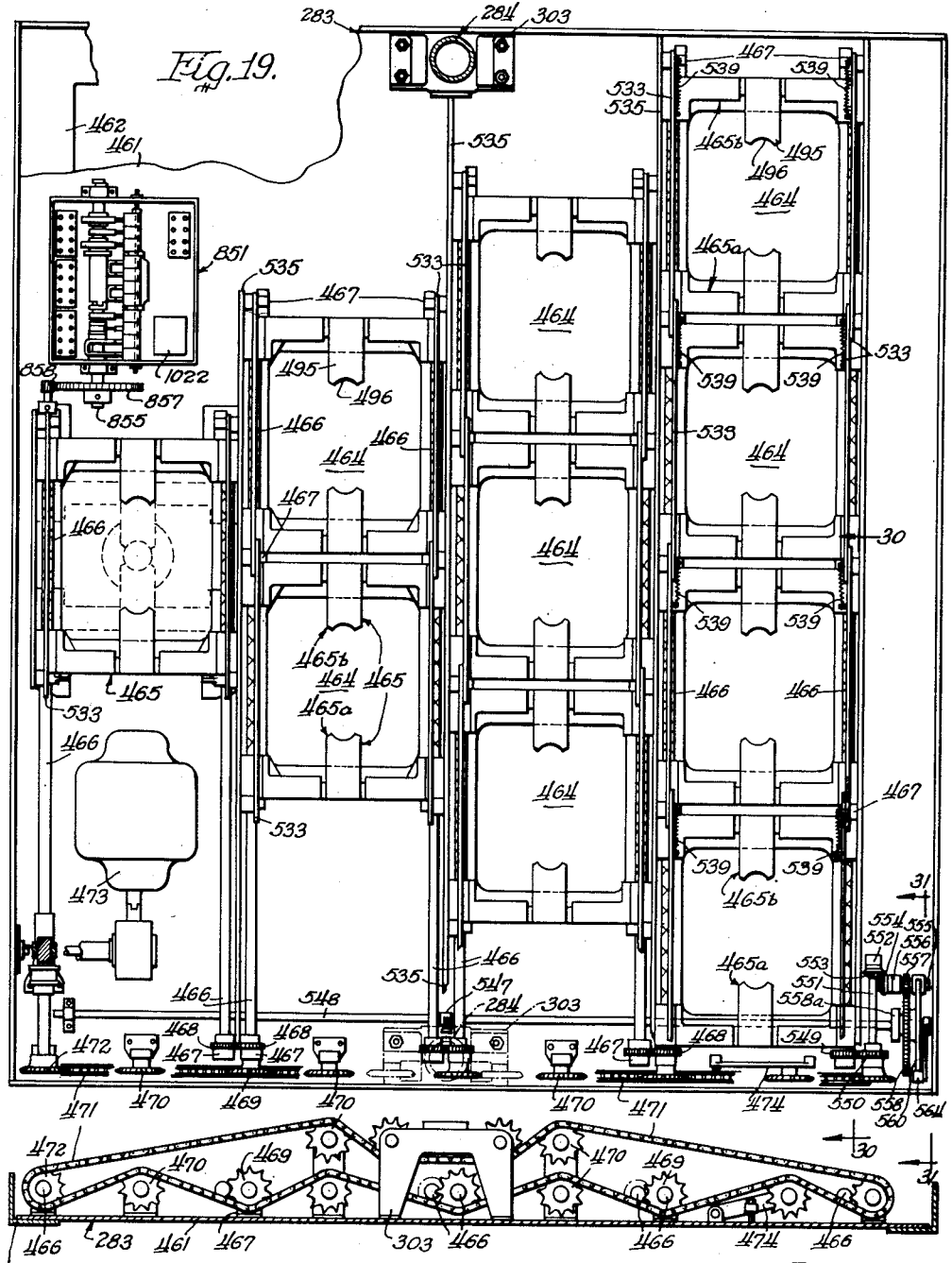

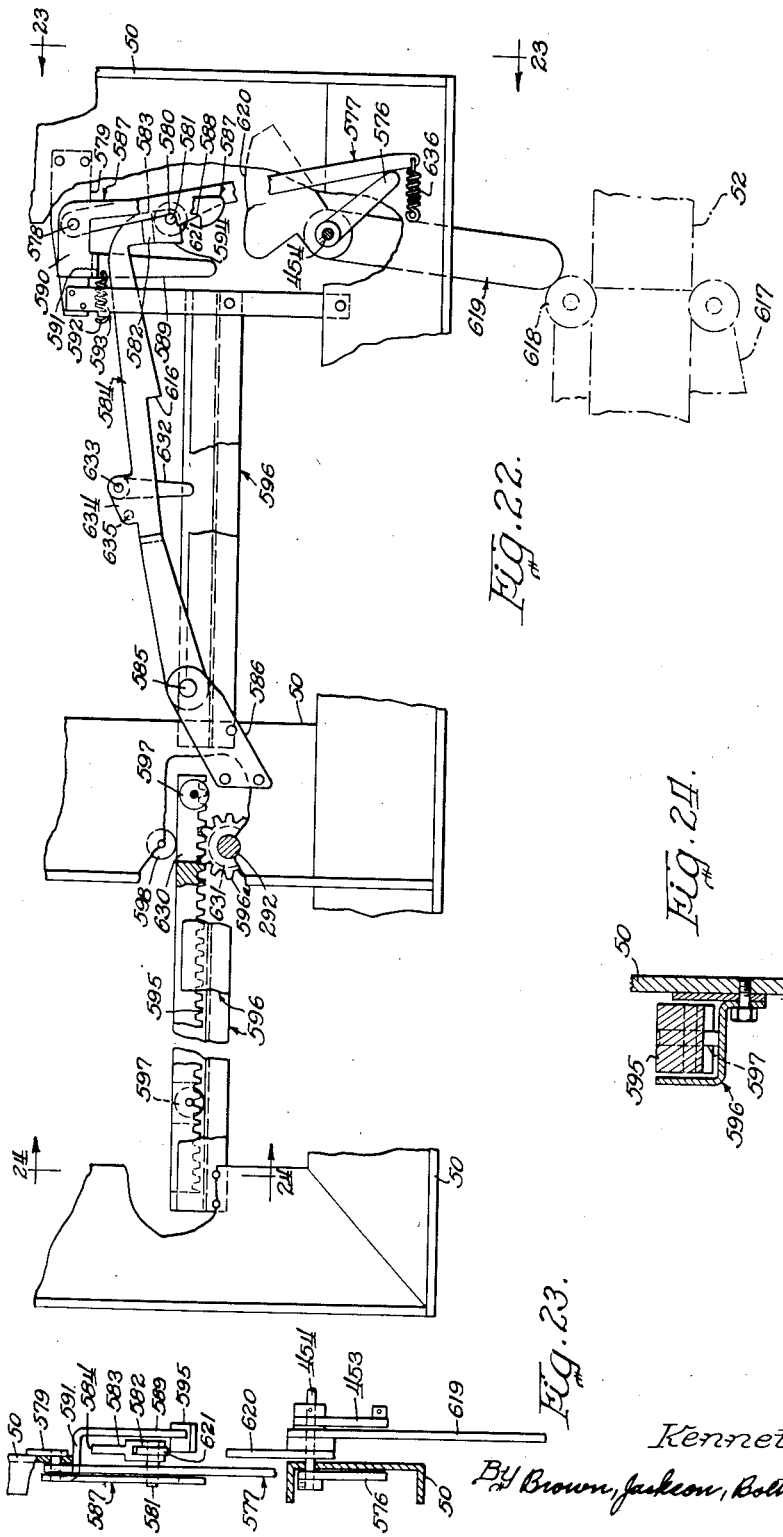

Feb. 23, 1954  K. C. SHERMAN  2,670,205
PIN SETTING MACHINE FOR BOWLING ALLEYS
Filed May 7, 1947  22 Sheets-Sheet 13
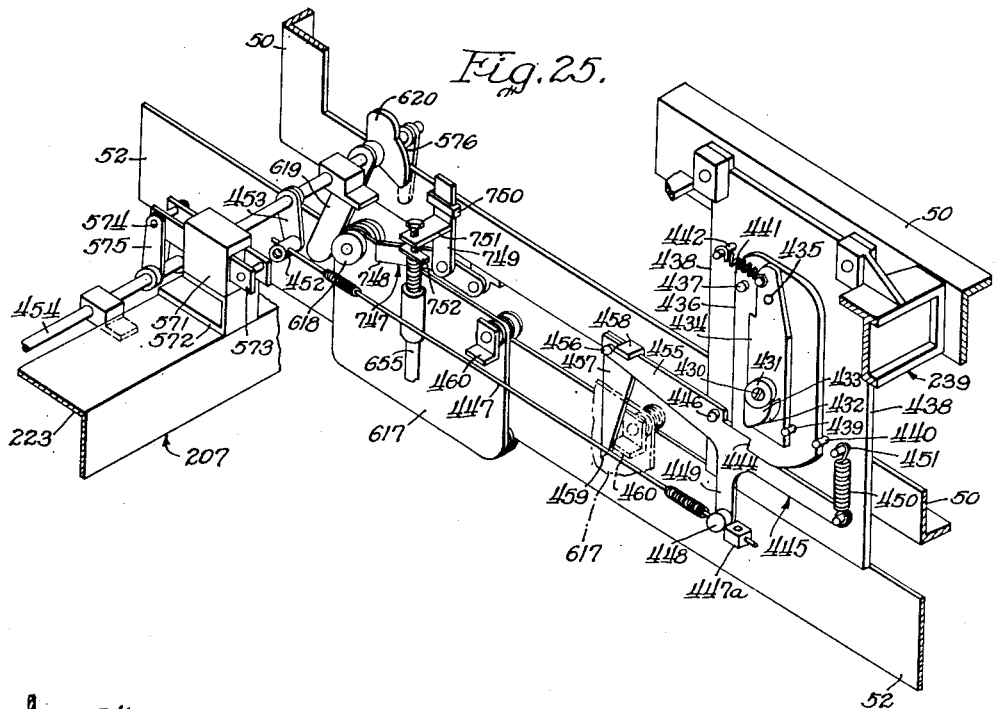
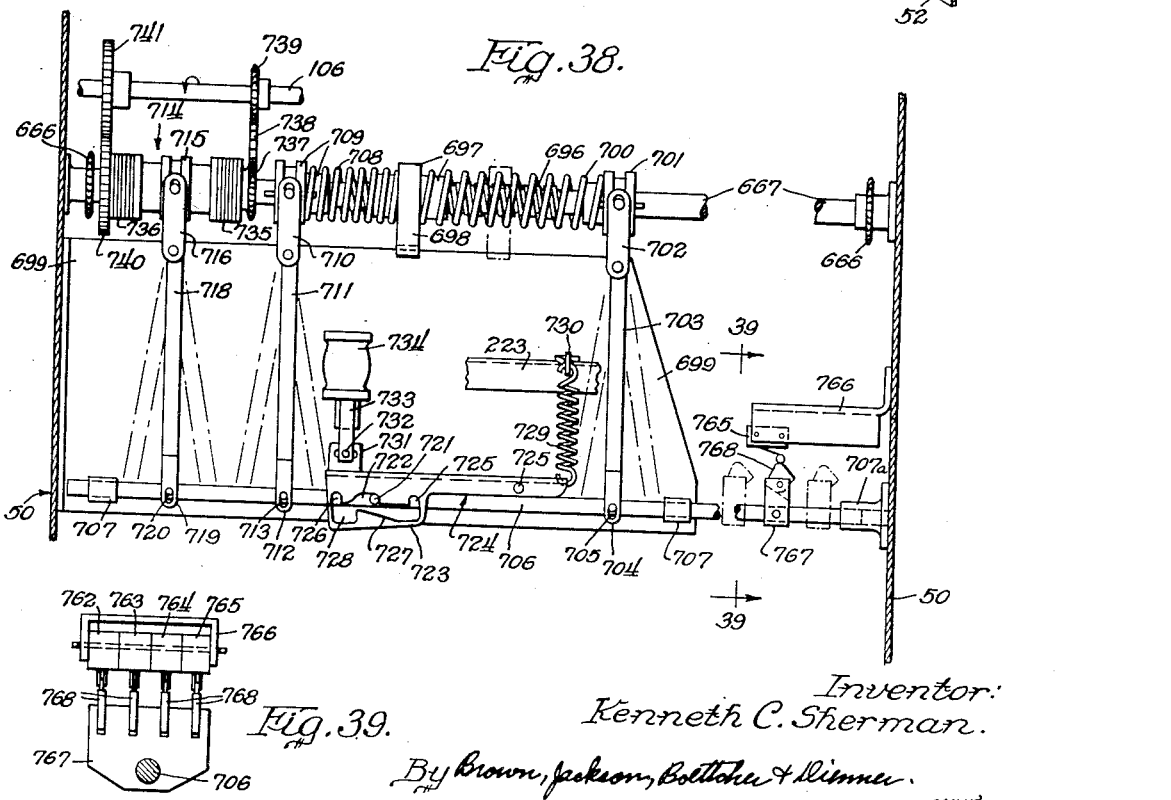
Inventor:
Kenneth C. Sherman.
By Brown, Jackson, Boettcher & Dienner
Attys.

Feb. 23, 1954
K. C. SHERMAN
2,670,205
PIN SETTING MACHINE FOR BOWLING ALLEYS
Filed May 7, 1947
22 Sheets-Sheet 14
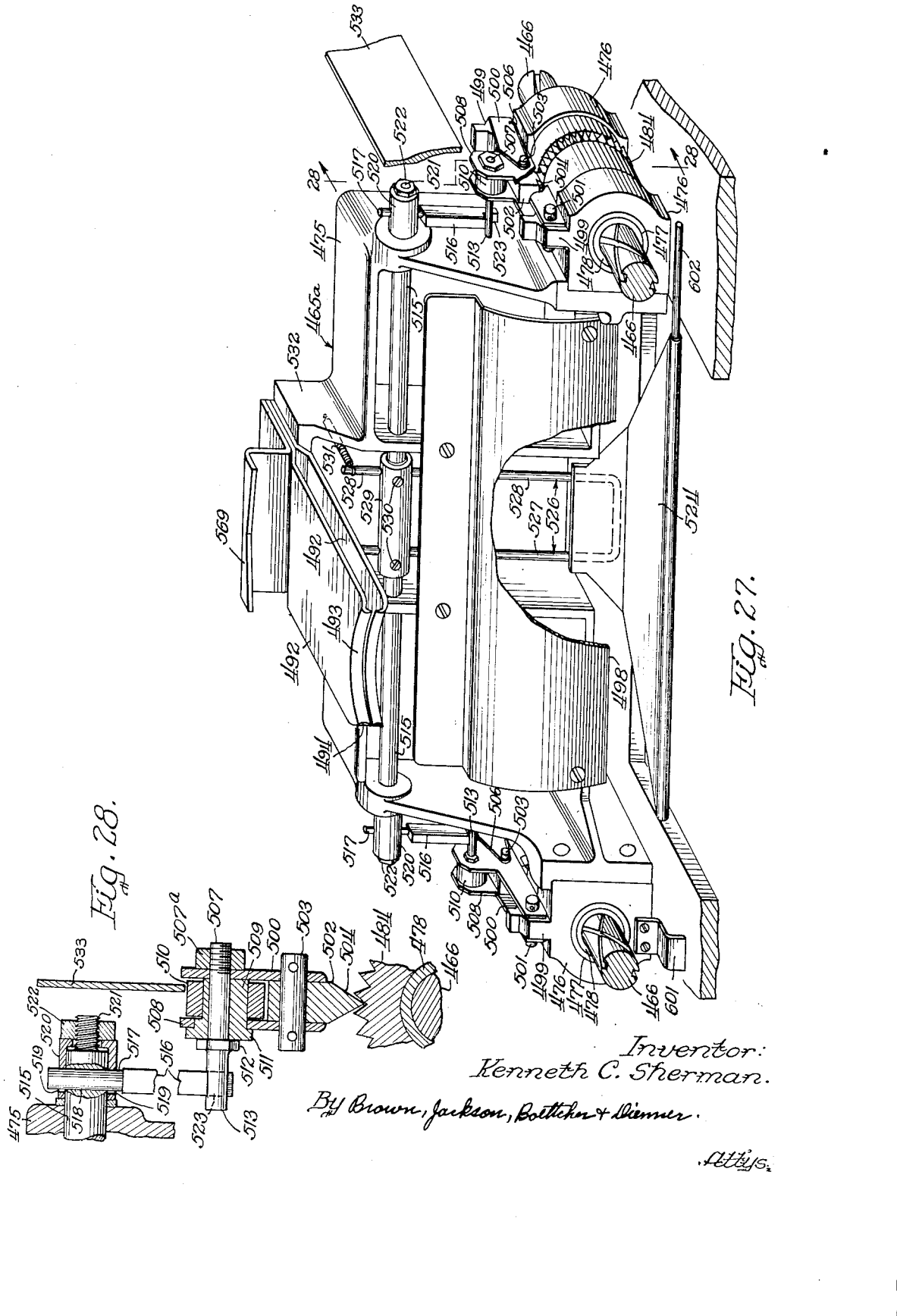
Inventor:
Kenneth C. Sherman.
By Brown, Jackson, Boettcher & Diemer.
Attys.

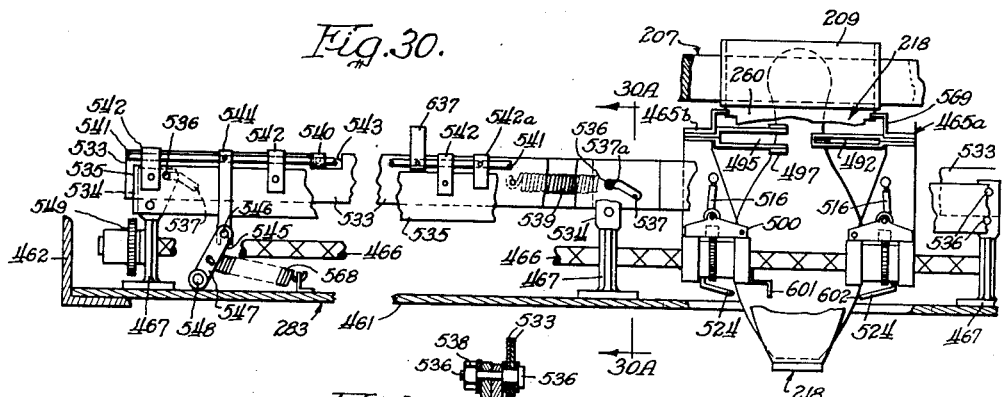

Feb. 23, 1954 K. C. SHERMAN 2,670,205
PIN SETTING MACHINE FOR BOWLING ALLEYS
Filed May 7, 1947 22 Sheets-Sheet 16
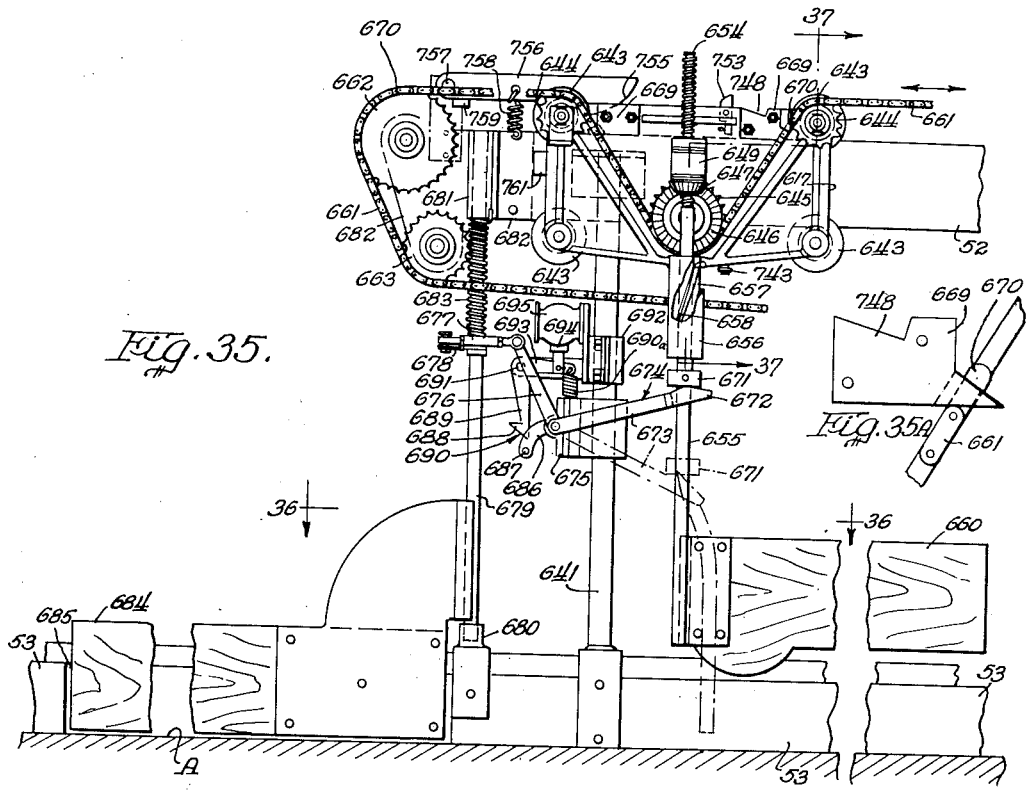
Fig. 35.
Fig. 35A.
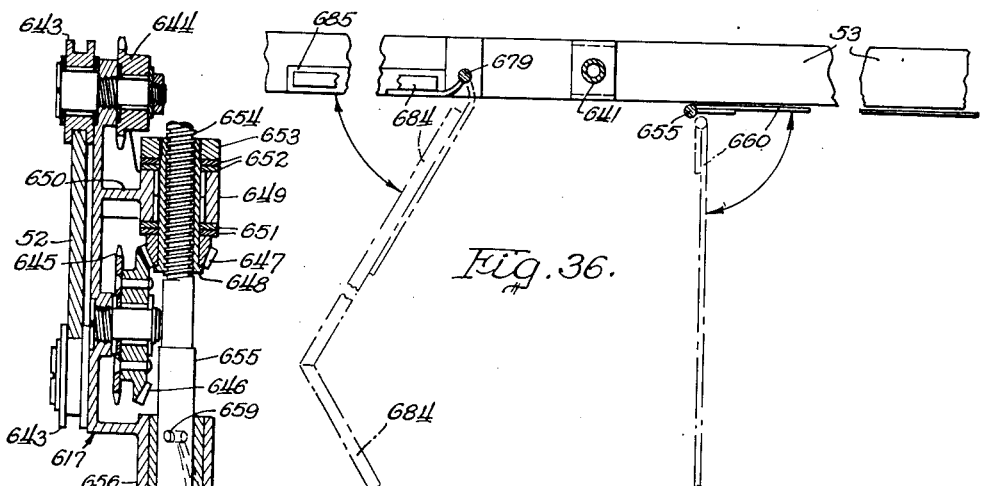
Fig. 36.
Fig. 37.
Inventor:
Kenneth C. Sherman.
By Brown, Jackson, Boettcher + Dienner.
Attys.

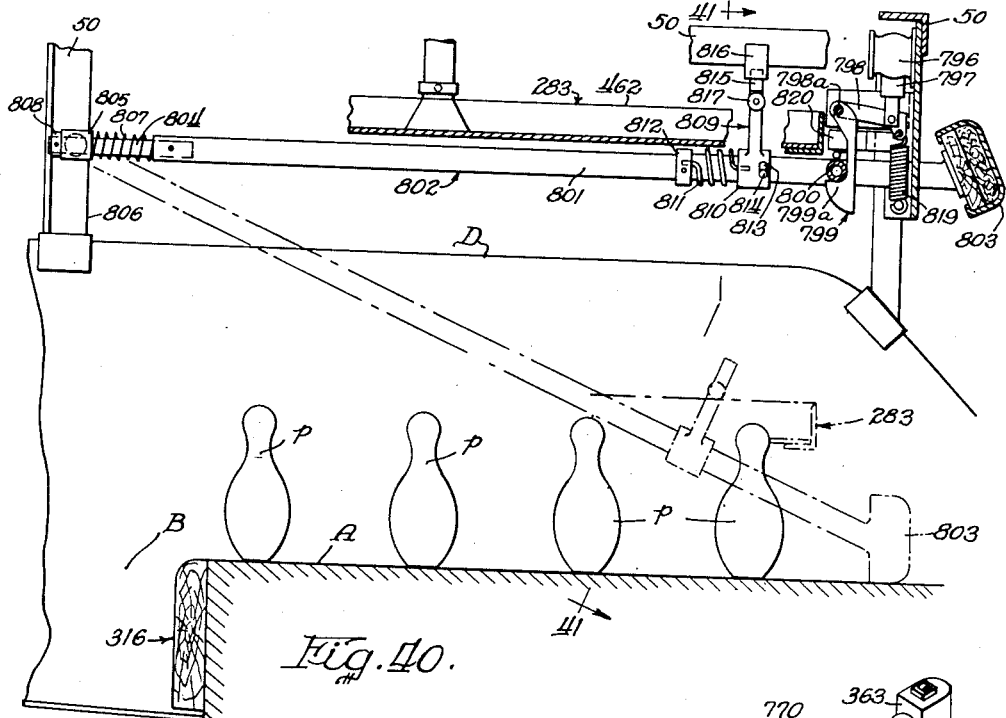
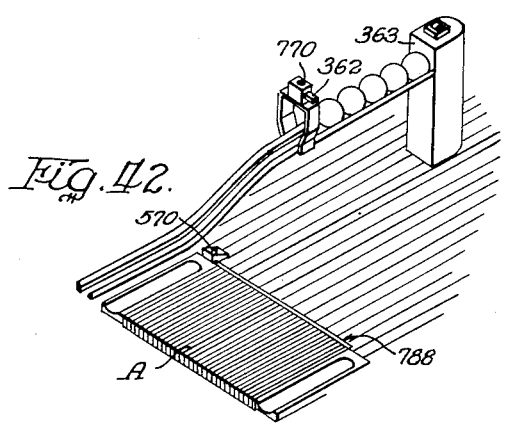
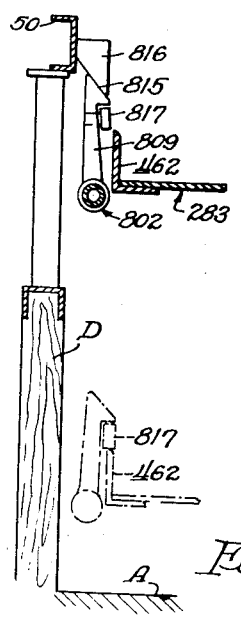
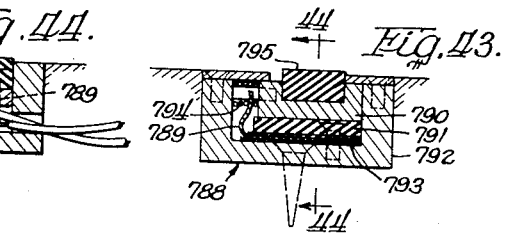

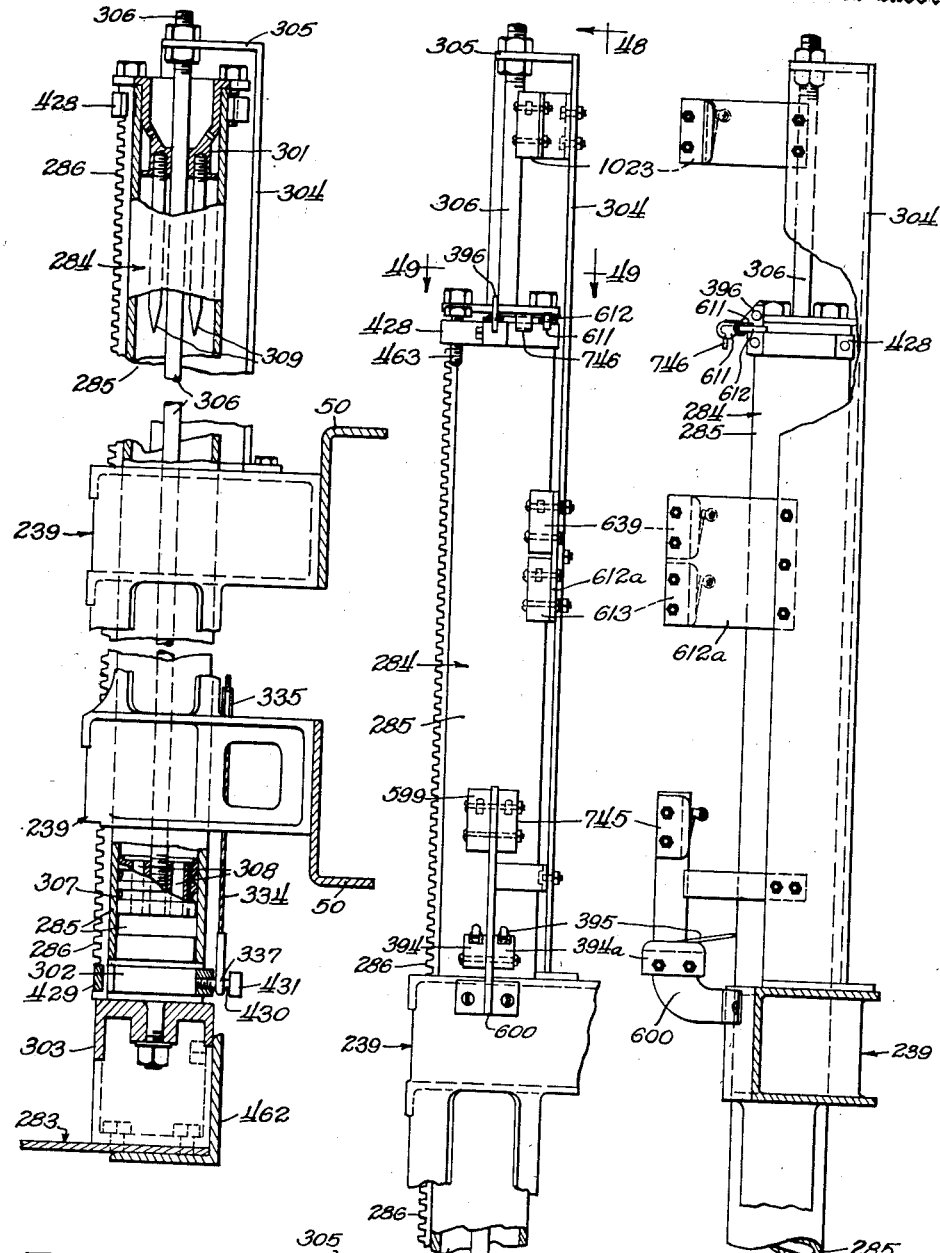

Feb. 23, 1954  K. C. SHERMAN  2,670,205
PIN SETTING MACHINE FOR BOWLING ALLEYS
Filed May 7, 1947  22 Sheets-Sheet 19

Inventor
Kenneth C. Sherman.
By Brown, Jackson, Boettcher & Dienner
Attys.

Inventor:
Kenneth C. Sherman
By Brown, Jackson, Boettcher & Dienner
Attys.

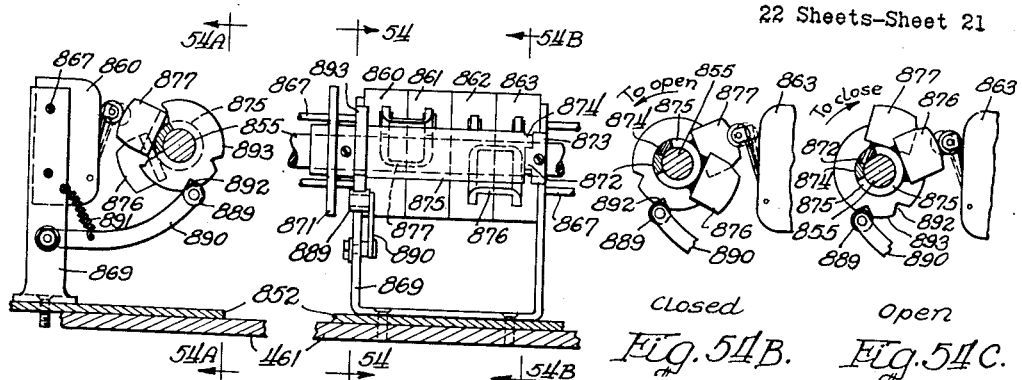

Feb. 23, 1954 K. C. SHERMAN 2,670,205
PIN SETTING MACHINE FOR BOWLING ALLEYS
Filed May 7, 1947 22 Sheets-Sheet 22

Inventor:
Kenneth C. Sherman.
By Brown, Jackson, Boettcher & Dienner.
Attys.

Patented Feb. 23, 1954

2,670,205

UNITED STATES PATENT OFFICE 2,670,205

PIN SETTING MACHINE FOR BOWLING ALLEYS

Kenneth C. Sherman, New London, Conn., assignor to Electric Boat Company, Groton, Conn., a corporation of New Jersey Application May 7, 1947, Serial No. 746,596

16 Claims. (Cl. 273—43)

This invention relates to machines for use in bowling alleys, for setting pins, such as duckpins and tenpins, and for analogous purposes.

Numerous attempts have been made to produce pin setting machines but, so far as I am aware, no one heretofore has produced a satisfactory pin setting machine. In general, the known pin setting machines are excessively heavy and cumbersome, quite complicated, and slow and noisy in operation.

My invention is directed to the provision of a pin setting machine which avoids the above noted objections to the known machines referred to, is of comparatively light weight, of simple and comparatively inexpensive construction, and is quiet and rapid in operation. The machine is provided with a pin setting table, operated under suitable controls, for setting pins on the pin area of the alley, in what is termed the setting up operation, and for removing standing pins from the alley and replacing such pins on the alley in what is termed the dead wood operation; as hereinafter explained. The pin setting table receives the pins from a pin receiving table. The pin receiving table is provided with pin receiving members or buckets arranged in the same manner as a set of pins on the alley, for delivery of the pins to the pin setting table. It is an object of my invention to provide means whereby the pins of a complete set, ten in number, are delivered simultaneously to the buckets of the pin receiving table thereby effecting a substantial saving in time as compared to machines in which the pins are delivered successively to the buckets of the pin receiving table. The pin delivery means comprises means normally disposed in pin receiving position and adapted to arrange the pins received thereby in spaced relation corresponding to the spacing of the pin receiving buckets on the receiving table. More specifically, the pin delivery means comprises parallel distributor rolls which receive the pins between them and are provided with interrupted helical threads effective for moving the pins along the rolls and spacing them therealong as stated. The distributor rolls normally are disposed substantially horizontally for reception between them of the pins. When a complete set of pins has been delivered to and distributed along the rolls, the latter are swung from their normal pin receiving position to pin dumping position, by power means actuated by an end pin on the rolls. The pins are then discharged from the rolls into chutes leading to the pin receiving buckets on the receiving table, after which the distributor rolls are returned to normal position. Preferably, there are two sets or pairs of distributor rolls and both thereof are simultaneously swung from their normal pin receiving position to dumping position, and vice versa. The pins are supplied to the distributor rolls by means of feed shafts and associated gate means effective for delivering the required number of pins to one pair of distributor rolls and thereafter delivering the required number of pins to the other pair of distributor rolls, the operation of the feed shafts and gate means being controlled by the pins and by swinging of the distributor shafts from normal position to dumping position and vice versa. Further objects and advantages of my invention will appear from the detailed description.

In the drawings:

Figure 1 is a vertical sectional view of a pin setting machine embodying my invention applied to a bowling alley, this view being semi-diagrammatic and taken substantially on line 1—1 of Figure 2;

Figure 2 is a plan view of the pin setting machine and the adjacent portion of the bowling alley, shown in Figure 1, also semi-diagrammatic and with certain parts broken away and certain other parts omitted, for clearness of illustration;

Figure 3 is a sectional view, on an enlarged scale, taken substantially on line 3—3 of Figure 2, certain parts being omitted and certain other parts being broken away, for clearness of illustration;

Figure 4 is a plan view, on an enlarged scale, of the pin and ball receiving hopper and associated parts, with certain parts broken away;

Figure 5 is a sectional view taken substantially on line 5—5 of Figure 4;

Figure 6 is a side view, on a somewhat enlarged scale, of the forward feed roll units and associated parts, as seen from the right hand side of the machine as viewed from in front;

Figure 7 is a sectional view taken substantially on line 7—7 of Figure 6;

Figure 8 is a plan view, on an enlarged scale, of the pin gate mechanism and associated parts, taken substantially on line 8—8 of Figure 6;

Figure 9 is a sectional view taken substantially on line 9—9 of Figure 8, certain parts being shown in elevation;

Figure 11 is a detail view, on an enlarged scale, partly in plan and partly in horizontal section, of the forward pair of distributor rolls and the mounting means therefor, and associated parts;

Figure 12 is an elevational view, as seen from the rear of the machine, of the pit elevator operating shaft and associated parts adjacent one side of the machine, this view showing the clutch and the actuating and control means therefor for throwing this shaft into and out of operation;

Figure 12A is a sectional view taken substantially on line 12A—12A of Figure 12B, certain parts being shown in elevation;

Figure 12B is an inner face view of the pit elevator operating shaft and the means controlling the rate of rotation thereof in the lowering of the pit elevator and associated parts, located at the opposite side of the machine from the parts shown in Figure 12, taken substantially on line 12B—12B of Figure 12A;

Figure 13 is a front elevational view of the pusher operating shaft and the clutch and control means therefor and associated parts, at the left side, as viewed from in front, of the machine;

Figure 13A is a front elevational view of the pusher operating shaft and associated parts at the right side, as viewed from in front, of the machine;

Figure 13B is an inner face view of the pulleys on the pusher operating shaft, shown in Figure 13, and associated parts, as viewed substantially in the plane of line 13B—13B of Figure 13, this view showing also the cushion, fragmentarily, and its connection to the sprocket wheel on the shaft, and the cushion guide member;

Figure 10:
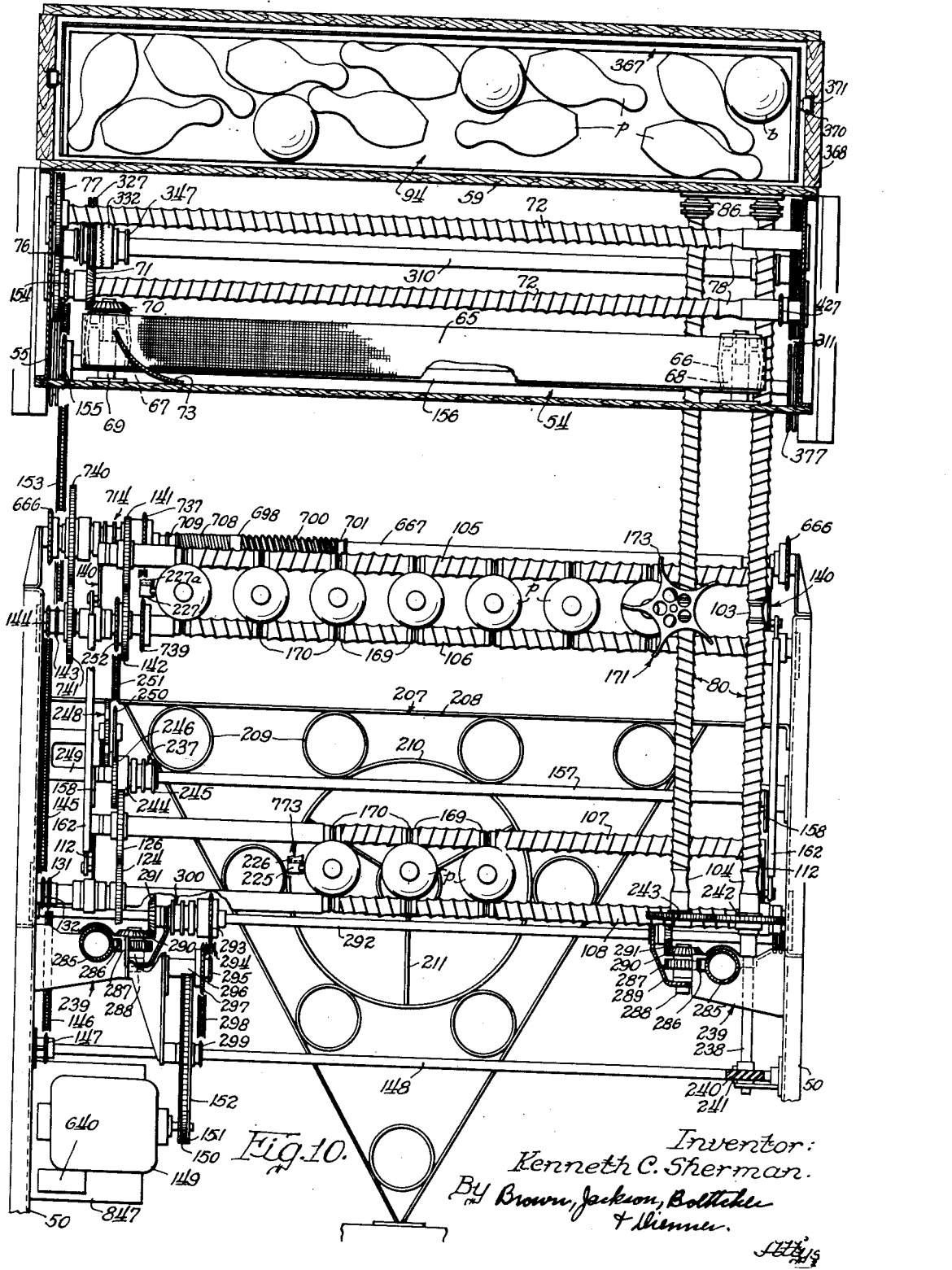
Figure 10 is a sectional view taken substantially on line 10—10 of Figure 3, certain parts being broken away and certain other parts being shown in plan, for clearness of illustration.
Figure 50:
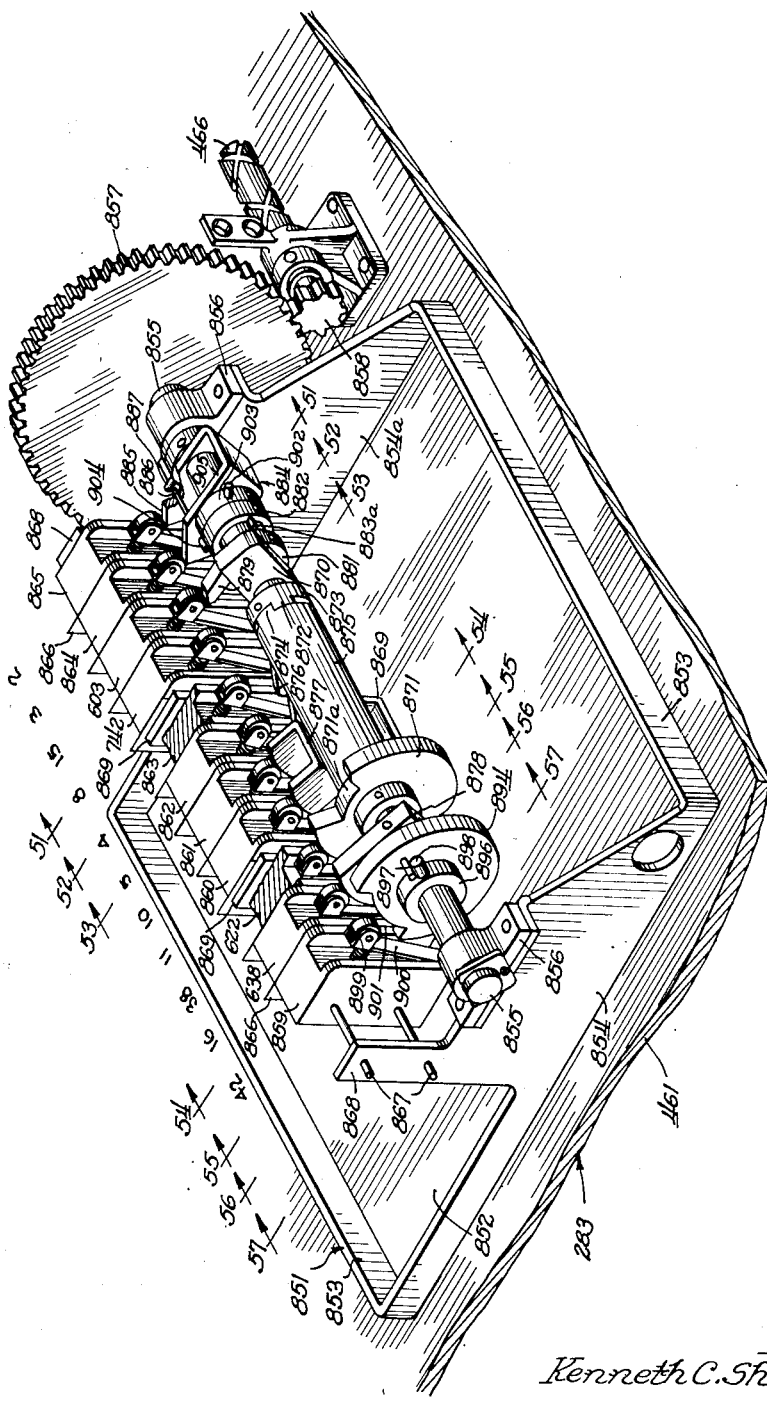
Figures 53, 53A:
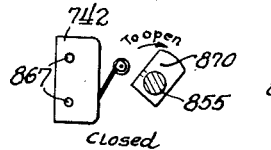
Figures 56, 56A:
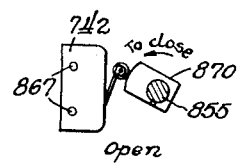
Figure 57:
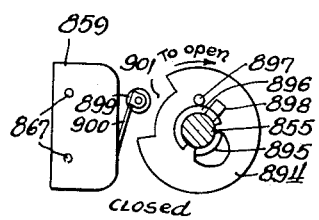
Figure 57A:
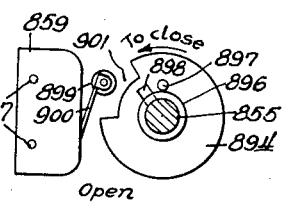
Figure 57B:
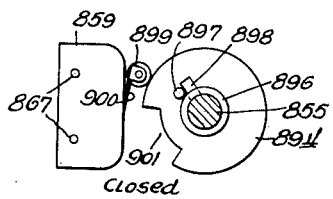
Figure 58A:
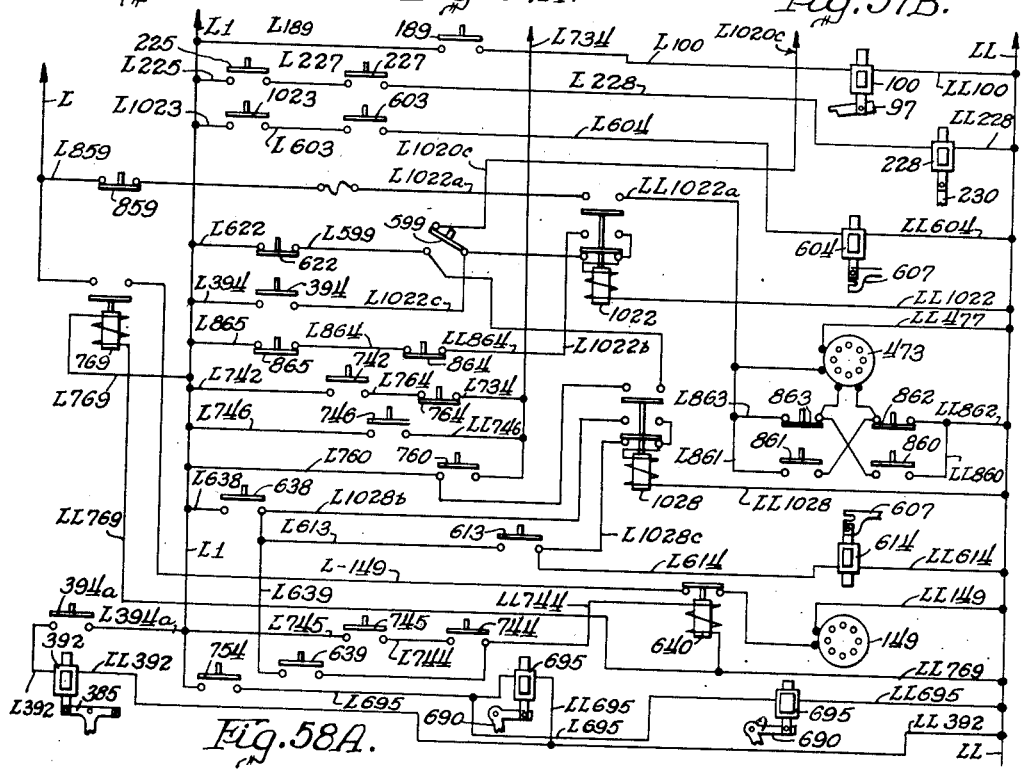
Figure 59:
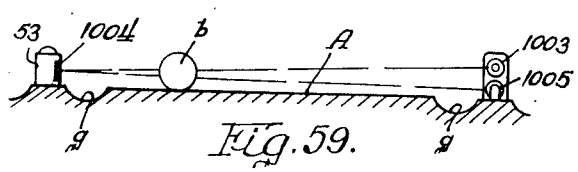
Figure 58:
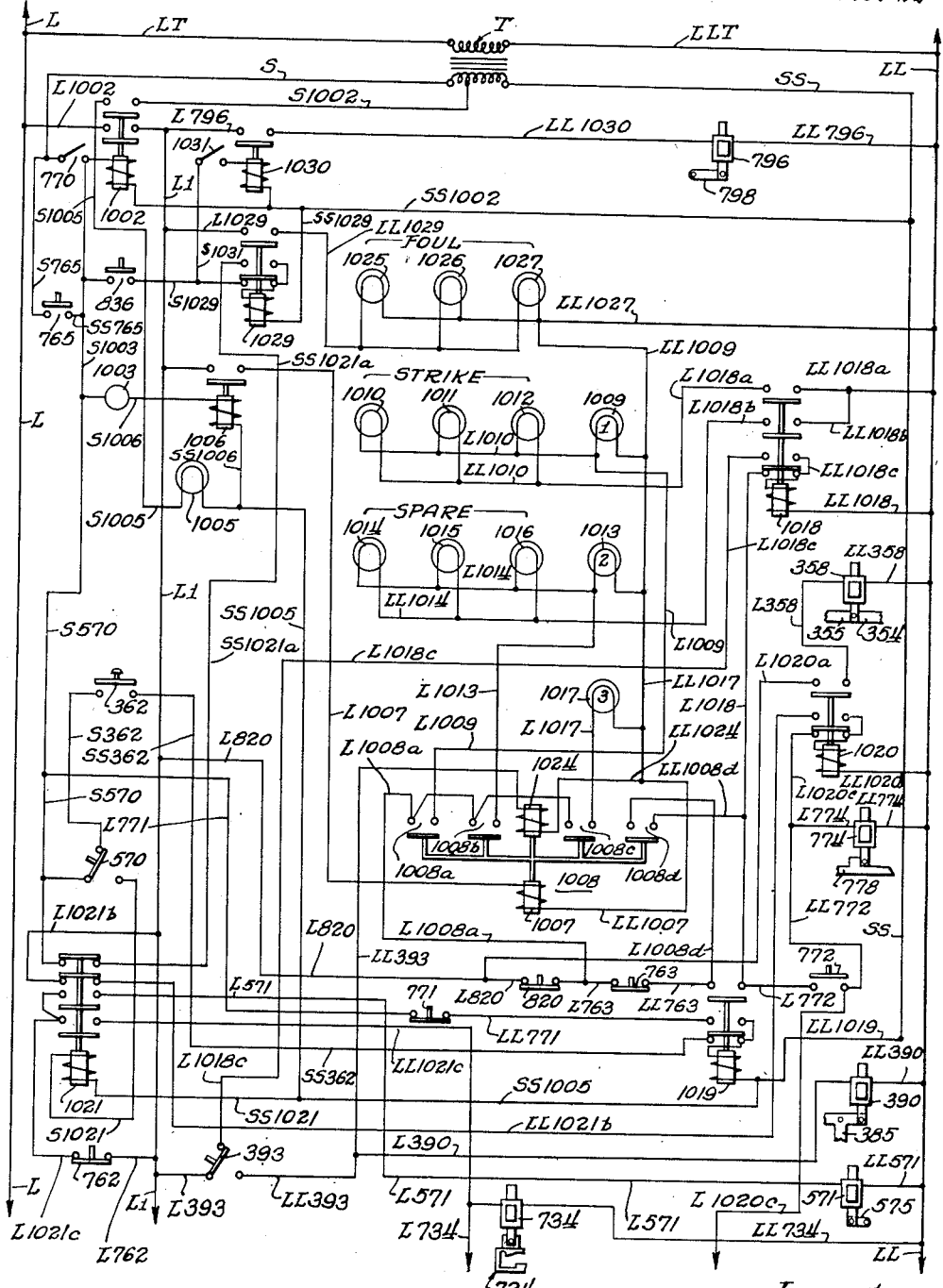

Figure 14 is a front elevational view of the operating shaft and the clutch and control means therefor, for raising the pin setting table, this view also showing fragmentarily the hydraulic dashpots for controlling the rate of lowering of the table, portions of the main frame of the machine adjacent the dashpots and the table and means thereon for throwing out the clutch when the table reaches fully raised position;

Figure 15 is a plan view of the pin receiving table and the pin distributor shafts and associated parts, the main frame of the machine being shown fragmentarily;

Figure 16 is a fragmentary side view of the pin receiving table and associated parts, taken substantially on line 16—16 of Figure 15;

Figure 16A is a fragmentary vertical sectional view, on an enlarged scale, taken substantially on line 16A—16A of Figure 15, of one of the rings of the pin receiving table and a bucket mounted therein and associated parts;

Figure 17 is an isometric side view, on an enlarged scale, of one of the pin buckets and associated parts, certain parts being broken away and shown in section, for clearness of illustration;

Figure 18 is a fragmentary sectional view of the bucket of Figure 17, taken substantially on line 18—18 of the latter figure, with certain parts broken away for clearness of illustration;

Figure 19 is a plan view, on an enlarged scale, of the pin setting table and associated parts, certain parts being omitted for clearness of illustration and certain parts being broken away, with certain other parts shown in section;

Figure 19A is a vertical sectional view of the pin setting table of Figure 19, taken along a line at the inner face of and parallel with the flange at the right side of the table, as viewed from in front, and looking toward the left side thereof, certain parts being omitted for clearness of illustration;

Figure 20 is a fragmentary vertical sectional view, on an enlarged scale, taken adjacent the right side of the machine, as viewed from in front, showing in cross section the front pair of distributor rolls and the one revolution shaft for swinging the pairs of distributor rolls to dumping position, this view also showing in elevation the interlock means for preventing closing of the pin gripper members of the pin setting table until after a set of pins has been delivered to the pin receiving table, and associated parts;

Figure 21 is a sectional view taken substantially on line 21—21 of Figure 20;

Figure 22 is a side view, taken from the right side of the machine, as viewed from in front, with certain parts broken away, of the rack bar and pawls and trip members and associated parts for controlling operation of the pin setting table in the deadwood operation;

Figure 23 is a rear view of the mechanism of Figure 22 taken substantially on line 23—23 of Figure 22;

Figure 24 is a sectional view taken substantially on line 24—24 of Figure 22;

Figure 25 is a fragmentary isometric view, looking toward the alley pit, with certain parts broken away and in section, of the means for releasing the pin setting table for lowering thereof, and associated parts;

Figure 26 is a fragmentary transverse vertical sectional view taken adjacent the left side of the machine, as viewed from in front, and in back of the one revolution shaft for swinging the pairs of pin distributor rolls into dumping position, showing that shaft and the clutch operating and control means therefor and associated parts in elevation;

Figure 26A is an isometric inner face view of the cam member for throwing out the clutch for the shaft of Figure 26, upon completion of one revolution of that shaft;

Figure 27 is an isometric inner face view, on an enlarged scale, of one of the pin gripper members of the pin setting table and associated parts, certain parts being shown fragmentarily and in section and other parts being broken away for clearness of illustration;

Figure 28 is a fragmentary sectional view, on an enlarged scale, taken substantially on line 28—28 of Figure 27, certain parts being shown in elevation and certain other parts being broken away and shown in section;

Figure 29 is a fragmentary sectional view of one of the pin gripper members, taken lengthwise of one of the cross-threaded operating shafts therefor, showing this shaft and the parts cooperating therewith, the shaft and certain other parts being shown in elevation;

Figure 29A is a disassembled or exploded view of the parts shown in Figure 29 which cooperate with the cross-threaded shaft of the latter figure;

Figure 30 is a sectional view, on an enlarged scale, of the pin setting table, taken substantially on line 30—30 of Figure 19, showing a pin held between a pair of pin gripper members, certain parts being broken away and shown fragmentarily for clearness of illustration;

Figure 30A is a detail sectional view taken substantially on line 30A—30A of Figure 30;

Figure 31 is a sectional view, on an enlarged scale, taken substantially on line 31—31 of Figure 19, showing the positions of the parts when the pin grippers of the pin setting table are closed;

Figure 31A is a view similar to Figure 31 but showing the positions of the parts when the pin grippers of the pin setting table are open;

Figure 32 is a fragmentarily vertical sectional view of the pit elevator well and the rear portion of the hopper, taken along a line extending from front to back of the machine adjacent the left side thereof, as viewed from in front, showing the pit elevator in dumping position and the control means therefor and associated parts;

Figure 33 is a transverse vertical sectional view of the machine taken adjacent the front thereof and looking forward, showing the control panel structure and the means for supporting the cable leading from the panel to the pin setting table, the latter being shown fragmentarily in vertical section and in its normal fully raised position;

Figure 34 is a diagrammatic view showing the positions of the pin setting table during the resetting operation and during the deadwood operation;

Figure 35 is an inner side view of the sweep mechanism and associated parts at the forward portion of one of the sweep rails, showing one of the gates and one of the sweeps and associated operating and control means;

Figure 35A is a detail view, on an enlarged scale of one of the chain engaging blocks of the sweep carriages, the chain being shown fragmentarily;

Figure 36 is a sectional view taken substantially on line 36—36 of Figure 35, showing the positions of the gate and the sweep blade, when open, in full lines and their positions, when extended across the alley, in dot and dash lines, parts being broken away;

Figure 37 is a sectional view, on an enlarged scale, taken substantially on line 37—37 of Figure 35, certain parts being shown in elevation;

Figure 38 is a fragmentary vertical sectional view of the machine, looking toward the pit end of the alley, showing in elevation the sweep operating and control mechanism and associated parts, certain parts being broken away;

Figure 39 is a sectional view taken substantially on line 39—39 of Figure 38;

Figure 40 is a fragmentary vertical sectional view taken lengthwise of the alley at the pit end thereof, showing the foul barrier structure and the releasing means therefor and associated parts, with the main frame of the machine shown fragmentarily and broken away and the pin setting table shown fragmentarily in section;

Figure 41 is a detail sectional view taken substantially on line 41—41 of Figure 40;

Figure 42 is an isometric plan view of the forward portion of the alley and associated parts, showing the foul line switch, the reset switch, the master switch, and associated elements;

Figure 43 is a transverse vertical sectional view of the foul line switch, on an enlarged scale relative to Figure 42, taken substantially on line 43—43 of Figure 44;

Figure 44 is a fragmentary sectional view taken substantially on line 44—44 of Figure 43;

Figure 45 is a transverse vertical sectional view of the alley taken along the foul line, showing, partly in section and partly in elevation, a second form of foul line switch;

Figure 46 is a rear view, partly in elevation and partly in section, of one of the pin setting table hydraulic dashpots, and associated parts, with certain parts broken away, the table being shown fragmentarily in transverse vertical section, the dashpot structure shown being that at the left side of the machine, as viewed from in front;

Figure 47 is a view similar to Figure 46, but mainly in elevation and with the table in lowered position, with the lower portion of the dashpot structure broken off and the table omitted, this view showing also certain microswitches and actuating means therefor having to do with the operation of the machine;

Figure 48 is an outer side view of the dashpot structure and associated parts of Figure 47, taken substantially on line 48—48 of Figure 47;

Figure 49 is a sectional view taken substantially on line 49—49 of Figure 47;

Figure 50 is an isometric outer side view, looking forward, of the timer mechanism on the pin setting table, the latter being shown fragmentarily and in section, this view showing the position of the parts when the pin grippers of the pin setting table are closed for gripping pins and being semidiagrammatic with certain parts omitted and certain other parts broken away, for clearness of illustration;

Figure 51 is a detail sectional view, on a reduced scale, taken substantially on line 51—51 of Figure 50 with the parts in the positions they occupy when the pin grippers are closed and the timer shaft is turning in a direction to open the pin grippers;

Figure 51A is a view similar to Figure 51 but with the conditions reversed relative to that figure;

Figure 51B is a detail elevational view of the timer shaft and the switch operating cam member thereon, taken substantially on line 51B—51B of Figure 51A;

Figure 52 is a sectional view, on a reduced scale, taken substantially on line 52—52 of Figure 50 and on the same order as Figure 51;

Figure 52A is a view similar to Figure 52 but with the conditions reversed relative to that figure;

Figure 52B is a detail elevational view of the timer shaft and the switch operating cam member and associated parts thereon, taken substantially on line 52B—52B of Figure 52A;

Figure 53 is a sectional view, on a reduced scale, taken substantially on line 53—53 of Figure 50;

Figure 53A is a view similar to Figure 53 but with the conditions reversed relative to that figure;

Figure 54 is a sectional view taken substantially on line 54—54 of Figure 50;

Figure 54A is a sectional view taken substantially on line 54A—54A of Figure 54;

Figure 54B is a detail sectional view taken substantially on line 54B—54B of Figure 54A;

Figure 54C is a view similar to Figure 54B, but with conditions reversed relative to that figure;

Figure 55 is a detail sectional view taken substantially on line 55—55 of Figure 50;

Figure 55A is a view similar to Figure 55, but with conditions reversed relative to that figure;

Figure 56 is a detail sectional view taken substantially on line 56—56 of Figure 50;

Figure 56A is a view similar to Figure 56, but with conditions reversed relative to that figure;

Figure 57 is a detail sectional view taken substantially on line 57—57 of Figure 50, with the switch operating cam disc partly broken away;

Figure 57A is a view similar to Figure 57, but with conditions reversed relative to that figure;

Figure 57B is a view similar to Figure 57, but with the switch operating cam disc turned into position for actuating the associated microswitch;

Figures 58 and 58A together constitute a circuit diagram showing the various control circuits, microswitches, solenoids and associated elements for initiating and controlling operation of the machine; and Figure 59 is a semi-diagrammatic transverse vertical sectional view of the bowling alley, showing the light source, photoelectric cell, mirror and associated parts whereby operation of the machine may be controlled by balls passing along the alley.

On the general assembly views, in the drawings, details have been omitted, for clearness of illustration, reliance being had upon the subassembly and detail views, for illustration of details of structure and mechanisms. Also, in many of the figures of the drawings, only those parts with which the particular figure has to do have been shown, other parts being omitted or indicated more or less diagrammatically, with a view to clearness of illustration. I shall describe the machine of my invention, in the following disclosure, as used for setting duckpins, by way of example. It will be understood, however, that by appropriate changes in shape or size, or both, of parts of the machine it may be used also for setting tenpins, and analogous game pieces.

In Figures 1 and 2 I have illustrated the machine of my invention, by way of example, as applied to a bowling alley A of conventional type, such as used for playing duckpins, having a pit B, a backstop or pad C, kickbacks D, and a return rail R extending along one side of the alley for returning the balls to the forward or front end thereof, at which there is located a post; all as is well-known in the art.

The pin setting machine of my invention comprises a suitably constructed and braced main frame 50 conveniently formed, in general, of angle members. Frame 50 is substantially rectangular in plan, overlies the pin area or block at the rearward or pit end of alley A, and conveniently is mounted on the kickbacks D, by appropriate means, such as suitably formed brackets 51. Sweep rails 52 extend from the pit end of the alley forward a substantial distance beyond the kickbacks D, in substantially overlying relation to the separator strips 53 at the sides of the alley A, and conveniently are secured to the brackets 51.

A hopper 54 is mounted on supporting side frame members 55 suitably secured to and extending upward from the kickbacks D, at the back of the pit B. The hopper 54 is of box-like construction, being reduced somewhat at its lower portion to provide a downwardly extending bin 56, for reception of defective pins which is closed at its front by a hinged door 57 normally held closed by suitable known means. An elongated wooden block 58 is suitably secured to the inner face of the back wall 59 of hopper 54 and extends the full interior width of the hopper. Block 58 is provided with a rounded strip 60 at its forward upper corner, to facilitate passage therealong of the bowling balls, as will appear more clearly presently. A threaded shaft 61 is rotatably mounted in hopper 54 in front of block 58, parallel therewith and spaced from the strip or rail 60 such a distance that the pins p will pass downward between rail 60 and shaft 61, whereas the bowling balls b will not pass therebetween, but will travel along the rail 60 toward one side of the hopper 54, as will appear more fully presently. The shaft 61 is rotated in a suitable manner, to be explained later, in proper direction to move a ball b resting thereon and on rail 60 along the latter toward the ball return side of hopper 54, as viewed in Figure 4. The block 58 is cut-away at its left hand end portion, at 62, sufficiently to permit a ball b to pass between this end portion of the block and the shaft 61. A ball passing between shaft 61 and the cut-away area 62 of block 58 passes downward into an extension 63A (Figures 4 and 5) of a trough 63 suitably supported on hopper 54 and inclined downward toward the front thereof. The ball rolls down extension 63A into the trough 63 which opens, at its lower end, into the adjacent end of the ball return rail R. From what has been said, it will be clear that a ball moved along the rail 60 by shaft 61 will be delivered, at the cut-away area 62 of block 58, to trough 63, from which it will pass onto the return rail R by which the balls are returned to the post at the front of the alley.

A downwardly and forwardly inclined deflector plate 64 is secured to block 58 and extends therefrom, to the front wall of hopper 54, to which it is secured, with its forward portion disposed substantially horizontally, in underlying relation to and supporting the upper run of an endless belt 65 passing about two pulleys 66 and 67, rotatably mounted on stub shafts 68 and 69, respectively, mounted on the front wall of hopper 54. A bevel gear 70 is fixed on the rearward end of pulley 67 and meshes with a bevel gear 71 fixed on the forward one of two parallel cross feed shafts 72, rotatably mounted in hopper 54 and underlying the deflector plate 64. The shaft 72 on which bevel gear 71 is secured is driven, by means described more fully later, and pulley 67 is driven by the bevel gears 71 and 70, in such direction that the top run of belt 65 travels toward the left side of hopper 54, as viewed in Figure 4. A deflector 73, of arcuate shape in plan, is mounted in hopper 54, adjacent the left side thereof, this deflector being disposed in overlying relation to the upper run of belt 65 and in underlying relation to shaft 61, and extending from the front wall of hopper 54 to the rear wall thereof. The downwardly and forwardly inclined deflector plate 64, previously mentioned, has its intermediate portion cut away, providing an opening 74 extending a substantial distance to the right of deflector 73, for passage of pins p downward to the shafts 72.

After a player has thrown three balls—when playing duck-pins—the alley is swept and the balls and the pins are delivered to an elevator which is then raised and dumps the balls b and pins p into the hopper 54, all as will be explained more fully later. A deflector 73A extending upward from block 58 adjacent the left end thereof, directs the pins into the hopper 54 inwardly thereof to the right of opening 74. The balls b are directed to the rail R, by means of which they are returned to the post at the front of the alley, as above explained. The pins p pass downward between rail or strip 60 and shaft 61 onto the deflector plate 64, by which they are delivered onto the upper run of belt 65. In the travel of belt 65 the pins are deflected therefrom, by the deflector 73, onto a downwardly and rearwardly inclined element 75 of deflector plate 64, extending over the forward one of the two shafts 72. The shafts 72 are provided with helical grooves of a radius approximating that of the shoulders of the pins p, which are supported in inverted position by these shafts. A spur 76 is keyed on the forward shaft 72 (Figures 3, 5 and 10) and meshes with a spur gear 77, of the same diameter, secured on the rearward shaft 72. The two shafts 72 are thus driven at the same speed and in opposite directions, so as to propel the pins $p$ therealong toward one end—the right hand end as viewed from in front—of the hopper 54. In the event a pin $p$ is split or chipped to an objectionable extent, it will pass between the shafts 72 and drop therefrom into the underlying defective pin bin 56.

Each of the cross-feed shafts 72 is provided, adjacent its right hand end, with a circumferential recess 78. The depth of recess 78, radially of shafts 72, is such that a pin $p$ will pass downward freely between the shafts 72 when it reaches the recesses 78 thereof. Since the grooves of the shafts 72 are helical, as noted, the pins $p$ propelled along these shafts will be inclined, to a certain extent, upward toward the right hand end of hopper 54. A deflector 79, of angular formation, is mounted on the right hand end wall of hopper 54 between the shafts 72. This deflector 79 is disposed to contact a pin $p$ entering the recesses 78, so as to assure that it will be straightened up or positioned vertically at the time it passes into these recesses. A pin passing through the recesses 78 is deposited, in inverted position, upon a pair of forwardly extending parallel feed shaft units 80. The feed roll or shaft units 80 underlie hopper 54 and are disposed to the right of bin 56, the right hand end of which may underlie the inner one of the rolls 80 and may be closed for a portion of its height, by an end wall 56a, shown in Figure 3. In the event that a pin upon the shaft units 80 is in position thereon underlying the area between the recesses 78 of shafts 72, when a pin on the latter shafts reaches the recesses 78, the latter pin will be prevented from fully entering recesses 78, by deflector 79 and by the lower pin on the shaft units 80, with which lower pin the lower end of the upper pin will then contact. When the pin on the forward feed shaft units 80 has been moved forward thereby, into position clear of the area underlying the recesses 78 of shafts 72, the pin on the latter shafts may then enter fully into the recesses 78 thereof and will then pass freely downward onto the lower shaft units 80.

The forward feed shaft units 80 are helically grooved similarly to the shafts 72 and are rotated in opposite directions, by means to be described later. The units 80 are suitably mounted at their rearward ends on the structure comprising the hopper 54 and the defective pin bin 56, and extend forward therefrom to the main frame 50, on which their forward ends are suitably mounted for rotation. Each of the shaft units 80 comprises a forward section 81 from which extends a shaft 82 of reduced diameter (Figures 6 to 9, inclusive), rotatably mounted at its rearward end in a bearing member 83 secured to back wall 59 of hopper 54, and a rearward section 84 slidably mounted on shaft 82 and feathered thereto at 85 for rotation therewith. A circumferentially grooved collar 86 is fixed on the rearward end of shaft section 84. The respective collars 86 receive shift shoes 87 (Figure 7) carried by forks 88 at the upper ends of arms 89 of a U-shaped yoke 90, rockably mounted on a stub shaft 91 supported by a bracket 92 mounted on the front wall 59 of the pit elevator well 94, the wall 59 being also the back wall of hopper 54, as previously stated. Torsion springs 95, mounted about the end portions of stub shaft 91, have their outer ends engaged with tabs 96 of bracket 92 and their inner ends engaged with arms 89 of yoke 90. The torsion springs 95 urge the yoke 90 about stub shaft 91 in a direction to hold the rear sections 84 of the forward feed roll or shaft units 80 in their rearward position. A shouldered latch pawl 97 (Figure 6) is pivoted at its rearward end, at 98, on bracket 92. The shoulder of pawl 97 normally engages in back of a plate 99, secured between arms 89 of yoke 90, and is effective for holding the yoke 90 in its forward position about the axis of stub shaft 91, in opposition to the torsion springs 95. A solenoid 100 is mounted on bracket 92, adjacent the top thereof, and has its core 101 pivoted, at its lower end, to latch pawl 97, at 102, in front of the pivot 98 thereof. When the solenoid 100 is energized the latch pawl 97 is raised thus releasing the yoke 90, which is then moved into its rearward position by the torsion springs 95. That moves the rear sections 84 of the shaft units 80 into their rearward position, in which they are yieldingly held by the torsion springs 95.

When the shaft section 84 of the respective units 80 is in its rearward position, its forward end is separated from the rearward end of shaft section 81, providing therebetween a groove or gap 103 (Figure 6) extending circumferentially of the shaft unit 80. The two gaps 103 are aligned transversely of the shaft units 80, and are of such depth radially thereof that a pin moving along the shafts 80 will pass freely downward through the gaps 103, as will appear more fully later. Likewise, section 81 of each of the shaft units 80 is provided, adjacent its forward end, with a circumferential groove 104 (Figure 6) of such radial depth that a pin aligned with the two grooves 104 of shaft units 80 will pass freely downward therebetween.

A rearward pair of distributor shafts 105 and 106 (Figure 10) extends across frame 50, these shafts being disposed in parallel spaced relation, rotated in opposite directions and provided with helically disposed grooves of rounded contour for receiving the pins and propelling them toward the left side of frame 50. A forward pair of distributor shafts 107 and 108, similar to the shafts 105 and 106, also rotated in opposite directions, extend across the frame 50 a short distance in front of the shafts 105 and 106. The right hand portions of shafts 107 and 108 underlie the circumferential recesses or grooves 104 in the forward feed shaft units 80, and the right hand portions of the distributor shafts 105 and 106 underlie the grooves 103 or gaps, provided in the forward feed shaft units 80 when the rearward sections 84 thereof are moved into their rearward position.

A reduced stud 109 (Figure 11) is suitably secured to each end of distributor shaft 107 and is rotatably mounted, by a needle bearing 110, in a collar 111 at the rearward end of an arm 112, there being a washer 114 interposed between collar 111 and the shaft 107 at each end of the latter. The arm 112 at the right end of shaft 107 is pivoted at its forward end, by a needle bearing 115, on the right hand end of shaft 108. The right hand end of shaft 108 receives a bushing 117 receiving a suitable bearing 118 disposed about a stud 119 extending into shaft 108. The stud 119 is provided at its outer end with a cylindrical base 120 of much greater diameter than stud 119, from the outer face of which base 120 extends a concentric sub-base 121 of reduced diameter. The sub-base 121 fits through a mounting plate 122, in which it is welded, and the base 120 fits snugly through a corresponding recess in a plate 123 constituting an element of the main frame 50.

A spur pinion 124 is keyed on shaft 108, a short distance from the left end thereof. Pinion 124 meshes with a similar pinion 126, of the same diameter, keyed on the left portion of shaft 107. The mounting plate 122 is removably secured to plate 123, conveniently by means of bolts 127 passing through plates 122 and 123 and receiving securing nuts at their inner ends, the heads of the bolts 127 being welded to plate 122. It will be seen that, by removing the nuts and moving mounting plates 122 with the parts secured thereto outward from plates 123, shaft 108 is released and this shaft may readily be removed from the frame 50. That also permits the removal from the frame of the arm 112 and the parts carried thereby. By reversing the operation, the arm 112 and parts carried thereby, and the shaft 108, may be as readily replaced in frame 50.

A second arm 112 is mounted at its forward end for turning movement about the left portion of shaft 108, by means of a needle bearing 115. Each arm 112 is provided at its forward end with a hub 130 which receives the needle bearing 115. Hub 130 is confined between two collars 125, fixed on roll or shaft 108, and intervening washers 129. Two sprocket wheels 131 and 132 are keyed on shaft 108, at the left end thereof, it being noted that shaft 108 is of somewhat greater length than shaft 107. The left end of shaft 108 is rotatably supported in the same manner as the right hand end by means of a stud 133 secured in a mounting plate 134 bolted to a plate 135, constituting an element of the main frame 50, there being a suitable bearing 136 mounted in the end of shaft 108 about stud 133, and a washer 137 disposed about stud 133 and confined between the end of shaft 108 and the base of stud 133. The left hand end of shaft 107 is rotatably mounted in a collar 111 of arm 112 in the same manner as the right hand end of this shaft. In the normal position of the two arms 112, they rest upon angle stop fingers 138, secured to the sides of frame 50 and disposed to support arms 112 in substantially horizontal position. The pair of rearward distributor shafts 105 and 106 are rotatably mounted in the frame 50 and in the upper arms 139 of two bell cranks 140 (Figure 6) in the same manner as the shafts 107 and 108 of the forward pair are mounted. The bell cranks 140 are mounted for turning movement about the shaft 106 in the same manner as the arms 112 are mounted for turning movement about the shaft 108.

Rearward and downward movement of the upper arms 139 of the bell cranks 140 is also limited by angle stop fingers 138. A spur gear 141 (Figures 3 and 10) is keyed on shaft 105 at the left end thereof and meshes with a spur gear 142 keyed on shaft 106 adjacent its left hand end. Two sprocket wheels 143 and 144 are keyed on the left hand end of shaft 106. A sprocket chain 145 passes about sprocket wheel 144 and about sprocket wheel 132 keyed on shaft 108, establishing driving connection therebetween. The sprocket wheel 131 on shaft 108 receives a sprocket chain 146 passing upward therefrom and forward of frame 50 about a sprocket wheel 147 keyed on a power shaft 148, rotatably mounted on frame 50 at the upper forward portion and transversely thereof. The shaft 148 is driven by an electric motor 149 of suitable type, mounted on frame 50 adjacent the top thereof, by means of belt 150 passing about a pulley 151 secured on the motor shaft and a pulley 152 secured on the drive shaft 148.

In the operation of the machine, the motor 149 operates continuously so that the shaft 148 is continuously driven. From what has been said, it will be clear that so long as the motor 149 is in operation, the distributor shafts 107 and 108 are likewise continuously driven in opposite directions. A sprocket chain 153 (Figures 3 and 10) passes over sprocket wheel 143 keyed on distributor shaft 106, over a sprocket wheel 143a keyed on shaft 61, about a sprocket wheel 154 fixed on the forward cross feed shaft 72, at the left end thereof, and about a sprocket wheel 155 loose on a shaft 156 rotatably mounted on side frame members 55 transversely of main frame 50, adjacent and in rear of the rearward pair of distributor shafts 105 and 106. It will be seen that when the distributor shafts are continuously driven, the cross feed shafts 72 are also continuously driven, the latter shafts being driven in opposite directions, and the shaft 61 is likewise continuously driven.

A crankshaft 157 (Figures 3, 6, 10 and 20) is rotatably mounted on frame 50, transversely thereof and in rear of the forward pair of distributor shafts 107 and 108. The shaft 157 is provided with two similarly directed crank arms 158 (Figures 6 and 10) disposed adjacent the sides of frame 50. Crank arms 158 of shaft 157 are respectively connected to the forward ends of pull rods 159, one at each side of main frame 50 of the machine. Each pull rod 159 is pivoted at its rearward end, at 160, to the lower end of the lower arm 161 of the corresponding bell crank 140 for the rearward pair of distributor shafts 105 and 106.

The upper arm 139 of the respective bell cranks 140 is connected, by a link 162, to the upper portion of the corresponding arm 112. When the crank shaft 157 is in its normal angular position, with the crank arms 158 thereof disposed substantially horizontal and extending forward, the arms 112, and the upper arms 139 of the bell cranks 140, are disposed substantially horizontally and are supported by the angle stop fingers 138 previously referred to. At that time, the distributor shafts of the respective pairs thereof are disposed with their right end portions underlying the circumferential grooves or recesses in the forward feed shaft or roll units 80, for reception therefrom of the pins fed therealong. Suitable means, to be later described, are provided for turning the crank shaft 157 from its normal position just referred to through one revolution and then stopping it, at an appropriate time. When the crank shaft 157 is turned through one revolution, the arms 112 and the arms 139 of the bell cranks 140, at each side of frame 50, will be swung upward and forward into substantially vertical position, for a purpose to be described later, and will then be returned to their normal lowered positions as the crank shaft is turned through the second half of its revolution.

When arms 112 and 139 are swung upward and forward as above described, a pin 163 (Figure 6), secured in the arm 139 of the bell crank 140 at the right side of frame 50, contacts a finger 164 extending downward from a head 165 adjustably secured on the forward end of a rod 166. The head 165 is slidably mounted, by pin and slot means 167, on frame 50 at the side thereof. The rod 166 is pivoted at its rearward end, at 168, to one arm of yoke 90. The pin 163 moves the rod 166 into its forward position, thereby moving the rearward sections 84 of the forward feed shaft or roll units 80 forward into contact with the forward sections 81 of those units, thereby closing the recesses or gaps 103, except for a groove of restricted width between the adjacent ends of sections 81 and 84, extending circumferentially about unit 80. That conditions the forward feed roll units 80 for travel of pins therealong to the forward circumferential recesses or grooves 104 of those units.

Each of the shafts 107 and 108 of the forward pair of distributor shafts is provided with three unthreaded areas 169 (Figure 10), and with a circumferential groove 170 at the mid-length of each of such areas. Each unthreaded area 169 and its groove 170 is effective for stopping and retaining a pin being fed along the shafts 107 and 108, unless the pin is displaced from that area by a following pin in contact therewith. Each of the shafts 105 and 106 of the rearward pair of distributor shafts is likewise provided with a plurality—seven—of unthreaded areas 169 and a circumferential groove 170 at the mid-length of each area. The unthreaded areas 169 and the grooves 170 of shafts 105 and 106 serve to stop and retain a pin entering each of such areas, unless it is displaced therefrom by a following pin, in the same manner as the unthreaded areas and the grooves of shafts 107 and 108.

When the arms 112 and 139 and the bell cranks 140 have been swung upward and forward and have been returned to their normal lowered position, as above described, the rearward sections 84 of the forward feed shaft units 80 have been moved to their forward position. The pins delivered to the roll units 80 are fed forward therealong, such pins being inclined upward and forward of frame 50 at an angle corresponding to the pitch of the helical grooves of units 80. As will be understood, from what has been said, three pins should be delivered to the forward pair of distributor shafts 107 and 108, and seven pins should be delivered to the rearward pair of distributor shafts 105 and 106. In order to accomplish that result, I have provided suitable mechanism for controlling travel of the pins along units 80.

A turnstile mechanism 171 (Figures 6 to 9, inclusive) is supported by an angle bracket 172, secured to plate 123 of frame 50, in overlying relation to the forward feed roll units 80, at the area of the adjacent ends of sections 81 and 84 thereof. A gate member 173 is fixed on the lower end of a shaft 174 passing through a spacing sleeve 175 disposed between the upper arm of bracket 172 and gate member 173. This gate member 173 in part overlies the inner one of the forward feed roll units 80, at the area of the adjacent ends of the sections thereof. The gate member 173 comprises five equally spaced arms 173A connected by arcuate surfaces of substantially the same radius as that of the respective pins, at the areas thereof which contact arms 173A. A spur pinion 176 is fixed on the upper end of shaft 174, above the upper arm of bracket 172, and meshes with a gear 177 rotatably mounted on a headed and shouldered stud 178 secured to the upper arm of bracket 172. A disc 179 is disposed about the stud 178 and seats on the upper face of gear 177. A two armed control member 180 is disposed about the upper end of stud 178 and seats upon disc 179. Screws 181, passing downward through member 180 and disc 179 and threading into gear 177, serve to secure all of these members together for turning movement as a unit about stud 178. A washer 182, disposed about the lower end of the body of stud 178, spaces gear 177 above the upper face of bracket 172, the assembly being confined between washer 182 and the head of stud 178. Preferably, a needle bearing 183 is disposed about stud 178, between the latter and the assembly mounted thereon.

The disc 179, which may be termed a holding disc, is provided in its circumference with ten equally spaced notches 184 (Figure 8). The notches 184 are adapted for reception of a roller 185 at the inner end of a holding lever 186 pivoted intermediate its ends, at 187, on the bracket 172. The rearward end of lever 186 is urged toward disc 179, so as to hold the roller 185 in pressure contact therewith, by a tension spring 188 connecting the forward end of lever 186 to plate 123 of the main frame 50. It will be seen that the disc 179 and the lever 186 provide means for yieldingly holding the assembly, including also gear 177 and arm 180, in adjustment about stud 178.

A micro-switch 189, which controls the circuit of solenoid 100 (Figures 6 and 7) and normally is open, is mounted on bracket 172 adjacent disc 179. The member 180 comprises a switch operating arm 190, which is rounded at its outer end and projects radially outward beyond disc 179 a proper distance to actuate lever 191 of switch 189, for closing the latter. The member 180 also has an arm 192 diametrically opposite arm 190 and offset upward from disc 179 so as to clear lever 186 and switch arm 191. The outer end of arm 192 is beveled to provide a detent 193 for engagement with the bill of a latch lever 194 pivoted at 195 on bracket 172. A tension spring 196, anchored to the outer end of latch lever 194 and to plate 123, normally holds an angular stop 197, carried by the inner arm of lever 194, in contact with the adjacent edge of the upper arm of bracket 172. That positions the inner end of lever 194 for engagement with the detent 193 of arm 192, effective for locking the gear 177 against counterclockwise rotation, as viewed from above, as will be clear from Figure 8.

When crankshaft 157 is turned through one revolution, the rod 166 is moved forward by pin 163, as previously explained. In the forward movement of rod 166, a trip finger 198 (Figures 6 and 8), extending upward from rod 166, contacts latch lever 194 and swings the inner end thereof outward away from disc 179, thus releasing arm 192. It will be recalled that the forward movement of rod 166 also moves the rearward sections 84 of the forward feed roll units 80 into their forward or closed positions. That permits of pins passing along the units 80 to the forward circumferential recesses or grooves 104 thereof. A link 200 is pivoted at its rearward end on finger 198, and has pin and slot connection 201 at its forward end to the lower end of an arm 202 extending downward from a shaft 203 rockably mounted at the under face of the upper arm of bracket 172. A pin deflector plate 204 is fixed to shaft 203 and extends downward therefrom. When the rod 166 is in its rearward position, the angular position of shaft 203 is such that the deflector plate 204 is disposed to contact the upper end of a pin entering the area of the gate 173, as shown in full lines in Figure 6. When the rod 166 is moved into its forward position, the deflector plate 204 is raised to its dotted line position indicated in Figure 6, being then disposed to clear pins moving forward along the units 80. As a pin moves along the units 80, it passes between the arms of gate 173 and turns the latter a pre-determined distance clockwise, as viewed from above. The ratio between the pinion 176 and the gear 177 is one to two. The gate 173 has five arms, as previously stated, so that when three pins have passed through the gate the gear 177 will have been turned counterclockwise one half the distance of pinion 176, at which time arm 190 contacts switch lever 191 closing the switch 189, for a purpose which will appear presently.

It will be understood, from what has been said, that so long as the rod 166 is in its forward position, the latch lever 194 is held in releasing position, permitting free rotation of the assembly including the gear 177 and associated parts, except as such parts are releasably held against turning to preclude risk of over-running thereof, by the holding lever 186. Since the shafts 80 are helically grooved, with the contour of the grooves approximately the same as that of the pins, the pins as they pass along units 80 are inclined upwardly and forwardly thereof at an angle approximately the pitch of the grooves of the roll units. In order to assure that the pins will be delivered properly to the forward distributor shafts 107 and 108, they should be positioned vertically when they enter the circumferential grooves or recesses 104 of the roll units 80. To that end, I have provided a suitably formed deflector 205 (Figure 6) mounted on frame 50 in position extending between the forward ends of roll units 80. The rearward end portion of the deflector 205 is bent downward at a suitable angle, at 206, for contact with a pin entering the grooves 104 and is effective, in cooperation with the roll units 80, for moving such pin into vertical position. The pin then drops downward onto the continuously rotating distributor rolls 107 and 108. When the pin enters a pair of unthreaded areas 169 (Figure 10) of rolls 107 and 108, and the circumferential grooves 170, it is retained thereby until it is displaced by a following pin travelling along a threaded area of the rolls. Three pins are delivered to the rolls 107 and 108 and are positioned in the unthreaded areas 169 thereof, in the manner described.

When three pins have passed through the gate 173, the micro-switch 189 is closed, as above explained, energizing the solenoid 100. That returns the rearward sections 84 of the forward feed roll units 80 to their rearward position, providing the circumferential recesses or gaps 103 between the adjacent ends of sections 81 and 84. Also, in the return of roll sections 84 to their rearward position, the rod 166 is returned to its rearward position. That releases the latch lever 194, which is then returned to its inner operative position, and moves the pin deflector plate 204 to its lowered operative position. Thereafter, the pins moving forward along the roll units 80 enter the gate 173 and are moved into vertical position by deflector plate 204 in cooperation with the roll units 80. The pins then drop onto the rearward distributor rolls 105 and 106 and are moved along the latter toward the left side of frame 50, as viewed from in front. The pins on the rolls 105 and 106 are positioned therealong in spaced apart relation and are retained at the unthreaded areas 169 thereof, in the same manner as the pins are spaced along and retained in position on the forward distributor rolls 107 and 108. As will be understood, when ten pins have passed through the gate 173, the latter has been turned through two complete revolutions and the assembly, including the gear 177 and associated parts, has been turned through one complete revolution. The detent 193 is then again in engagement with the bill of latch lever 194, now in operative position. That locks the gate 173 against rotation clockwise and it is then effective for holding the pins in rear thereof against travel along the forward feed roll units 80. While the roll units 80 exert a definite force on the pins urging them forward, that force is not sufficiently great to exert objectionable stress on the gate 173, and the rounded contour of the helical groove or thread of the roll sections 84 permits slippage between the latter and the pins thereon without risk of damage to either.

A pin receiving table 207 (Figures 1, 2, 3, 10, 15, 16 and 16A) is mounted in horizontal position in main frame 50, in fixed position therein. The table 207 comprises a triangular frame 208 (Figure 15) having its vertex directed forwardly of frame 50 and its base toward the rear thereof. Ten rings 209 are mounted in frame 208, arranged similarly to the arrangement of a set of pins on the alley, table 207 overlying the pin area of the alley. The first or front ring 209 is welded to the sides of frame 208, the two outer back rings are welded to the sides and the base of frame 208, the two inner back rings are welded to the base of frame 208 and to a circular frame 210, disposed within frame 208, and the other rings, except the center ring, are welded to frame 210 and to the sides of frame 208. The center ring 209 is supported by radial arms 211 extending from frame 210 radially inward thereof and welded thereto and to the center ring. The table 207 is thus of open construction and possesses adequate rigidity and mechanical strength while being of comparatively light weight. As will be understood, table 207 is so positioned within frame 50 that the rings 209 thereof overlie and are accurately aligned with the pin spots on the pin area of the alley.

A pin chute 212 (Figures 15 and 16), of arcuate across section, extends at an inclination upward and rearward from the first ring 209. Relatively short pin chutes 213, similar to chute 212, extend upward and rearward from the next two rings 209, one at each side of frame 208. Each of the chutes 212 and 213 is provided, at its upper end, with a pair of ears 214 projecting laterally therefrom and seating on a cross supporting strip 215 turned down at its ends and welded to the sides of frame 208. That provides, in effect, an inverted U bracket, on the bight portion of which the ears 214 seat. The ears of the chute 212 are disposed in overlapping relation to the ears at the inner sides of the chutes 213, and the ears 214 of all of the chutes are secured, conveniently by bolting, to the supporting strip 215. A collar 216 (Figure 16A) is welded to the lower end of each of the chutes 212 and 213 and fits about the upper end portion of the corresponding ring 209. The collar 216 is provided with a suitable number—conveniently three—of radial openings, which receive headed and pointed screws 217, which thread into ring 209 with their points extending into corresponding openings in a pin bucket 218, the upper portion of which seats snugly within ring 209. Each of the pin chutes is provided with a cage comprising rings 219 extending about the chute adjacent the ends thereof and welded thereto, and wire rods 220 welded to the rings 219 and extending lengthwise of the chute above the open upper side thereof. The lower portions of the rods 220 of certain of the chutes are bent downward at an angle to the collar 216, to which they are welded.

The chutes 212 and 213 have their upper ends disposed in alignment with and in proximity to the respective pin retaining areas of the roll 108 of the forward pair of distributor rolls 107 and 108. Chutes 212 and 213, similar to the chutes just described, extend upward and rearward from the other rings 209, with their upper ends disposed in alignment with and in proximity to the respective pin retaining areas of roll 105 of the rearward pair of distributor rolls 105 and 106. The chutes of the last referred to group are supported at their upper ends by a cross strip 221 (Figure 16), which is supported by brackets 222 secured to an angle cross member 223 at the back of frame 209. It will be understood that each of the last-mentioned chutes is provided at its lower end with a collar welded thereto and secured to the corresponding ring 209, in the same manner as the first-mentioned chutes 212 and 213. Likewise, each of the chutes leading from the shaft 106 is provided with a wire cage similar to that previously described. It will be seen that there are ten chutes in all, disposed in two groups—a first or forward group of three chutes leading to the three forward rings 209 in table 207, from roll 108, and a second group of seven chutes leading from roll 106 to the seven remaining rings of table 207.

When the crank shaft 157 is turned through one revolution, the arms 112 and the arms 139 of the bell cranks 140 are swung upward and forward, as previously described, and the pins on the two pairs of distributor rolls are discharged therefrom into the pin chutes, the upper ends of which are in proximity to and in alignment with the respective unthreaded pin retaining areas 169 and grooves 170 of these rolls. The chutes and their associated cages direct the pins downward into the buckets 218, in upright position. The lower portions of the rods 220 of chutes 213 are bent at 224, to deflect the pins into the buckets, and the rods 220 of the second row of chutes are interrupted, as shown (Figures 15 and 16) to provide clearance for pins on the rolls 107 and 108 prior to delivery of such pins therefrom to the chutes.

As will be understood, the pins should not be discharged from the distributor rolls until a complete set of pins—ten pins, three on the forward pair of rolls and seven on the rearward pair of rolls—have been properly positioned thereon. To that end, I provide suitable means (Figures 10 and 15) whereby operation of the crank shaft 157 is automatically controlled by the pins on the distributor rolls. A micro-switch 225, mounted on a bracket 226 secured to pin receiving table 207, is disposed to be contacted and closed by a pin supported on the rolls 107 and 108, at the unthreaded areas 169 thereof nearest the left side of frame 50. A second micro-switch 227, mounted on a bracket 227a, mounted on main frame 50, is similarly disposed relative to the shafts 105 and 106, these switches being disposed to be closed by the left end pins on the respective pairs of distributor rolls, when those rolls contain a complete set of pins. The micro-switches 225 and 227 are connected in series with each other and with a solenoid 228 (Figures 10, 26 and 26A) mounted on the main frame 50 at the left side thereof. The lower end of core 229 of solenoid 228 is attached to the upper end of a link 230, pivoted at its lower end to the outer end of arm 231 of angle clutch shift lever 232 pivoted at 233 on a bracket 234 secured to the pin receiving table 207. The downwardly extending arm 235 of angle lever 232 carries, at its lower end, a yoke 236 having operating connection to a friction clutch 237 on shaft 157. The clutch 237 is of known type, preferably that known commercially as a "Maxitorq" clutch, though any suitable known clutch may be used.

The outer forward feed roll unit 80 is provided with a forward extension 238 (Figures 3 and 10) rotatably mounted in a bracket structure 239 mounted on frame 50, at the right side thereof as viewed from in front. A spiral gear 240, keyed on extension 238, meshes with a spiral gear 241 (Figure 3) keyed on the right end of the continuously driven power shaft 143. A spur gear 242 is fixed on the forward end of the outer roll unit 80 and meshes with a spur gear 243, of the same diameter, fixed on the forward end of the inner roll unit 80. Conveniently, the inner roll unit 80 also has bearing, at its forward end, in the bracket structure 239. It will be clear that when the power shaft 148 is driven, the forward feed shaft units 80 are rotated in opposite directions and at the same speed, as and for the reasons previously explained.

The clutch 237 (Figures 26 and 26A) comprises a member 244 normally free from and rotatable on crank shaft 157, and a cooperating member 245 which is feathered on and rotatable with shaft 157. The member 245 is grooved circumferentially and receives shoes pivoted in the arms of yoke 236. When solenoid 228 is energized, clutch member 245 is moved toward clutch member 244, into cooperating relation therewith, and clutches it to shaft 157. A spur gear 246, fixed to clutch member 244, meshes with a spur gear 247 of a gear reduction train 248 mounted in a bracket 249 mounted on main frame 50. The gear train 248 is driven by a sprocket 250, included therein, which receives a chain 251 (Figures 3 and 10) passing thereabout and about a sprocket 252 keyed on distributor roll 106 adjacent the left end thereof. It will be clear, from what has been said, that clutch member 244 is continuously rotated from distributor shaft 106, when the machine is in operation, and that shaft 157 will be rotated when the clutch 237 is engaged.

A flanged collar 253 (Figures 26 and 26A) is fixed to crank shaft 157, adjacent clutch member 245. Collar 253 carries a cam 254 disposed to contact a roller 255 mounted on the lower end of a stud 256 slotted at its upper end and there fixed to arm 235 of lever 232. When the distributor rolls 105 and 106 and 107 and 108 are in their normal positions, the cam 254 is disposed a short distance beyond roller 255, in the direction of rotation of shaft 157, with roller 255 then adjacent but beyond the high end of cam 254. The clutch shift lever 232 is then free for operation to engage the clutch 237, as will be clear. When a complete set of pins—ten in all—is properly positioned on the two pairs of distributor rolls, the micro-switches 225 and 227 are closed, as above explained. That energizes the solenoid 228, so that the clutch 237 is engaged and the crank shaft 157 is turned through one revolution for dumping the pins, as previously explained. As the crank shaft 157 approaches the end of its complete revolution, the cam 254 contacts roller 255 and disengages the clutch 237. Collar 253 is so positioned that the clutch 237 is disengaged while the pairs of distributor rolls still have a short distance to move downward in their return to normal position. This downward movement, by gravity, of the pairs of the distributor rolls, after disengagement of the clutch 237, turns the shaft 157 a slight distance, sufficient to assure that the cam 254 is disposed clear of the roller 255, as and for the reasons above explained.

Each of the pin buckets 218 (Figures 17 and 18) comprises a body portion 260, which is secured at its upper end in the associated ring 209 of the pin receiving table 207, in the manner previously described. Body 260 is provided, at opposite sides thereof, with lengthwise slots 261 of substantial width, extending the major portion of the length of body 260 and opening through the lower end thereof. Two doors 262 normally close the lower end of the pin bucket 218. Each of the doors 262 is of arcuate cross section and formed interiorly approximately to the contour of the lower portion of a pin $p$. An outwardly extending flange 263 is provided at the upper end of each door 262 and carries two upwardly extending ears 264, disposed at the inner faces of ears 265 extending downward from a mounting plate 266 secured to body 260 of bucket 218. A third ear 267 extends upward from flange 263 of door 262 and also extends downward therebelow. A pintle pin 268 passes through aligned openings in the ears 265 of plate 266 and the ears 264 and 267 of the door 262, which is thus hingedly mounted on the lower end of body 260 of bucket 218. A tension spring 270 is anchored, at its upper end, to the bucket body 260 and, at its lower end, to flange 263 of door 262. The springs 270 urge the doors 262 toward each other, such movement of the doors being limited by bottom closure plates 262ª secured thereto and in contact with each other when the doors are in fully closed position. A pin $p$ in the bucket is then held in upright position seating upon the bottom plates 262ª of the doors 262. The springs 270 are of sufficient strength to hold the doors 262 closed under the weight of a pin supported thereby, while permitting ready opening of the doors 262, when released, upon the pin being subjected to downward pull for withdrawing it from the bucket, by means which will be described later.

A latch member 271 is pivoted on a vertical axis, at 272, on a tab 273 extending outward from mounting plate 266. The inner arm 274 of latch member 271 is provided with a downwardly opening notch 275 receiving a latch finger 276 extending upward from ear 267. When the latch member 271 is in normal latching position, the inner end of the arm 274 thereof is disposed at the inner face of finger 276, positively locking door 262 in closed position. The latch member 271 is urged toward operative or locking position by a tension spring 278 anchored at one end to the inner arm 274 of member 271 and, at its outer end, to the adjacent ear 265. Turning movement of latch member 271 by tension spring 278 is limited by a stop 279 secured to plate 266 and disposed for contact by inner arm 274 of member 271. The outer arm 280 of latch member 271 is provided with a vertically extending trip finger 281 of substantial length adapted for cooperation with a trip member effective for turning the latch member 271 into releasing position, thus permitting opening of door 262 for the purpose of withdrawing a pin $p$ from the bucket 218, as will be hereinafter described.

The pins are removed from the pin buckets 218 by means, to be described later, carried by a pin setting table 283 (Figures 1, 3, 19 and 19A). This table 283 underlies the pin receiving table 207 and is suitably mounted for vertical movement in the main frame 50. Downward travel of table 283 is controlled by hydraulic dashpots 284 (Figures 1 and 3), of known type, effective for regulating the rate of downward travel of table 283 under the influence of gravity, while permitting free upward movement thereof by associated raising means. The dashpots 284 comprise (Figures 46 to 49, inclusive) vertical tubes 285 fixed at their lower ends to table 283, adjacent the sides thereof, and slidable through bracket structures 239, previously referred to, as to which more will be said later. Vertical rack bars 286 are fixed to the tubes 285 at the inner sides thereof. Spur pinions 287 (Figures 10 and 14), keyed on stub shafts 288, rotatably mounted in gear boxes 289 mounted on bracket structures 239, mesh with the rack bars 286. Each of the stub shafts 288 also has keyed thereon a bevel gear 290 which meshes with a bevel gear 291 keyed on a cross shaft 292 rotatably mounted on main frame 50. A sprocket wheel 293 is loose on shaft 292 and receives a sprocket chain 294 (Figure 10) passing about a sprocket wheel 295 rotatable on a stub shaft 296 mounted on bracket structure 239. A sprocket wheel 297, of greater diameter than sprocket wheel 295, is fixed to the latter and receives a chain 298 passing thereabout and about a sprocket wheel 299 keyed on the continuously driven shaft 148. The sprocket wheel 293 carries a member of a clutch 300 (Figure 14), of known type, such as that previously referred to, mounted on shaft 292, on which the other member of clutch 300 is feathered. Suitable means, to be described later, is provided for engaging the clutch 300 when the table 283 is in lowered position, and disengaging the clutch 300 when the table 283 has been returned to its fully raised position, in which it normally is held by latch means operated at appropriate times, as will be explained later, for releasing the table. When table 283 is released from its fully raised position, it moves downward by gravity, the rate of its descent being controlled by the dashpots 284. On engagement of the clutch 300, shaft 292 is driven and drives the spur pinions 287, through the bevel gears 290 and 291, in proper direction for raising the table 283 and thereby returning it to its fully raised position.

The construction of the dashpots 284 and the mounting thereof in the bracket structures 239 are shown more clearly in Figures 46 to 49, inclusive, of the drawings. The tube 285 of the dashpot 284 is closed at its upper end by a head 301 suitably secured therein. The lower end of tube 285 is closed by a head 302 fixed therein and bolted to a mounting bracket 303 which is bolted to the pin setting table 283. As previously noted, the tube 285 is slidable through the bracket structure 239, appropriately formed to that end. An upright 304, of angle cross section, is bolted on the upper end of each bracket structure 239, this upright having an upper end wall 305 extending inward over the associated tube 285. A piston rod 306 is adjustably secured through wall 305 and extends therefrom downward into tube 285 axially thereof, this rod 306 having a sliding fit through head 301. A piston 307, having a substantially fluid tight fit within tube 285 and freely slidable therein, is adjustably secured on the lower end of rod 306. The piston 307 is provided with two lengthwise passages 308 extending therethrough. These passages are of slightly greater diameter than two pointed rods 309 secured in head 301 and extending downward therefrom. In the downward movement of table 283, as it approaches the end of its downward travel, the rods 309 enter the passages 308 of piston 307, thereby restricting the flow through those passages of the oil or other hydraulic liquid contained in tube 285, so as to retard downward movement of table 283. That is desirable as avoiding sudden stoppage of table 283 when traveling downward at considerable speed, thus avoiding objectionable noise as well as possible damage to table 283 and parts associated therewith. Within the broader aspects of my invention, any suitable means may be provided for regulating the downward travel of table 283 under the influence of gravity.

The rejected or defective pin bin 56, previously referred to, comprises the back wall 59 formed of a panel of plywood secured to and extending a substantial distance downward beyond, hopper 54 to provide the front wall 93 (Figure 3), previously mentioned, of the pit elevator well 94. A shaft 310, rotatably mounted in the frame members 55 adjacent the bottom of bin 56, either above or below the latter—shown as above—carries two winding drums 311 keyed thereon adjacent the ends thereof (Figures 13 and 13A). Each drum 311 has secured thereto one end of a cable 312 passing therefrom downward to a sheave 313 (Figure 3) at the back of pit B, at the side thereof, and thence forward about a sheave 314 underlying the gutter of alley A, the other end of cable 312 being anchored, at 315, to a pusher 316 operating in the pit B. A second cable 317 is secured at one end to each drum 311 and is led therefrom downward to a sheave 318 adjacent and co-axial with, but rotatable independently of, sheave 313, from which sheave 318 the cable 317 is led forward along pit B, with its other end anchored to an arm 319 extending upward from pusher 316 at the side thereof. It will be understood that there are two cables 312 and two cables 317, one of each at each side of the pit B. The cables 312 and 317 are wound upon the respective drums 311 in opposite relation, such that when the drums are rotated counter-clockwise, as viewed in Figures 1 and 3, the cables 317 are wound onto drums 311 and the cables 312 are unwound from drums 311, thereby moving the pusher 316 from its normal forward position into its rearward projected position. Conversely, when the drums 311 are rotated clockwise, the pusher 316 is returned to its normal forward position.

The pusher 316 comprises substantially L-shaped side brackets 320 secured to the ends of a cross bar 321 extending beyond them. Each of the brackets 320 carries two wheels 322 rotatably mounted on the lower portion thereof at its outer face. The wheels 322 travel in channel tracks 323 mounted at the sides of pit B and inclined upwardly and rearwardly thereof. A pit mat 324 is suitably supported in underlying relation to the cross bar 321 and extends the full length of the pit B parallel with the tracks 323. Each of the cables 312 is anchored to the corresponding bracket 320 by a turnbuckle 325, providing means for taking up any slack in the cable, as will be understood, and each of the cables 317 passes through a tubular member 326 by which it is anchored to arm 319, as previously noted. When the pusher 316 is in its normal forward position, cross bar 321 thereof underlies the rearward end of the floor of alley A, in the same manner as the usual cross bar at the pit end of the alley.

Shaft 310 also carries a pair of winding drums 327 and 328 loose thereon and restrained against movement toward drums 311 by stop collars 329 fixed on shaft 310. Drum 327 carries, at its outer face, a sprocket wheel 330 of reduced diameter fixed to drum 327 for rotation therewith. Drum 327 is provided, at its inner face, with a clutch member 331 which cooperates with a clutch member 332 feathered on shaft 310. Drum 328 carries, at its outer face, a sprocket 333 fixed thereto and of the same diameter as sprocket 330. Each of the drums 327 and 328 has secured thereto one end of a cable 334, which is led forward over sheaves 336 (Figure 3) rotatably mounted on bracket structures 239. From sheave 336 cable 334 passes downward and is anchored, at its lower end, to the dashpot tube structure, being thereby anchored to table 283, at 337, at the midlength of the side thereof. It will be understood that there are two cables 334, one at each side of frame 50, extending forward to table 283 and anchored thereto as stated.

The cables 334 are so disposed relative to drums 327 and 328 that they are unwound therefrom when the pin setting table 283 moves downward, and they are wound onto the drums 327 and 328 when shaft 310 is rotated clockwise. Each of the sprockets 330 and 333 receives a chain 338 (Figures 3 and 13B) passing thereover, the lower end of which is secured to a cross bar 339. A cushion 341, of known construction, is suspended, by suitable means 342 also providing attachment for chain 338, from cross bar 339 for vertical movement therewith. Cushion 341 is provided, at each side thereof, with a pair of vertically spaced studs 343. In the normal lowered position of the cushion 341, the lower stud 343 at each side of cushion 341 is disposed a short distance below the rearward arm or strip 344 of a vertically slotted guide member 345 supported adjacent the side of the cushion. The guide member 345 comprises the strip 344 and a strip 340 parallel with and spaced forwardly from strip 344. The cushion 341 is thus normally free to swing under the impact of the pins and the balls striking it, as usual and as is required. A panel 346 is mounted on the back of cushion 341 and extends a short distance therebelow, the upper end of panel 346 being spaced a substantial distance below the lower end of the panel 93, when the cushion 341 is in its normal lowered position shown in Figure 3.

Reference has been made to a resetting operation. By that I mean the operation in which, after completion of a frame, the alley is swept and a set of pins—ten duckpins—is placed upon the pin area of the alley. In the first part of what I term the "deadwood" operation, later referred to in more detail, as distinguished from the resetting operation, the shaft 310 is not rotated and the pusher 316 remains in its forward inoperative position. In order to control the rotation of shaft 310, I provide means for holding the clutch member 332 (Figure 13) in engagement with clutch member 331, when performing a resetting operation, and holding clutch member 332 disengaged from clutch member 331 when performing a deadwood operation. The clutch member 332 is provided with a circumferentially grooved collar 347 which receives elements 348 of a yoke 349 of a shift lever 350 pivoted at 351 on a bracket 352 mounted on the left frame member 55. The upper end of lever 350 is pivoted at 353 to a link 354 pivoted at 353a to the inner end of a link 355 pivoted at its outer end, at 355a, on bracket 352. Links 354 and 355 are connected at 353a by a link 356 to the lower end of core 357 of a solenoid 358 mounted on bracket 352. A tension spring 359, anchored to pivot 353a and to bracket 352, urges core 357 of solenoid 358 toward its lower or projected position and urges shift lever 350 in declutching direction. The solenoid 358 normally is energized and is effective for holding the clutch member 332 engaged. The links 354 and 355 then provide a toggle which locks clutch member 332 in and is of adequate strength to withstand the back thrust of the clutch during rotation of shaft 310. For performing the deadwood operation, the solenoid 358 is deenergized and the tension spring 359 then becomes effective for disengaging the clutch, as will be explained more fully later.

When performing the resetting operation, a switch button 362 (Figure 42), designated the reset button, located near the post 363 at the forward end of the alley A, is pressed. During the reset operation, which will be explained fully later, the pin setting table 283 is released and is moved downward by gravity. During the downward movement of table 283, the cables 334 (Figures 3, 13, 13A and 13B) are unwound from the drums 327 and 328 and the shaft 310 is rotated in counter-clockwise direction, as viewed in Figures 3 and 13B, it being remembered that sprocket 330 (Figure 13B), fixed to drum 327, is then clutched to shaft 310. In the counter-clockwise rotation of shaft 310, the drums 311 are rotated counter-clockwise so that the cables 317 are wound thereon and the cables 312 are unwound from the drums 311. Just prior to release of table 283 for downward movement, the alley is swept, as will be explained more fully later, and the pins and the balls swept from the alley are then in the pit B. As the table 283 descends, the pusher 316 is moved into its rearward or projected position, as above explained. Also, as the table 283 descends, the chains 338 are wound over the sprockets 330 and 333. That raises cushion 341 to provide space for passage therebeneath of the cross bar 321 of pusher 316. When the cushion 341 has been raised a short distance, the studs 343 enter slots 345a of guide members 345, and the upper portion of cushion 341 is then disposed between the panel 93 and a shield 364 extending between the frame members 55 adjacent the strips 340. The cushion 341 is thus restrained against swinging movement during its upward travel. When cushion 341 has been fully raised, the pusher 316 has been moved rearward to its fully projected position, which it reaches when the table 283 reaches its lowermost position. Down travel of table 283 is limited by contact with bracket structures 239 of cap screws 433 threaded through clamps 428 at the upper ends of tubes 285.

When cushion 341 is fully raised, the cross bar 321 of pusher 316 is disposed below the cushion and forms, in effect, a downward extension of the panel 346, the upper end of which is then adjacent the lower end of the panel 93 constituting, in effect, a downward extension thereof. The panels 93 and 346 and the cross bar 321 of pusher 316 thus provide a substantially continuous front wall of the well 94 in which operates a pit elevator 367. The well 94 comprises continuous side walls 368 and a continuous back wall 369, which walls may be formed of plywood or other suitable material. The elevator 367 (Figures 3 and 32) is of box formation, open at its top and front and is provided at each side with two rollers 370 operating in a channel rail 371 mounted on the inner face of side wall 368 of well 94. There is, of course, one rail 371 and two rollers 370 at each side of the elevator 367. The elevator 367 normally is in its lowered position and the pusher 316 discharges into the elevator the pins and balls from the pit B, as table 283 reaches its lowermost position, as limited by the cap screws 433 above mentioned. After the pusher 316 has been fully projected and the pins have been set on the alley by table 283 and its associated mechanisms, the clutch 300 (Figure 14) is actuated, by suitably controlled means, so that the table 283 is then returned to its fully raised position, in which it is latched, and the clutch 300 is then disengaged. During the time the table 283 remains at its fully lowered position, after the pusher 316 has been fully projected, the elevator 367 is raised, by means to be described presently, the front of the well 94 being then closed by panels 93 and 346 and the cross bar 321 of pusher 316, effective for preventing discharge of pins or balls from the elevator 367 during its upward travel. The upper portions of the channel rails 371 are curved forward at 372 (Figures 3 and 32) in such manner as to cause the elevator 367 to be tilted into its dotted line position indicated in Figure 3 and shown in full lines in Figure 32. When the elevator 367 is thus tilted the balls and pins are discharged into the hopper 54, as and for the purpose previously stated.

The elevator 367 is raised by means of cables 374 (Figures 3, 12, 12A, 12B and 32) attached thereto and passing therefrom upward over sheaves 375 rotatably mounted on the sides of well 94. From the sheaves 375 the cables 374 pass over sheaves 376 and thence downward to drums 377 keyed on the rotatably mounted cross shaft 156. A sprocket wheel 155 is mounted loose on shaft 156, adjacent drum 377, and is engaged by the sprocket chain 153 previously referred to. It will be seen that sprocket wheel 155 is continuously driven in the operation of the machine. At its inner end sprocket wheel 155 is provided with a clutch member 380 adapted for cooperation with a second clutch member 381 (Figure 12) feathered on shaft 156. The clutch member 381 is provided with a circumferentially grooved collar 382 which receives pins 383 of yoke 384 of a shift lever 385 pivoted at its upper end, at 386, on a bracket 387 secured to frame member 388 carrying the bearing structure 389 for shaft 156. Shift lever 385 is of T formation, as shown. Bracket 387 has mounted thereon two solenoids 390 and 392 disposed at opposite sides of the head of shift lever 385. The solenoid 390 is controlled by a micro-switch 393 (Figure 32), which normally is open, disposed adjacent sheave 375. The solenoid 392 is controlled by a normally open micro-switch 394a (Figures 47 and 48), mounted on a bracket 600 secured to the left hand bracket structure 239. Micro-switch 394a has an operating lever 395 disposed for contact by clamp 428 fixed to the upper end of the corresponding dashpot tube 285. As the pin setting table 283 reaches its lowermost position, clamp 428 closes the micro-switch 394a. That energizes solenoid 392 (Figure 12), the core 397 of which has pin and slot connection to the outer arm of the head of clutch shift lever 385. That throws the clutch 331 in, thereby clutching the sprocket wheel 155 to the shaft 156. When that occurs, shaft 156 is driven in counter-clockwise direction, as viewed in Figure 3 and in clockwise direction as viewed in Figure 12B, for winding the cables 374 onto the drums 377, thereby raising the elevator and dumping the pins and the balls into the hopper 54, as above explained.

As the elevator 367 reaches dumping position, it engages the bill of a hook 398 (Figure 32) slidably mounted on a bracket 399 secured to the back wall 369 of the elevator well 94. The hook 398 moves forward with the elevator 367, and a finger 400 of hook 398 contacts switch lever 401, thereby closing the circuit of micro-switch 393. That energizes solenoid 390 and disengages or throws out the clutch 331 releasing shaft 156. When the elevator 367 is in its fully raised position, the bill of a hook member 402 (Figure 12B), adjacent the right side of the machine, engages beneath a pin 403 fixed to the right hand drum 377, thus locking the elevator 367 in its raised position. The hook member 402 is pivoted on a stub shaft 404 mounted on the adjacent frame member 388 and extends forward therebeyond. The hook member 402 is connected, at its forward end, by a tension spring 405 to an angle bracket 406 fixed to frame member 388. In the operation of dumping the pins from the distributor rolls into the buckets of the pin receiving table 207, previously described, the rod 166 (Figures 6 and 12B) is moved forward. In this forward movement of rod 166, a cam block 407 fixed thereon contacts an upwardly extending nose 408 at the forward end of hook member 402, depressing the forward end thereof in opposition to tension spring 405, thus disengaging the bill of hook member 402 from beneath pin 403. That releases the right hand drum 377 to permit lowering of the elevator 367, under control of means to be described presently. The bracket 406 is provided with an inwardly extending arm 409 which contacts the upper face of block 407, during contact of the inclined surface 407a thereof with nose 408 of hook member 402, to restrain the block against upward movement and assure movement of the hook member to its full releasing position, in which it is held by block 407 until completion of the pin dumping operation and return of the distributor rolls to their normal positions.

A control arm 410 also is pivoted on stub shaft 404 and carries, at its forward end, a roller 411, which enters the cable receiving groove of the associated drum 377 (Figure 12A). The roller 411 is pivoted on a headed pin 412 fixed in arm 410, this pin having a reduced stud 413 extending inward and overlying a flange 414 at the lower edge of the forward arm of hook member 402. A tension spring 415, of substantially greater strength than tension spring 405, connects the rearward end of arm 410 to the top portion of the frame member 388. When the elevator 367 is in its raised position, with the cables 374 wound onto the drums 377, the roller 411 is held in raised position by the underlying turn of the cable on the associated drum 377. That holds roller 411 raised in opposition to tension spring 415, with stud 413 spaced above flange 414. That permits of the hook member 402 being held in operative position, engaging the pin 403, by the tension spring 405. When the pit elevator 367 has been returned to its lowered position, or substantially so, the cable 374 has been unwound from the drum 377 sufficiently so that a turn thereof is no longer disposed beneath the roller 411, so that stud 413 may then move into contact with flange 414, thus locking the hook member 402 to the lever 410, the rearward end of which is then raised by the tension spring 415, thus raising the hook member 402 into such position that the bill thereof will clear the pin 403. That occurs upon lowering of the pit elevator 367 by tripping hook member 402 by means of the block 407, as above described. In that connection, it will be recalled that after three pins have passed the gate mechanism 171, the solenoid 100 is energized so that the rod 166 is moved rearward. In such rearward movement of rod 166, the block 407 is moved rearward into its position shown in Figure 12B, clear of the nose 408 of hook member 402. Thereafter, when the pit elevator 367 is again raised, the hook member 402 may be returned to its raised or latching position when roller 411 is once more raised by cable 374, by means of the tension spring 405, as has been described.

It is desirable that the rate of descent of the pit elevator 367 be controlled, for obvious reasons. To that end, I provide a spur gear 416 (Figures 12A and 12B) mounted to turn on hub 417 of drum 377, which hub 417 is fixed to shaft 156. A ring 418 is fixed to the inner face of gear 416 and is provided with interior similarly directed ratchet teeth 419. The ratchet teeth 419 cooperate with similarly directed pawls 420 pivoted in flange 421 of a collar 422 fixed on shaft 156. The pawls 420 are urged outward toward ring 418 by associated compression springs 423. Gear 416 meshes with a spur pinion 424 fixed to a sprocket wheel 425 which, with pinion 424, is rotatably mounted on the stub shaft 404. The sprocket wheel 425 receives a chain 426 passing thereabout and passing therefrom upward and rearward about a sprocket wheel 427 fixed on the forward one of the two cross feed shafts 72. It will be recalled that this shaft 72 is positively driven at predetermined speed. The direction of rotation of gear wheel 416 is counter-clockwise, as viewed in Figure 12B, so that it does not cause rotation of shaft 156. Upon release of the pit elevator 367, it moves downward by gravity thereby tending to rotate shaft 156 in counter-clockwise direction. The pawls 420 engage teeth 419 of ring 418 which, as previously noted, is fixed to gear 416. Since the rate of rotation of gear 416 is controlled by the pinion 424 in mesh therewith, the rate of descent of the pit elevator 367 is controlled by the rate of rotation of shaft 72. In that manner, I assure that the pit elevator 367 will be lowered at a sufficiently low rate to preclude possibility of injury thereto.

The rack bar 286 is secured to tube 285 by upper and lower clamps 428 and 429, respectively (Figure 46.) A screw stud 430 is secured in the lower clamp 429 and provides the anchorage 337, previously mentioned, for cable 334. A roller 431 is mounted on stud 430, at the outer side of tube 285. When the table 283 moves upward into its normal fully raised position, the roller 431 contacts the rounded lower surface 432 (Figure 25) of a supporting block 433 carried by a plate 434 pivoted at its upper end, at 435, on a second plate 436. The plate 436 is pivoted adjacent its upper end, and a short distance from its rearward edge, at 437, on a fixed plate 438 constituting an element of the main frame 50. Forward swinging of plate 434 relative to plate 436 is limited by a stop pin 439 carried by the latter plate, and forward swinging of plate 436 is limited by a stop pin 440 fixed to plate 438. The plate 434 is urged forward and normally is held in contact with stop pin 439, by a tension spring 441. This spring 441 is anchored at its forward end to plate 434 above and adjacent pivot pin 435 of plate 434 and has its rearward end attached to a pin 442 secured in plate 438 and extending inward therefrom.

The plate 436 is suitably notched at its lower rearward corner, at 444, for cooperation with the correspondingly formed upper portion of a holding pawl 445, pivoted at 446 on plate 438. A Bowden wire 447 passes, at its forward end, through a stud 448 pivoted to the lower end of an arm 449 extending downward from pawl 445, and is provided with a stop 447a secured thereon. A tension spring 450 connects the forward end of pawl 445 to a stud 451 fixed in plate 438. Tension spring 450 urges pawl 445 into operative position for engagement with plate 436. The Bowden wire 447 extends rearward from stud 448 and is secured, at its rearward end, in a stud 452 pivoted on the lower end of a downwardly extending arm 453 fixed at its upper end on a shaft 454 rockably mounted transversely of frame 50 at the back thereof. There are two arms 453, one adjacent each side of frame 50. Each pawl 445 has a rearwardly extending arm 455 to which is pivoted, at 456, a depending gravity trip pawl 457. This pawl 457 is provided, at its upper end, with an angularly disposed stop finger 458 overlying arm 455 and restraining pawl 457 against relative upward and rearward swinging movement. As will be clear, the pawls 457 are free for forward and upward swinging movement, and the lower forward edges thereof are of arcuate contour to provide camming surfaces 459.

As the sweep passes under table 283, on its rearward stroke, fingers 460, carried by and extending inward of the sweep, contact the pawls 457 swinging them upward and rearward and thereby turning the pawls 445 into releasing position. Since the plates 436 are pivoted off center, as previously noted, these plates, and with them the plates 434, swing rearwardly in opposition to tension springs 441, under the down pull exerted by the load of table 283 and the parts carried thereby. In such movement of the plates 436, the blocks 433 pass from beneath the rollers 431, thus releasing the table 283 which then moves downward by gravity, as controlled by the dashpots 284. The trip pawls 457 are then released and plates 434, and with them plates 436, are returned to normal position by the tension springs 441. Plates 436 are then locked in normal position by the pawls 445. When the table 283 is again returned to fully raised position, the rollers 431 contact the rounded lower faces 432 of blocks 433 and displace them rearwardly in opposition to tension springs 441. As soon as the rollers 431 pass above blocks 433, plates 434 are returned to normal position, underlying rollers 431, which, upon disabling of the table raising means, seat on the arcuate upper faces of blocks 433, which serve to support the table in its fully raised position shown in Figures 1 and 3, as before. In the forward or return movement of the sweep, the fingers 460 swing the pawls 457 forward and upward and pass on beyond them, without affecting the table supporting means.

The table 283, which has been termed a pin setting table, or a setting up table, comprises a flat plate 461 (Figures 19 and 19A) mounted in a frame 462 of angle section. Cap screws 463, adjustably secured in the clamps 428 at the upper ends of tubes 285, limit down travel of table 283, by contact with the upper ends of bracket structures 239, as previously explained. The plate 461 of table 283 is provided with ten openings 464 (Figure 19) therethrough, arranged correspondingly to the arrangement of the pins on the alley. The central point of each opening is coincident with the vertical axis of the corresponding bucket 218 of the overlying pin receiving table 207. The openings 464 are of sufficient size to provide adequate allowance for displacement of any pin from its spot on the alley, since if a pin were displaced to a greater extent than provided for by the opening, it would be knocked down or off of the alley and would become deadwood. Due to the considerable area of the openings in the table 283, ample allowance is made adequately to take care of any off spot pins. Each of the openings 464 of the table 283 has associated therewith a pin gripper and holding unit 465, for raising from the alley any standing pins and returning them to the precise locations from which they are raised, and for removing pins from the buckets 218 of the pin receiving table 207 and accurately placing them in their proper spot positions on the alley, as will be explained later.

Four pairs of parallel cross-threaded shafts 466 (Figure 19) are rotatably mounted on plate 461 in suitable bearing brackets 467 secured thereto, shown more clearly in Figures 30 and 30A. The shafts 466 carry pairs of opposed gripping and holding members 465a and 465b, together constituting the unit 465 above referred to. As will be understood, there is one pair of members 465a and 465b for each opening in plate 461, the members of each pair traveling toward and away from each other in the rotation of the shafts 466. Each of the shafts 466, except the front and rearmost ones, has a spur pinion 468 keyed thereon, the pinions 468 of each two adjacent shafts 466 being in mesh with each other. One shaft of each pair of shafts 466, except the front pair thereof, has secured thereon, adjacent the outer face of the associated pinion 468, a sprocket wheel 469 (Figures 19 and 19A.) Upper and lower idler sprockets 470 are mounted on suitable brackets secured to plate 461, certain of the sprockets 470 being disposed between the sprockets 469. The sprockets 469 and 470 receive a sprocket chain 471 suitably led thereabout. The chain 471 also passes about a drive sprocket 472 fixed on the front shaft 466, which is driven at appropriate speed, through suitable speed reduction gearing, as indicated in Figure 19, by an electric motor 473 mounted on plate 461. A chain tightener 474, of suitable known type, is provided and guards against objectionable slack in chain 471. As will be understood, when the motor 473 is in operation the chain 471 is driven and drives the shafts 466 in proper directions. Suitable control and timing means is provided for reversing motor 473 and operating the members 465a and 465b of the gripper and holding units 465 in proper timed relation to the operation of the other parts of the machine.

Each of the members 465a and 465b comprises a frame 475 (Figures 27 and 30), conveniently formed as an aluminum casting and shaped as shown. Two coaxial bearing collars 476 are bolted to each end of frame 475, at the lower portion thereof. The collars 476 receive needle bearings 477 (Figures 29 and 29A) which rotatably support a sleeve 478 which receives one of the shafts 466. Sleeve 478 is provided with a relatively thick collar or hub 479 having spaced bores 480 extending from one end thereof parallel with sleeve 478. Each of the bores 480 in hub 479 receives a compression spring 481 seating at its outer end against a ball 482. The balls 482, of the respective compression springs 481, normally seat in recesses 483, of spherical curvature, in the adjacent face of a ratchet ring 484 mounted on sleeve 478 and otherwise free therefrom. The other face of ratchet ring 484 contacts a bearing ring 485 of a collar 486 fixed by a set screw 487 on sleeve 478, constituting a thrust bearing for the ratchet ring 484. Hub 479 of sleeve 478 also is provided with a threaded radial bore 488 receiving a cap nut 489 fitting about shank 490 of a suitably formed dog 491 engaging the thread of shaft 466.

If the ratchet ring 484 is held against rotation, the semi-positive connection between that ring and the hub or collar 479 of sleeve 478 offers sufficient resistance to rotation of sleeve 478 to cause travel of the latter along shaft 466, when the latter is rotated, so long as such travel of the sleeve is not positively stopped. If travel of sleeve 478 is positively stopped, however, this sleeve will rotate with shaft 466, in contact with the stop, so long as the shaft is rotated in a direction tending to move the sleeve toward the stop. When the ratchet ring 484 is not restrained against turning movement, the sleeve 478 is free to rotate as a unit with the ratchet ring 484 and with shaft 466, rotation of this shaft then not imparting movement to sleeve 478 lengthwise thereof. Referring to Figures 19, 30 and 30A, the bearing brackets 467, spaced along the shafts 466 and at the ends thereof, constitute stops for positively limiting movement apart of the pin gripper and holding members 465a and 465b of the respective pairs thereof constituting the units 465.

One of the pin gripper and holding members, indicated in its entirety by the reference number 465a (Figure 27), has secured to the top thereof two vertically spaced holding jaws 492. Each of the jaws 492 has an arcuate recess 493 at its inner end, defined by a flange 494 of substantial width, adapted to fit about the neck of the pin p at one side thereof (Figure 30). The other pin gripping and holding member, indicated in its entirety by reference number 465b, is also provided, at the top thereof, with two holding jaws 495 having in the inner ends thereof arcuate recesses 496, defined by flanges 497 and adapted to fit about the neck of pin p at the other side thereof. The jaws 492 are spaced closer together than the jaws 495 so as to enter between the two latter jaws (Figure 30), in order that the two members 465a and 465b may approach each other more closely than is required for setting pins, for the purpose of removing pins from the alley and returning them to the alley in precisely the same positions thereon which they occupied at the time of removal, as will be explained later.

The members 465a and 465b are of the same construction except as to the disposition of the holding jaws thereof, and a description of one of such members will suffice. A gripping plate 498 (Figure 27), of a cross sectional contour conforming substantially to the shoulder and neck area of a pin, is secured to frame 475 of member 465a and extends inward therefrom. Each of the bearing collars 476 has an upwardly extending finger 499. A yoke 500, of channel cross section, conveniently formed of sheet metal, is pivoted at one end, by a pin 501, to finger 499 of one of the bearing collars 476. The yoke 500 extends to finger 499 of the other bearing collar 476 and is guided thereby. The yoke 500 overlies the ratchet ring 484 and carries, at about its mid-length, a detent 502 mounted on a supporting pin 503 passing through the arms of yoke 500. Detent 502 has a downwardly extending tapered nose 504 (Figure 28) for engagement between adjacent teeth of ratchet ring 484. A torsion spring 506, anchored about pin 503 and, at its upper end, bearing on yoke 500 with its lower arm bearing on collar 476, urges yoke 500 upward into position with the nose or point 504 of detent 502 clear of the teeth of the ratchet ring 484. A pin 507 is mounted in yoke 500, in upwardly extending ears 508 thereof, above and parallel with pin 503. A flanged collar 509 is eccentrically mounted on pin 507 and receives a roller 510 concentric with collar 509. This collar 509 is provided, at its inner end, with a flanged head 511 seating against the outer face of the inner ear 508 of yoke 500. The pin 507 is provided, at its inner end, with a flange 512 and with a stud 513 extending inwardly therefrom. A self-locking nut 507a screws on the outer end of pin 507 and provides, in cooperation with flange 512 thereof, means for clamping the eccentric collar 509 in adjustment about the pin 507. That provides means whereby the eccentricity of roller 510 may be adjusted so as to assure accurate positioning of point or nose 504 of detent 502 relative to the ratchet ring 484, when yoke 500 is depressed by means of bearing roller 510, as will be described presently.

A latch shaft 515 is rockably mounted in frame 475 of member 465a, adjacent the top and extending transversely thereof. A latch arm 516 is secured in each end of shaft 515 and extends downward therefrom. Arm 516 is provided with an upwardly extending shank 517 inserted through a diametrical bore 518 in shaft 515. Shank 517 also passes through two diametrical openings 519 in a cylindrical cap 520, fitting over the end portion of shaft 515 and receiving through its outer end a reduced threaded stud 521 extending from the end of shaft 515. A self-locking nut 522 is screwed on the stud 521 and bears against the outer end of cap 520, forcing the latter in along shaft 515 into tight binding contact with shank 517 of arm 516, effectively securing the latter to shaft 515. The arm 516 is provided, at its lower end, with a notch 523 disposed and adapted to receive stud 513 of pin 507. The yokes 500 at the sides of member 465a may be locked in lowered or depressed position, holding the points 504 of detents 502 engaged with the ratchet rings 484, as will be readily understood. By turning the shaft 515 into such position that the arms 516 clear studs 513, the yokes 500 are released for upward movement by the torsion springs 506.

Each of the gripper and holding units 465a and 465b is provided with a feeler 524, conveniently formed of sheet metal in major part, comprising a U-shaped supporting member 526. The arms 527 and 528 of member 526 pass through diametrically opposite openings in a sleeve 529 disposed about shaft 515 at about the mid-length thereof, and through diametrical bores in shaft 515. The interior diameter of sleeve 529 is somewhat greater than the diameter of shaft 515. Set screws 530 are threaded through sleeve 529 and bear against shaft 515, effective for forcing sleeve 529 transversely thereof into binding contact with arms 527 and 528 of member 526, adjustably securing the latter to shaft 515. A tension spring 531, anchored to the upper end of arm 528 and to an upward extension 532 of frame 475, urges shaft 515 clockwise, as viewed in Figure 27, turning movement of shaft 515 in that direction being limited by contact of arms 516 with studs 513. The upward extension 532 of frame 475 also has mounted thereon the jaws 492 or 495, as the case may be. When the yokes 500 at the sides of frame 475 are depressed, with the notched lower ends of arms 516 engaging over studs 513, the feeler 524 extends forward or inward beyond frame 475, a substantial distance beyond the pin gripper plate 493. At that time, the ratchet rings 484 are locked against rotation and the pin gripper and holding member 465a or 465b, as the case may be, will then be moved along the shafts 466 upon rotation thereof in proper direction.

A flat control bar 533 (Figures 27 to 30A, inclusive) is supported in edgewise overlying relation to the rollers 510 of the respective pin gripping and holding members 465a and 465b traveling on the respective shafts 466. There are two bars 533 for each unit 465. The bars 533 are mounted on upward extensions 534 of bearing brackets 467, at one side thereof, with their adjacent end portions overlapping. Reinforcing strips or strongbacks 535 are secured to and extend between the extensions 534 of brackets 467, at the other side thereof. Each of the control bars 533 is mounted upon extensions 534 of two adjacent brackets 467, by shouldered and headed studs 536 secured through extensions 534 and extending through inclined slots 537 in bars 533. There is also a strongback 535 adjacent each of the front and back shafts 466, and control bars 533 in cooperating relation to the pin gripper means traveling along these shafts. The strongbacks 535 are held on studs 536 by nuts 538, there being suitably disposed washers on stud 536, as shown in Figure 30A. The control bars 533 are urged in one direction by tension springs 539—one for each bar—anchored at one end thereto, and at their other end to certain of the studs 536. The slots 537 are inclined for the major portion of their length, and each is provided with a substantially horizontal locking end portion 537a. The slots 537 are so disposed that, when the control bar 533 is moved endwise by the tension spring 539, it is also moved downward (Figure 30) toward table 283 into contact with the rollers 510, thereby depressing the yokes 500 (Figure 28) and locking the ratchet rings 484 against rotation. The control bars 533 are moved in the opposite direction, by means of fingers 540 fixed to rods 541 (Figures 17 and 30) slidable in bearing blocks 542 fixed on and extending upwardly from the strongbacks 535. The fingers 540 extend through notches 543 in the upper edges of control bars 533. Slotted guide blocks 542a are fixed to rods 541 and extend downward therefrom and fit snugly over the upper portion of the respective strongbacks 535. The latter cooperate with the guide blocks 542a for restraining rods 541 against turning movement, in an obvious manner.

An arm 544 (Figure 30) is secured to each of the control rods 541, extends downward therefrom, and is provided at its lower end with a fork 545, which receives a pin 546 fixed in the upper end of an arm 547 fixed, at its lower end, on a shaft 548 rockably mounted on table 283 (Figure 19) along one side thereof. The first or front shaft 466 does not have any pinion 468 thereon, and the last or rearmost shaft 466 is provided with a spur pinion 549 keyed thereon (Figure 19). Pinion 549 meshes with a pinion 550 keyed on a stub shaft 551 rotatably mounted in bearing brackets 552 secured to plate 461 of table 283. A bevel gear 553 (Figures 19, 31 and 31A), keyed on stub shaft 551, meshes with a bevel gear 554 keyed on a stub shaft 555 rotatably mounted in a bracket structure 556, also secured to plate 461. A spur pinion 557, keyed on stub shaft 555, meshes with a spur gear 558 rotatable on a shaft 559 disposed above and parallel with shaft 548. Stub shaft 559 is secured in a bracket 558a mounted on pin setting table 283, this bracket 558a also providing a bearing for the shaft 548. A cam 560 is loose on shaft 559, at the outer face of gear 558. The cam 560 is provided with an arcuate surface providing a dwell 561 of considerable length, interrupted adjacent one end by an arcuate recess 562, and has an arcuate camming surface 563 leading inward toward the shaft 559 from dwell 561, from the end thereof adjacent recess 562. This cam 560 cooperates with a roller 564 mounted in the upper end of an arm 565 fixed at its lower end to shaft 548. Two pins 566 and 567, secured to gear 558, cooperate with cam 560 for effecting proper movement of the respective control rods 541 in proper timed relation to the operation of the pin gripper and holding members 465a and 465b.

Normally, the setting up table 283 is in its fully raised position, as in Figures 1, 3 and 40, with the pin gripper and holding members 465a and 465b in fully opened position and in contact with the bearing brackets 467 for the shafts 466, as in Figure 19. The feelers 524 are then in projected position and the latch arms 516 (Figures 27 and 28) are engaged over studs 513, holding detents 502 in engagement with the ratchet rings 484, locking them against rotation. At that time, cam 560 is in its position shown in Figure 31A, with roller 564 engaging in notch 562. Arm 565 then holds shaft 548 in such angular position that arms 547 are held in vertical position, in opposition to a tension spring 568 extending from one of the arms 547 and anchored to table 283. The control bars 533 are then held in raised position, in opposition to the tension springs 539, to which raised position they have been moved by the inclined slots 537 thereof in cooperation with the studs 536. With the bars 533 in raised position, the yokes 500 are held lowered or depressed by the pins 507 and arms 516, with the ratchet rings 484 then locked against rotation, as above explained.

In order to start the resetting operation, there being pins in all of the buckets 218 of the pin receiving table 207, the reset button 362 (Figure 42) is pressed. That sets the motor 473 (Figure 19) in operation and also sets the sweep in operation. The starting fields of motor 473 are so adjusted, at the start of the resetting operation, that the shafts 466 are driven in proper directions to cause movement of the pin gripping and holding members 465a and 465b toward each other. As these members 465a and 465b move together, jaws 492 and 495 thereof enter the slots 261 of the bucket 218 (Figures 17 and 30). Shortly thereafter, the feelers 524 contact the pin bucket and trip the arms 516, releasing the yokes 500 (Figures 27 and 28), which are raised to inoperative position by the tension springs 506. That releases the ratchet rings 484 and stops the members 465a and 465b at opposite sides of the pin and equidistant therefrom. After all of the pin gripping and holding members have thus been stopped in proper relation to the respective pins, the pin 566 of gear 558 picks up the cam 560 and moves it from its position shown in Figure 31A to its position shown in Figure 31. That releases roller 564 from recess 562 and permits it to move inward along cam surface 563 of cam 560, with corresponding turning of shaft 543. Shaft 543 is thus turned into such position that the control bars 533 are moved lengthwise and into their lowered positions, by tension springs 533, as shown in Figures 28 and 30. Also, as the control bars 533 move lengthwise and downward, the rods 541 move lengthwise and the doors 262 of the pin buckets 218 are released, as will be explained more fully later. In connection with the lowering of the control bars 533, it is to be noted that gear 558 is rotated clockwise, as viewed in Figure 31, during the movement of the members 465a and 465b toward each other. When the control bars 533 are lowered in the manner stated, the yokes 500 are depressed, again locking the ratchet rings 484 against rotation. In the continued operation of motor 473, the members 465a and 465b are moved together, until angle stop members 569 (Figures 27 and 30) fixed thereto contact the opposite sides of the body 260 of the pin bucket 218, thereby positively stopping inward movement of such members. The members 465a and 465b are then so disposed that the jaws thereof extend about the neck of the pin in close proximity thereto but not in gripping contact therewith. When inward travel of the members 465a and 465b is stopped, slippage occurs during the continued operation of motor 473, which then remains in operation for a short time only, sufficient to assure that the gripper and holding members of all of the units travel their full distance toward each other. Thereafter, the field of motor 473 is reversed, by means which will be explained later, the motor 473 is stopped and the table 283 is released and moved downward to its fully lowered position.

As the table 283 approaches its full lowered position, the pins contact the alley so as to be seated accurately thereon, it being recalled that the jaws fit about the necks of the pins rather loosely. As soon as the pins have been thus seated on the pin block of the alley, as indicated in Figure 3, down travel of the table 283 is stopped by contact of the stops 463 with the upper ends of the bracket structures 239. The motor 473 is then set into operation to return the pin gripper and holding members 465a and 465b to fully opened position. When the members 465a and 465b reach fully opened position, they are positively stopped by the bearing brackets 467 as above explained. During movement of the members 465a and 465b to open position, the gear 558 is being turned counterclockwise as viewed in Figure 31. Immediately after contact of the members 465a and 465b with the bearing brackets 467, pin 567 picks up cam 560 and moves it counterclockwise about shaft 559, to its position shown in Figure 31A, with roller 564 then engaging in recess 562. That raises the control bars 533 into the position shown in Figures 27 and 30. Immediately thereafter the motor 473, the fields of which have been reversed, is stopped. The clutch 300 (Figure 14) is then thrown in and table 283 is returned to its fully raised position, in which it is then held by the rollers 431 and the blocks 433 and associated parts, in the manner previously described. It will be seen that in the resetting operation, the table 283 moves from its normal fully raised position downward to reset position, and is then returned directly to fully raised position, as indicated in the diagram of Figure 34.

In the deadwood operation, the table 283 starts from its fully raised position, as in the resetting operation. When the deadwood button 570, disposed adjacent the foul line, as in Figure 42, is pressed, a solenoid 571, mounted on a bracket 572 (Figure 25) fixed to a cross member 223 at the back of pin receiving table 207, is energized. The core 573 of solenoid 571 has pin and slot connection 574, at its rearward end, to the upper end of an arm 575 fixed on shaft 454. When solenoid 571 is energized, shaft 454 is turned, pulling the Bowden wires 447 rearward. That turns the pawls 445 into releasing position and thereby releases the table 283 for downward movement, in the manner previously described. Also the pusher clutch solenoid 353 (Figure 13) is de-energized, when the deadwood button is pressed, to guard against operation of the pusher during the deadwood operation. It is to be noted that when the deadwood button 570 is pressed, the timer motor 473 is not set in operation. Consequently, the pin grippers 465a and 465b remain open until table 283 is in its deadwood position, at which time the motor 473 is set in operation, for closing the grippers 465a and 465b about live pins standing on the alley, as will be explained more fully presently.

When the solenoid 571 turns shaft 454, a trip finger 576, fixed on the right hand end of shaft 454 (Figure 25), contacts the lower end portion of a hook lever 577 (Figures 22 and 23) pivoted, at its upper end, on a stub shaft 578 carried by bracket 579 fixed to the main frame 50 of the machine. The hook lever 577 is provided, at its forward edge and a short distance from its upper end, with an arcuate recess 580 adapted for reception of a pin 581 mounted in a fork 582 at the lower end of a finger 583 extending downward from the rearward end of an arm 584 pivoted at its forward end, at 585, on a bracket 586 fixed to the main frame 50 of the machine. A hook 587 is pivoted at its upper end on stub shaft 578, at the outer face of the hook lever 577. The bill 588 of hook 587 is disposed somewhat lower than the recess 580 of hook lever 577 and, like the latter, is adapted to receive the outwardly projecting portion of pin 581. The hook 587 has rigid therewith a downwardly extending arm 589, connected at its upper end to the upper end of hook 587, by an element 590 which is offset inwardly at 591. Element 590 provides a stop limiting turning movement of hook 587 under the influence of a tension spring 592 connecting arm 589 to member 593 constituting a downward extension of bracket 579. Normally, the pin 581 is in recess 580 of hook lever 577, holding the rearward end of arm 584 in its fully raised position. When the solenoid 571 (Figure 25) is energized so as to rock shaft 454, as above explained, the hook lever 577 is swung rearward, thus releasing the pin 581. That permits arm 584 to drop into a lower position, in which the pin 581 is engaged and retained by the bill 588 of hook 587.

A rack bar 595 (Figures 22 and 24) is slidably mounted in a guide 596 carried by the main frame 50 of the machine. The teeth of rack bar 595 are directed downward and mesh with a spur pinion 596a fixed on the right hand end—as viewed from in front of the machine—of the shaft 292. The rack bar 595 is mounted, for ease of movement, on supporting rollers 597 and is restrained against upward movement by a roller 598 mounted on frame 50 in overlying relation to the spur pinion 596a. The pinion 596a is grooved circumferentially, as is shown more clearly in Figure 14, to accommodate the rollers 597. In the downward movement of table 283, the shaft 292 is rotated, through the rack bars 286 on the dashpot tubes 285, and associated parts (Figures 10 and 14), so as to cause rearward movement of the rack bar 595. As the rack bar travels rearward, it contacts arm 589 and swings the hook 587 rearward from beneath the pin 581. That releases the arm 584 which then drops downward into position upon the top of the rack bar. The rack bar 595 then moves a further distance rearward until it contacts the forward edge 594 of finger 583, which then serves as a stop limiting rearward travel of the rack bar. The latter then serves to hold the table 283 in what I term its deadwood position, indicated in Figure 34, spaced above the alley a proper distance for removing therefrom standing pins.

As the table 283 reaches its deadwood position, the finger or pass-by pawl 396, mounted on upper clamp 428 of the left dashpot 284 (Figures 47 and 48), contacts the operating lever of a micro-switch 599 mounted on a bracket 600 extending upward from the rear portion of the bracket structure 239 at the left hand side of the frame 50. That closes the micro-switch 599 and keeps it closed so long as the table 283 is in its deadwood position. The closing of the micro-switch 599 sets the motor 473 (Figure 19) in operation, thereby setting in operation the timer means previously referred to and to be explained more fully later. The pin gripper members 465a and 465b of the respective units 465 then move toward each other and grip the pins standing on the alley about the neck and shoulder portions thereof, by means of the gripping plates 493 previously referred to. As the members 465a and 465b approach the pins therebetween, the feelers 524 (Figures 27 and 30) are tripped and members 465a and 465b are stopped on opposite sides of and equidistant from the pin therebetween. That is of particular importance in respect to setting off-spot pins, which requires that the members 465a and 465b travel different distances toward the pins before the feelers thereof are tripped. Thereafter, the control bars 533 are lowered, the members 465a and 465b are moved into gripping engagement with the pins, the field of motor 473 is reversed, and motor 473 is then stopped, with the control bars 533 remaining in lowered position. With reference to the members 465a and 465b which do not have pins between them, an angle trip finger 691 (Figure 27), carried by each of the two members contacts a trip rod 692 extending from one side of the feeler 524 of the other member, whereby the feelers of both members are tripped.

After the pin gripping members 465a and 465b have been completely closed and the field of the motor 473 has been reversed, and shortly before the motor is stopped, the timer (Figure 50) closes a micro-switch 603 included in the timer mounted on the table 283. Closing of the micro-switch 603 energizes a solenoid 604 (Figure 14) mounted on a bracket 605 supported on bracket structure 239 at the left side of the machine. Core 606 of solenoid 604 has operating connection at its lower end to a shift lever 607 fixed on a stub shaft 608 rockably mounted in bracket 605. A shift fork 609, fixed on stub shaft 608 and extending upward therefrom, has known operating connection to a member 610 of the clutch 300, previously referred to. This clutch, as has been stated, is of known type and need not be described in detail. When the shift lever 607 is actuated by the solenoid 604, the clutch 300 is thrown in or engaged, and shaft 292 is then driven in pin setting table raising direction, in the manner previously described. The table 283 is thus raised from its deadwood position, lifting the live wood or standing pins from the alley. When the table 283 has been raised a short distance, a pass-by pawl 611 mounted, with the pass-by pawl 396, on a plate 612 fixed to and extending rearward from the upper clamp 428 of the left hand dashpot tube 285 contacts the operating lever of a micro-switch 613 mounted on a bracket 612a mounted on the angle upright 304, thus closing that switch. The closing of the micro-switch 613 energizes a second solenoid 614 (Figure 14) mounted on the bracket 605. The core 615 of solenoid 614 has operating connection, at its upper end, to the shift lever 607. Accordingly, when solenoid 614 is energized, the clutch 300 is thrown out or disengaged, releasing the table 283, which may then move downward a short distance by gravity.

The upward movement of the table 283, just above refered to, from its deadwood position, is of such extent that the rearward end of the rack bar 595 (Figure 22) is moved forward of a forward stop shoulder 616 provided at the lower edge of the arm 584. It will be remembered that, at this time, arm 584 is resting on the upper face of rack bar 595 so that, in the forward movement of this bar, when its rearward end passes forward beyond shoulder 616, the arm 584 drops by gravity into such position that the shoulder 616 is then in the path of rearward travel of the rack bar. Accordingly, when the clutch 300 is now thrown out, the table 283 descends a short distance by gravity and the rearward end of rack bar 595 then contacts shoulder 616, thus locking the table 283 against further downward movement and then holding it in what I term its intermediate position, somewhat higher than its deadwood position, as shown in the diagram of Figure 34, sufficient to assure that the blades of the sweep, to be described later, will readily pass beneath table 283 and the pins then held therein.

While the table 283 is held in its intermediate position above referred to, the alley is swept by means to be explained more fully presently, comprising sweep carriages 617 which pass along rails 52 rearward of the alley (Figures 22 and 25) beneath the table 283 and then return to their normal forward position. One of the sweep carriages 617 carries a roller 618 disposed to contact the lower end of an arm 619 mounted for swinging movement on the cross shaft 454. Arm 619 has, at its upper end, a cam 620 rigid therewith. This cam 620 is disposed to contact a roller 621 mounted in fork 582 on pin 581, when the arm 584 is in its full lowered position. It will be clear from what has been said, that cam 620 raises the arm 584 thereby releasing the rack bar 595 which is then free to move rearward. The table 283 then moves downward, by gravity, to its deadwood position, in which it is held by contact of the rearward end of the rack bar with the forward edge of fork 582. As the table 283 again reaches its deadwood position, the micro-switch 599 is again closed, starting the motor 473, the field of which has been reversed, as above noted. The motor then operates the timer and opens the pin gripper members 465a and 465b, thus releasing the pins and setting them upon the alley in precisely the same positions which they occupied thereon when they were removed therefrom in the first part of the deadwood operation, in the manner above described.

When the pin gripping members have been opened sufficiently to release the pins, or shortly thereafter, the micro-switch 603 of the timer is again closed and energizes the solenoid 604 thus throwing in the clutch 300 and causing the table 283 to be raised. Also, a micro-switch 638 of the timer (Figure 50), connected in series with the micro-switch 613 (Figures 47 and 48), is opened before the micro-switch 613 is actuated by the pass-by pawl 611 in the upward travel of the table 283. The table 283 is then returned to its full raised position, it being understood that the field of motor 473 has been reversed and that the motor has been stopped with the pin grippers in full opened position. As the table 283 reaches its full raised position, a roller 623 (Figure 14) carried by an arm 624 pivoted at 625a in a bracket 625 secured to plate 461 of table 283, and provided with suitable adjusting means 626, contacts an inclined cam surface 627 of a head 628 at the lower end of an arm 629 extending downward from and rigid with clutch shift fork 609. That moves the clutch member 610 into disengaged position, thus disengaging the clutch 300. The rollers 431 are, at that time, a short distance above the blocks 433 and upon disengagement of clutch 300 the table 283 moves downward a short distance, until the rollers 431 rest upon the blocks 433 (Figure 25), thus supporting the table 283 in its fully raised position, in the manner previously described. It will be seen that, during the deadwood operation, the table moves from its fully raised position downward to deadwood position, in which the standing pins are picked up from the alley, is then raised to intermediate position and held there while the alley is swept, is again lowered to deadwood position for setting the live pins on the alley, and is then returned to fully raised position; as indicated in Figure 34.

The rearward roller 597 in rack 595 (Figure 22) is disposed in a slot 630 of substantial length opening through the top of rack bar 595 at the midwidth thereof. In order to accommodate the forward roller 597, the spur pinion 596a is provided with a central circumferential groove 631, as previously noted. A pass-by gravity pawl 632 is pivoted at its upper end, at 633, on an upward extension 634 of arm 584. In the backward movement of rack bar 595, the lower end of pawl 632 rests upon rack bar 595 during movement thereof a short distance, and then enters the slot 630. In the continued rearward travel of rack bar 595, the rearward roller 597 passes rearward beyond the pawl 632. Upon raising of the table 283 to its uppermost position, in either the resetting operation or the deadwood operation, the rack bar 595 is returned to its full forward position. During such forward movement of the rack bar, the roller 597 contacts the rearward edge of pawl 632 and swings the latter upward and forward, into contact with a pin 635 fixed in extension 634 adjacent the front thereof. That swings the arm 584 upward so that the pin 581 contacts the hook lever 577 and displaces it rearward, in opposition to a tension spring 636 anchored to the lower end of that lever and to the main frame 50. When the pin 581 passes above recess 580, the hook lever 577 is moved forward by the tension spring 636 and the pin 581 is then retained in recess 580, holding the arm 584 in its normal fully raised position. That completes the deadwood operation and the table 283 is then in its fully raised position, with the pin gripper members in open position ready for either a resetting operation or a deadwood operation, as required. During the resetting operation, previously described, the arm 584 remains in its normal raised position in which it is held by the hook lever 577.

Referring further to the resetting operation, with the table 283 in its fully raised position and the pin gripper members 465a and 465b fully opened, the control bars 533 are held in raised position by fingers 540 and rods 541, which are then held in right hand position, as viewed from the front of the machine, by arms 544 (Figure 31) in cooperation with pins 546, arms 547, shaft 548 and cam 560, as previously described. When the reset button is pressed the timer is set into operation, the pin gripper members 465a and 465b are closed, the field of the motor 473 is reversed and the motor is stopped. Shortly before the motor 473 is stopped, pin 566 of gear 558, which is now turning in clockwise direction as viewed in Figure 31A, picks up the cam 560 releasing arm 565 and permitting movement of rods 541 toward the left, as viewed from the front of the machine, by the tension spring 568 and the tension springs 539. The movement of rods 541 toward the left moves trip arms 637 (Figure 17), secured on and extending upward from rods 541, into contact with lateral extensions 281a of trip fingers 281, thus releasing the bucket doors 252 for opening thereof. As the bucket doors are thus released, the control rods 533 are also released and are moved toward the left by the tension springs 539 (Figure 30), being also moved downward by the studs 536 in cooperation with the slots 537, the substantially horizontal end portions 537a of which serve to hold the control bars 533 in their lowered position. After the pin gripping members 465a and 465b have been closed and the motor 473 has been stopped, the pin setting table 283 is conditioned for downward movement, as previously explained. During the first part of the downward movement of table 283, the trip arms 637 on the rods 541 move downward out of contact with the lateral extensions 281a of trip fingers 281 and the doors of the pin buckets 218 are again locked closed in the manner previously described.

It will be recalled that in the deadwood operation the table 283, after the pin grippers 465a and 465b have been closed about pins standing on the alley, is raised to an intermediate position. The micro-switch 613 (Figures 14, 47 and 48) functions to stop the upward travel of table 283 when it has been raised a short distance above its intermediate position. If this micro-switch 613 failed, for any reason, to function properly the table 283 would be raised to its uppermost position thereby causing damage to the pin buckets and associated parts by the pins held between the gripper members 465a and 465b. In order to avoid that risk, I provide a normally open micro-switch 638 (Figure 50) on the timer connected in series with a micro-switch 639 (Figures 47 and 48) mounted on the bracket plate 612a immediately above micro-switch 613, and with a motor starter 640 (Figure 10) of suitable known type mounted on the main frame 50 and appropriately connected to the main motor 149 for starting and stopping the latter. When the pin grippers 465a and 465b are closed on the pins, the micro-switch 638 on the timer also is closed, this micro-switch being open only when the pin grippers 465a and 465b are fully opened. In the event of failure of the micro-switch 613 to function properly in the travel of the table 283 to its intermediate position, the pass-by pawl 611 will close the normally open micro-switch 639, thereby actuating the motor starter 640 and stopping the motor 149, thus preventing the possibility of damage and giving opportunity to correct the difficulty with respect to micro-switch 613.

The sweep means, previously referred to, comprises the rails 52 (Figure 1) secured to the brackets 51 on kickbacks D and extending therefrom forward along the separator strips 53 in overlying relation thereto. Rail 52 is supported at its forward end by an upright 641 extending between and secured to rail 52 and separator strip 53, as is shown more clearly in Figure 35. A carriage 617 is mounted, by flanged rollers 643 (Figure 37), on each of the rails 52 for movement lengthwise thereof. Two sprocket wheels 644 are rotatably mounted on the upper portion of carriage 617, at the inner face thereof. A sprocket wheel 645 is mounted on carriage 617, at the inner face and adjacent the bottom thereof, between the sprockets 644. A bevel gear 646, fixed to the inner face of sprocket wheel 645, meshes with a bevel gear 647 (Figure 37) fixed on the lower end of a sleeve 648 rotatably mounted in a hub 649 carried by an arm 650 integral with carriage 617 and extending inward therefrom. The sleeve 648 passes through lower thrust washers 651, confined between the lower end of hub 649 and the bevel gear 647, and upper thrust washers 652 confined between the upper end of hub 649 and a stop collar 653 fixed on the upper end of sleeve 648. Sleeve 648 is thus restrained from endwise movement in either direction. The sleeve 648 is interiorly threaded and receives the upper threaded portion 654 of a rod 655 screwing therethrough. The rod extends downward through a sleeve 656 rigid with the carriage 617, at the lower portion thereof, and spaced inward a short distance therefrom. Sleeve 656 is provided with a bushing 657 fixed thereon. This bushing 657 is provided with two diametrically opposite lengthwise spiral slots 658 which receive the end portions of a pin 659 extending through rod 655 diametrically thereof. It will be apparent that when the rod 655 is moved vertically through the bushing 657, in either direction, it will also be turned about its axis.

Normally, the rod 655 is in its raised position shown in Figure 35, at which time a sweep blade 660, appropriately fixed to the lower portion of rod 655 and extending substantially radially therefrom, is disposed above and adjacent separator strip 53 substantially parallel therewith. Upon rotation of sleeve 648 in proper direction, the rod 655 is moved into its lowered position and is simultaneously turned about its axis through approximately 90°, so that the blade 660 then extends across the alley A, as indicated in Figure 36, in proximity to the upper face thereof. Conversely, when the sleeve 648 is turned in the opposite direction, rod 655 is returned to its raised position, and is simultaneously turned through an angle of approximately 90°, thus restoring the blade 660 to its normal position previously referred to.

A sprocket chain 661 passes over the sprocket wheels 644 and thence downward under and about the sprocket wheel 645. From the forward sprocket wheel 644 the chain passes over a sprocket wheel 662 appropriately mounted at the forward end of the rail 52. From the sprocket wheel 662 the chain 661 passes downward under and about a sprocket wheel 663 also mounted at the forward portion of the rail 52, appropriately formed to that end. From the sprocket wheel 663 the chain 661 passes rearward of the alley under and about a sprocket wheel 664 (Figures 1 and 3) mounted on a bracket 665 at the rear of frame 50. From the sprocket wheel 664 chain 661 passes upward over a sprocket 664a mounted on the upper portion of bracket 665, thence upward over a sprocket 666 (Figure 38) fixed on a sweep drive shaft 667 rotatably mounted on frame 50 transversely and at the back thereof. From the sprocket 666 the chain 661 passes downward (Figure 3) in back of and about a sprocket wheel 668 mounted on bracket 665 and passes thence forward (Figures 1 and 35) to the rearward one of the two sprockets 644 on the carriage 617.

The chain 661 passes through the forward and rearward end portions of two slotted blocks 669 (Figures 35 and 35A) fixed to the inner face of carriage 617 adjacent the sprocket wheels 644. Two pairs of stop lugs 670 are secured to the sides of appropriately spaced links of the respective chains 661 for cooperation with the blocks 669, for establishing driving connection of chain 661 to the carriage 617. When the drive of the chain 661 is such that the upper run thereof is traveling forward, one pair of lugs 670 engages the block 669 adjacent the rearward sprocket 644, for moving the carriage 617 forward along the rail 52, from the rear thereof, and when the chain 661 is traveling in the opposite direction, the other pair of lugs 670 engages the block 669 adjacent the forward sprocket 644 for moving the carriage 617 rearward along the rail 52, from its forward position. The pairs of lugs 670 are, of course, appropriately spaced along the chain 661 so that the carriage 617 will be moved in proper direction and in proper timed relation to the operation of the machine as a whole.

When the carriage 617 is in its normal position at the forward end of rail 52, and the rod 655 is in its normal raised position, as shown in Figures 1 and 35, a collar 671 fixed on rod 655 overlies a fork 672 straddling rod 655, at the rearward end of an arm 673 of a bell crank 674 pivoted on a bracket 675 fixed to the upright 641. The other arm 676 of bell crank 674 is connected by a yieldable link 677 of known type to an arm 678 fixed to a rod 679 rockably mounted at its lower end in a bearing member 680 fixed to separator 53 and, at its upper end, in a sleeve 681 of a bracket 682 fixed to the forward end of rail 52, this bracket constituting, in effect, a forward extension of rail 52 and carrying the sprocket wheels 662 and 663 previously referred to. A torsion spring 683, disposed about the upper portion of rod 679 and engaging arm 678 and bracket 682, normally holds the rod 679 in such angular position that a gate member 684, secured to the lower portion of rod 679 and extending substantially radially therefrom, is disposed within a corresponding recess 685 provided in the inner face of the separator 53.

When the chain 661 is driven in such direction that the upper run thereof travels rearward of the alley, the sleeve 648 is rotated in such direction that the rod 655 and the sweep blade 660 carried thereby are moved into lowered position, with blade 660 extending across the alley as previously described. When this occurs, the collar 671 moves arm 673 of bell crank 674 downward and the rod 679 is turned, in opposition to torsion spring 683, into such position that the gate 684 extends across the alley from one side thereof at an angle inclined forward thereof, as indicated in dot and dash lines in Figure 36. In the downward movement of arm 673, a finger 686 extending forward from the bell crank 674 is swung upward and a stud 687 secured in finger 686 contacts the bill 688 at the lower end of arm 689 of a bell crank 690 pivoted at 691 on a bracket 692 secured on upright 641 above the bracket 675. Bell crank 690 is urged in clockwise direction by a tension spring 699a connected to upper arm 693 of bell crank 690 and to bracket 675. The upper arm 693 of bell crank 690 has pin and slot connection to the lower end of core 694 of a solenoid 695 mounted on the bracket 692. Core 694 is normally in its lower position, to which it is moved by gravity and spring 699a, and is effective for holding the bell crank 690 in its position shown in Figure 35. In the upward movement of finger 686, the stud 687 displaces arm 689 rearward until the stud passes above bill 688 of that arm, at which time the bell crank swings forward a short distance, into position with bill 688 engaging under stud 687, effective for holding the bell crank 674 in position with the arm 673 thereof in its depressed or lowered position. The two gates 684 then extend across the alley A, at the front of the rails 52, in forwardly converging relation, with their inner ends in contact, effective for deflecting a ball rolled down the alley from the forward end thereof. The gates thus serve to protect the setting up table 263 and associated parts during the operation of the machine.

The shaft 667, previously referred to, is provided with a threaded portion 696 (Figure 38) which receives an interiorly threaded hub 697 provided with a downward extension 698, which is slotted and receives the upper edge portion of a bracket plate 699 mounted on frame 50. A compression spring 700 is mounted about shaft 667, between hub 697 and a collar 701 feathered on shaft 667, this collar and hub 697 having end extensions receiving the end portions of spring 700. Collar 701 is mounted in the upper end of a fork 702 rigid with a lever 703 pivoted adjacent its upper end on the bracket plate 699. Lever 703 is provided at its lower end with a fork 704 having pin and slot connection 705 to a shift rod 706 extending across the main frame 50 and slidable in bearing members 707 and 707a secured to the bracket plate 699 and to frame 50. A second compression spring 708 is mounted about shaft 667 and is confined between hub 697 and a collar 709 feathered on shaft 667 and having suitable connection to a fork 710 rigid with a lever 711 pivoted adjacent its upper end on the bracket plate 699. Lever 711 is provided at its lower end with a fork 712 having pin and slot connection 713 to shift rod 706. A double clutch 714 of known type, preferably that known commercially as a "Maxitorq" clutch, is mounted on shaft 667 at the left hand end portion thereof, as viewed from in front of the machine. The clutch 714 comprises a shift collar 715 having appropriate connection to a fork 716 rigid with a clutch shift lever 718 pivoted adjacent its upper end on the bracket plate 699. The lever 718 is provided, at its lower end, with a fork 719 straddling the shift rod 706 and having pin and slot connection 720 thereto.

When the sweep rods 655 are in their forward position with the sweep blades 650 extending along the separator strips 53, a pin 721 (Figure 38) secured through rod 706 diametrically thereof, is disposed with its end portions in the center notches 722 of head 723 of a latch member 724 pivoted at 725 on the bracket plate 699. The head 723 of latch member 724 is of substantially inverted U shape in cross section and straddles the rod 706. Head 723 is provided at the lower portion of each of its arms with the central downwardly opening notch 722, just referred to, and with two downwardly opening notches 725 and 726, one adjacent each end. Below the notches just mentioned, each arm of head 723 is provided with a lengthwise slot providing an upwardly inclined surface 727 leading to an upwardly opening notch 728 underlying and of substantially greater length than notch 726. When the pin 721 is in the notches 722 of head 723, the shift rod 706 is in its neutral position, with the parts then occupying their relative positions shown in Figure 38. A tension spring 729, anchored at its upper end to a bracket 730 secured to cross bar 223 of the pin receiving table 207 and, at its lower end, to the latch member 724, at the end thereof remote from head 723, normally holds the latch member in its lower position shown. Head 723 of latch member 724 is provided with an upwardly extending finger 731 having pin and slot connection 732 to the lower end of core 733 of a solenoid 734 mounted on bracket plate 699.

The double clutch 714 also comprises two clutch members 735 and 736 normally free from shaft 667. The clutch member 735 has secured thereto a sprocket wheel 737 receiving a chain 738 (Figures 3 and 38) passing about a sprocket wheel 739 keyed on the continuously driven uni-directional roll 106 previously mentioned. The clutch member 736 has secured thereto a spur gear 740 meshing with a spur gear 741 keyed on roll 106. It will be seen that when member 735 is clutched to shaft 667 the latter will be driven in one direction from roll 106, and when clutch member 736 is clutched to shaft 667 this shaft will be driven in the opposite from roll 106. In the neutral position of the parts shown in Figure 38, both of the clutch members 735 and 736 are free from shaft 667, and hub 697 is positioned a substantially smaller distance from collar 709 than from collar 701, so that the compression spring 708 is under substantially greater compression than the compression spring 700.

In order to initiate the resetting operation, the reset button 362 is pressed momentarily, thus starting the motor 473 and setting the timer in operation and immediately closing a microswitch 742 (Figure 50) of the timer. Closing of switch 742 energizes the solenoid 734 through microswitch 764 (Figures 38 and 39), thus raising the latch member 724 and releasing the pin 721. When that occurs, the collar 709 is forced toward the double clutch 714 by the energy stored in the compression spring 708. That turns the lever 711 in counterclockwise direction, as viewed in Figure 38, thus shifting the rod 706 toward the right, until pin 721 contacts the wall of head 723 at the right end thereof. This movement of rod 706 turns the shift lever 718 in counterclockwise direction thus clutching the clutch member 736 to shaft 667. This shaft 667 is then driven by the spur gear 741, from roll 106, in proper direction to move the sweep carriages 617 and the parts carried thereby rearward along the alley, for performing the sweeping operation. The solenoid 734 is energized but momentarily so that the latch member 724 is returned to its normal latching position, by the tension spring 729, when shift rod 706 has been moved to its right hand position, so that the end portions of pin 721 are then engaged and retained by the notches 725 of head 723.

The sweep blades 660 are first extended across the alley, as above described, and the carriages 617 are then moved rearward along the alley so as to sweep the pins and balls therefrom into the pit. During the rearward travel of one of the sweep carriages 617 along the rail 52, pass-by pawl 743 (Figure 35) mounted on such carriage closes a normally open micro-switch 744 (Figure 1) mounted on the rail 52. The micro-switch 744 is connected in series with a micro-switch 745 (Figures 47 and 48) mounted on bracket 600 adjacent micro-switch 599, and with the motor starter 640 (Figure 10) which, as previously noted, functions alternately as a starter for starting motor 149 and as a circuit breaker for stopping motor 149. In the event the pin setting table 283 is not then raised from its deadwood position, for any reason, the micro-switch 745 will be held closed by a finger 746 fixed to and extending rearward from plate 612 between the pass-by pawls 396 and 611. With table 283 in deadwood position and micro-switch 745 closed, when the micro-switch 744 is closed, by the pass-by pawl 743, in the rearward travel of the sweep carriage 617, the motor starter 640 will be energized. The motor starter 640 then functions as a circuit breaker and opens the circuit of the motor 149, thus stopping the operation of the machine and thereby guarding against damage which might otherwise occur.

In the continued rearward travel of the sweep carriage 617, assuming table 283 to have been properly raised from deadwood position, the pass-by pawl 743 closes a micro-switch 746 (Figure 1) positioned adjacent the rearward end of rail 52 and connected in series with solenoid 734 (Figure 38). That energizes solenoid 734 again raising the latch member 724 releasing the pin 721, so that the shift rod 706 is then moved toward the left by compression spring 700. In the leftward movement of the shift rod 706 the pin 721 enters notch 726 of the latch member 724, which has been, by that time, returned to its normal lowered position. Also the leftward movement of rod 706 turns the clutch shift lever 718 in clockwise direction, thus declutching the clutch member 736 from shaft 667 and clutching the clutch member 735 to shaft 667. This shaft 667 is then driven, through the sprocket wheels 737 and 739 and the chain 738 in the opposite direction, so that the upper run of the chain of the respective sweep members is then driven forward.

After closing of the micro-switch 746, there will be a slight delay before the clutch member 735 is effectively clutched to shaft 667, and during that delay each of the sweep carriages 617 continues to travel rearward a short distance. In the continued rearward travel of the carriage 617, a rearwardly directed gravity pawl 747 (Figures 25, 35 and 35A) drops into a notch 748 in the upper edge of carriage 617, thereby restraining the carriage against forward movement. A guide finger 749, pivoted at its lower end to pawl 747, is slidable through a guide bracket 750 mounted on frame 50. The finger 749 is provided with an outwardly extending tab 751 which, in the position in which carriage 617 is held by pawl 747, is disposed in overlying relation to the upper end of sweep rod 655. An abutment member 752 is adjustably secured through tab 751 in vertical alignment with the sweep rod 655. Since the carriage 617 is restrained against forward movement by pawl 647, when the upper run of chain 661 moves forward, the carriage 617 remains stationary while the sleeve 648 is rotated in proper direction to cause upward travel therethrough of rod 655. As has been previously explained, in this upward travel of rod 655 the rod is turned through an angle of approximately 90° by pin 659 in cooperation with the inclined slots 658 in the bushing 657. As the sweep blade 660 is folded into its retracted position above the separator strip 53 and parallel with it, the upper end of rod 655 contacts the abutments 752 and raises the pawl 747 into releasing position. At that time the lugs 670 on chain 661 pick up the rearward block 669 and the carriage 617, with the parts carried thereby, is returned by the chain 661 to its normal position at the forward end of rail 52.

As the left sweep carriage 617 travels forward, a pass-by pawl 753 (Figures 1 and 35) pivoted thereon closes a normally open micro-switch 754 mounted on the rail 52 and connected in series wtih the solenoids 695. The solenoids 695 are thus momentarily energized so that the core 694 of each solenoid is raised, disengaging the bill 688 of bell crank 690 from stud 687. That releases the bell crank 674 and the gate rod 679 is then returned to its normal position, by the torsion spring 683, with each gate 684 then positioned within the recess 685 of the separator strip 53. The carriage 617 then continues its forward travel to its normal position, at the forward end of rail 52 and, as it reaches that position, contacts the rearward arcuate edge of bill 755 of a retaining hook 756 pivoted at 757 on bracket 682. The hook 756 is urged downward by a tension spring 758 anchored thereto and to bracket 682. Downward movement of hook 756 is limited by a suitable stop 759 mounted on bracket 682.

Shortly before carriage 617 reaches its full forward position, the pass-by pawl 753 closes a normally open micro-switch 760 mounted on rail 52 and, like switch 746, connected in series with solenoid 734 (Figure 38). That again energizes solenoid 734 momentarily, so that the latch 724 is raised releasing the pin 721 from notch 726. When that occurs the shift rod 706 is moved toward the right, as viewed in Figure 38, by the compression spring 708, until pin 721 engages in notch 722, thus holding the shift rod 706 in its neutral position shown. It will be understood that, as the sweep travels in either direction, the hub 697 moves left to right on rearward sweep travel, right to left on forward sweep travel. As previously explained, the sweep drive shaft 667 is driven in one direction during rearward travel of the sweep, and in the opposite direction during forward travel of the sweep. The hub 697 is threaded on portion 696 of shaft 667, as also previously explained. Accordingly, due to the threaded connection between hub 697 and portion 696 of shaft 667, the hub 697 will be moved in the manner stated. The direction of drive of shaft 667 is such, in each instance, that hub 697 moves toward the right, as viewed in Figure 38, during rearward travel of the sweep, and toward the left during forward travel of the sweep, as will be understood. This movement of hub 697 is to give proper compression to spring 708, or spring 700, to actuate clutch 714. In the neutral position of shift rod 706 both members 735 and 736 of the double clutch 714 are declutched from shaft 667, which then remains stationary until the shift rod 706 is again actuated in the manner previously described. As the sweep carriage 617 reaches its most forward position, it raises the hook 756, the bill of which then engages about the upper forward roller 643 of carriage 617. At that time, the forward end of carriage 617 contacts a bumper 761, preferably formed of rubber, mounted on the bracket 682 at the inner face thereof. The carriage 617 is then held in position by the bumper 761 and the hook 756. The bill 755 of hook 756 is of such curvature that it does not engage positively about roller 643, so that the carriage may be pulled free from this hook by the chain 681 for rearward travel along rail 52 in the manner previously described. The micro-switches 744 and 746 are disposed at the lower edge of rail 52, and the micro-switches 754 and 760 are disposed at the upper edge of that rail, as shown in Figure 1. It will be clear, from what has been said, that pass-by pawl 743 is effective in the rearward travel only of carriage 617, and pass-by pawl 753 is effective in the forward travel only of carriage 617.

Four micro-switches 762, 763, 764 and 765 (Figures 38 and 39) are mounted on a bracket 766 secured to the main frame 50. The micro-switches just referred to are disposed in overlying relation to shift rod 706, which has secured thereto a block 767 provided in its upper face with four slots in each of which is mounted a pass-by pawl 768, these pawls cooperating with the actuating levers of the respective micro-switches. In the normal position of shift rod 706 all three of the micro-switches 762, 763, and 764 are held closed by the corresponding pass-by pawls 768, and the micro-switch 765 is held open. The micro-switch 762 is connected in series with the deadwood button 570 (Figure 42). When shift rod 706 is moved in either direction beyond its normal position, the micro-switch 762 opens, disabling the deadwood circuit so that a deadwood operation cannot be initiated during the operation of the sweep. The micro-switch 763 is connected in series with the reset button 362 (Figure 42) and is effective for preventing initiation of the resetting operation during operation of the sweep. It will be recalled that, in the resetting operation, the timer closes the micro-switch 742 which energizes the solenoid 734 for initiating operation of the sweep. Also, in the deadwood operation, when the pin setting table 283 is in its deadwood position, the timer is set in operation for closing the pin gripping members 465a and 465b. Since, as previously explained, the solenoid 734 is energized by pressing the deadwood button 570, closing of the micro-switch 742 of the timer would interfere with the sweeping operation. In order to avoid that difficulty, the micro-switch 764 is connected in series with the timer micro-switch 742 and with the solenoid 734. When solenoid 734 is energized by pressing the deadwood button, with resultant movement of the shift rod 706, the micro-switch 764 is opened thus disabling the timer micro-switch 742. The sweep then continues in operation, in the manner previously described, and passes rearward beneath the pin setting table 283 and the pins carried thereby, when that table is in its intermediate position.

The normally open micro-switch 765 (Figures 38 and 39) controls the circuit breaker 769 (Figure 58A) for the main motor 149. The circuit breaker 769 also is controlled by a key operated switch 770 (Figure 42) mounted in the same switch box as the resetting switch 362, previously referred to herein as the resetting button. The control of circuit breaker 769, by the micro-switch 765 and the key operated switch 770, is effected through a relay 1002 (Figure 58), as will appear more fully later. When the solenoid 734 has been energized for initiating the sweeping operation, as previously explained, the shift rod 706 has been moved from its neutral position so that the micro-switch 765 is then closed by the corresponding pass-by pawl 768. Thereafter, during operation of the sweep, the circuit breaker 769 is under control of the micro-switch 765, so that opening of the key operated switch 770 will not stop operation of the motor 149 and the sweep will complete its operation. Upon completion of the sweep operation, the shift rod 706 is returned to its normal neutral position, at which time the micro-switch 765 is opened, thus de-energizing the motor starter 640 which will then drop out stopping the motor 149 and preventing further operation of the machine if in the meantime key switch 770 has been opened. The circuit of the main motor 149 is then open and the key operated switch 770 is also opened, and in order again to set the machine in operation it is necessary first to close the key operated switch 770, as will be understood. In the intended normal use of the machine, the master switch 770 remains closed, this switch being opened only when it is desired to discontinue use of the machine. The various functions and operations of the micro-switches 762, 763, 764 and 765 will appear more fully hereinafter in connection with the circuit diagram.

The interlock means (Figures 20 and 21), previously referred to, for the two pairs of distributor rolls 105 and 106 and 107 and 108 comprises two micro-switches 771 and 772 mounted on a bracket structure 773 attached to frame 203 of the main pin receiving table 207. The micro-switch 771, which normally is closed, is connected in series in the holding circuit of a relay 1010 (Figure 58) and, in cooperation with reset button 362, controls relay means, to be referred to more fully later, comprising a hold-in relay connected in series with a solenoid 774 (Figures 20 and 58) mounted on bracket structure 773 in overlying relation to the micro-switches 771 and 772. The micro-switch 772 is connected in series with the hold-in relay just referred to and the solenoid 774. It will be clear that if the reset button 362 is pressed, with the micro-switch 771 in its normally closed condition, the hold-in relay will be energized and will then be held in, and if the normally open micro-switch 772 is then closed the solenoid 774 will be energized. Normally, solenoid 774 is de-energized, at which time a pin 775, secured in the lower end of core 776 of solenoid 774, rests upon the upper edge of a finger 777 extending upward from a plunger 778 slidably mounted in bracket structure 773, in overlying relation to the micro-switches 771 and 772.

The plunger 778 is urged toward shaft 157 by a tension spring 779 anchored to plunger 778 and to the bracket structure 773, movement of plunger 778 toward shaft 157 being limited by a stop pin 780 secured through the plunger and contacting the bracket structure 773. In the projected position of plunger 778, indicated in dotted lines in Figure 20, a pass-by pawl 781, pivoted on one side of plunger 778, is disposed adjacent the actuating lever 782 of micro-switch 771. Also, in the projected position of plunger 778, a downwardly extending cam finger 783, fixed on plunger 778 at the opposite side thereof, is disposed adjacent the actuating lever 784 of the micro-switch 772, which is then open. When the shaft 157 is turned through one revolution, in the operation of dumping the pins from the two pairs of distributor rolls, as previously explained, it turns in counterclockwise direction as viewed in Figure 20. A collar 785, fixed on shaft 157, is provided with an outwardly projecting cam arm 786 which, in the normal angular position of shaft 157, underlies the rearward end of plunger 778, the upper surface of which is beveled at 787. As previously explained, the shaft 157 turns through one complete revolution, during which the arm 786 contacts plunger 778 forcing it forward in opposition to tension spring 779.

When the plunger 778 reaches its forward position, core 776 of solenoid 774 moves downward by gravity positioning pin 775 in back of finger 777, thus locking plunger 778 in its retracted or forward position. In the forward movement of plunger 778, the pass-by pawl 781 passes over actuating lever 782 of micro-switch 771, without closing the latter, and the cam finger 783 depresses lever 784 of micro-switch 772, thereby closing that switch. That energizes the solenoid 774, which releases the plunger 778 which is then returned to its rearward position by the tension spring 779. In this return or rearward movement of the plunger 778, the micro-switch 772 is opened, de-energizing the solenoid 774, so that core 776 thereof returns to its lowered position, and the micro-switch 771 is momentarily opened by pass-by pawl 781, then effective for that purpose. That causes the holding relay 1019, previously mentioned, to drop out, thus opening the circuit of solenoid 774.

Since the micro-switch 772 is closed only upon forward movement of plunger 778 by cam arm 786, and the shaft 157 is actuated only when there is a complete set of pins—ten pins—on the two pairs of distributor rolls 105 and 106 and 107 and 108, it will be seen that the resetting operation cannot be initiated unless ten pins have been delivered to the pin buckets of the main or pin receiving table 207 of the machine. By providing the interlock means above described, I assure that a complete set of pins will be available for setting upon the pin area of the alley, upon initiation of the resetting operation, thus guarding against unnecessary or inopportune operation of the machine and objectionable delay.

The rules of bowling prohibit the player from crossing the foul line in delivering a ball. If the foul line is crossed at delivery, the ball so delivered should be termed foul, and any pins knocked down by that ball should not count but should be re-spotted on the alley. In order to take care of fouls, I provide a barrier which will be lowered into operative position, if the player crosses the foul line in delivering the ball, this barrier being disposed in front of the pin block of the alley. Accordingly, in the case of a foul, no pins will be knocked down and no dispute can arise as to how many and which pins were knocked down on the foul.

A bowler in delivering the ball slides on one foot. I take advantage of this by providing at the foul line a normally open switch 788 (Figure 42) which, in the event of the player's foot sliding across the foul line, will be closed. The switch 788 (Figures 43 and 44) comprises a metal contact strip 789 of substantially L shape in cross section extending substantially the full width of the alley A. A metal bar 790, also extending substantially the full width of the alley, is slidable on an underlying insulating strip 791, between which and a box-like casing 792, of wood or other suitable insulating material, the base extension 793 of the contact strip 789, preferably enclosed in a sheet of insulation, is confined. Bar 790 is urged toward the front of the alley by compression springs 794 confined between that bar and the rearward end of casing 792. A strip 795 of friction material, such as rubber, is set into the upper face of bar 790 and extends therefrom a slight distance above the upper face of the alley A, it being understood that the casing 792 is set into the alley. In the event of a player's foot sliding across the foul line, it will contact strip 795 thus moving the bar 790 into contact with the strip 789. On the other hand, direct downward pressure on the strip 795, or a ball rolling across that strip, will be ineffective for closing the switch. Accordingly, the switch 788 operates only in response to a scuffing action such as would be caused by a player's foot sliding across the foul line.

Switch 788 controls the circuit of a solenoid 796 (Figure 40) connected in series therewith and mounted on the main frame 50 of the machine adjacent the front thereof. The solenoid 796 is provided with a downwardly extending core 797 which has pin and slot connection to the forward end of an arm 798 fixed, at its rearward end, on a cross rod 798a rockably mounted on frame 50. Two hooks 799—one adjacent each side of the machine—are fixed on cross rod 798a, adjacent the sides of frame 50, with their bills 799a disposed to engage beneath a cross bar 800 connecting the arms 801 of a foul line barrier structure 802. Arms 801 carry, at their forward ends, a suitably padded stop or barrier member 803 of sufficient height to assure stopping of a ball traveling down the alley, when member 803 is in its lowered position. Normally, the arms 801, and with them the barrier member 803, are held raised by the hooks 799. The arms 801 are of tubular construction and each has secured in its rearward end a rod 804 slidable through a shouldered head 805 pivoted to a downwardly extending member 806 at the rearward end of frame 50 and constituting a structural element thereof. A compression spring 807 is disposed about rod 804, confined between the rearward end of arm 801 and head 805. Forward movement of rod 804 through head 805 is limited by a stop collar 808 secured on the rearward end of rod 804. As will be understood, the compression springs 807 provide cushion means for absorbing the impact of a ball striking the barrier member 803. From what has been said, it will be understood that the barrier member, when in its lowered operative position, extends the full width of the alley, and that there are two arms 801, disposed at the sides of the machine and connected together by rod 800 and barrier member 803.

Each arm 801 is provided, a short distance from its forward end, in back of cross bar 800, with a latch arm 809 comprising a collar 810 mounted for turning movement on arm 801. The arm 809 is urged inward about barrier arm 801 by a torsion spring 811 anchored at one end to a collar 812 fixed on barrier arm 801 and, at its forward end, to the collar 810. The latter collar 810 is provided with a slot 813 receiving a pin 814 secured in the barrier arm 801 and limiting inward turning movement of latch arm 809. The upper end of latch arm 809 is inclined (Figure 41) to provide a cam surface 815. In the normal raised position of the barrier structure 802, the upper end 815 of the respective latch arms 809— one at each side of the barrier structure—is in contact with a cam block 816 mounted on the frame 50. That holds the arm 809 in such position that a roller 817, mounted thereon adjacent the lower end of the cam surface 815, clears the adjacent side flange 462 of the pin setting table 283, in the vertical travel thereof.

When the solenoid 796 is energized, by closing of the foul line switch 788, the barrier structure 802 is released and drops into position with the barrier member 803 resting upon the alley, in front of the pin block, effective for stopping a ball traveling down the alley. The downward movement of the barrier releases the latch arms 809 from the associated cam blocks 816 and these arms are then turned inward about the barrier arms 801, into such position that the rollers 817 will overlie the side flanges 462 of the pin setting table 283, when the latter is in lowered position. In the downward movement of table 283, when the barrier structure 802 is in its lowered position, the side flanges 462 of table 283 contact the cam surfaces 815 at the upper ends of the latch arms 809, displacing the latter outward. When the flanges 462 pass below rollers 817 the arms 809 are again turned inward, as limited by the flanges 462, to position with the rollers 817 overlying flanges 462.

In order to raise the barrier structure into its normal inoperative position, a deadwood operation is performed, in respect to the pin setting table 283, which in its upward travel picks up the barrier and raises it until the bills 799a of the hooks 799 engage beneath the cross rod 800, it being noted that the respective hooks 799 are urged rearward by a tension spring 819 anchored to arm 798, at its upper end, and to frame 50, at its lower end. As the barrier structure approaches its raised position, the cam surfaces 815 of arms 809 contact the cam blocks 816 thus turning the arms 809 outward into position with the rollers clear of side flanges 462 of the pin setting table 283, which continues its upward travel in the manner previously described.

It is desirable that so long as the foul barrier remains down the resetting means be disabled, in order to eliminate possibility of an attempted resetting operation at that time. To that end, a micro-switch 820 (Figure 40) is mounted on frame 50, in such position as to be held closed by an arm 801 of the barrier structure when the latter is in its normal raised position. The micro-switch 820 is connected in series in the reset circuit and, when open, disables that circuit so as to prevent a resetting operation. Accordingly, when the barrier structure is released upon closing of the foul line switch, the machine is incapable of performing a resetting operation, or attempting to do so, until the barrier structure is returned to its normal raised position in the manner above described. In that connection, it will be recalled that in the resetting operation the alley is swept before the pin setting table 283 is lowered. Accordingly, if it were attempted to perform a resetting operation with the foul barrier in its lower position, damage to the sweep or other parts of the machine would be apt to occur. By assuring that a resetting operation cannot be initiated so long as the barrier structure is in lowered position, I guard against that risk.

In the modified form of foul line switch shown in Figure 45, a shaft 821 is rotatably mounted in brackets 822, suitably secured to the alley, these brackets and associated parts being disposed within a channel 823 formed in the alley A. The shaft 821 is provided with a covering 824 of a friction material, such as rubber, bonded or otherwise suitably secured thereto and extending a short distance above the top surface of the alley. A clutch member 825 is fixed to one end of shaft 821 and engages a similar clutch member 826 piloted on the adjacent end portion of shaft 821. The clutch members 825 and 826 have interengaging teeth of substantially triangular shape, as shown. The clutch member 826 is provided with an elongated neck 827 fixed on the inner end of a stub shaft 828 slidably mounted in bearing brackets 829 and 830 suitably secured to the alley within channel 823. The bearing bracket 829 is provided with a lengthwise slot 831 receiving a pin 832 fixed in stub shaft 828 and, in cooperation with bracket 829, restraining it against turning movement. A compression spring 833, mounted about stub shaft 828 and confined between bearing bracket 830 and a collar 834 fixed on stub shaft 828, urges the latter inward so as normally to maintain the clutch member 826 in engagement with the member 825.

The outer end of stub shaft 828 is disposed in close proximity to the operating pin 835 of a micro-switch 836 disposed in the switch casing or box 837 of the deadwood switch 570, previously referred to as the deadwood button. The micro-switch 836 normally is open and is connected in circuit with the solenoid 796 (Figure 40) for energizing it and releasing the barrier structure, when this switch is closed, in the same manner as the foul line switch of Figures 43 and 44 releases the foul line barrier. As will be clear, downward pressure on the shaft 821 is ineffective for actuating the switch 836, and a ball rolling across the sleeve or covering 824 of shaft 821 is ineffective for causing turning of this shaft, and, therefore, is ineffective for actuating switch 836. On the other hand, if a player's foot slides across the foul line, it will contact the friction cover 824 of shaft 821, thus turning the latter, and through the then interengaging teeth of the clutch members 825 and 826, moving the stub shaft 828 outward so as to actuate pin 835 and close the switch 836, releasing the foul line barrier as and for the purpose previously described.

In order to make the proper electrical connections to the parts on the pin setting table 283, I provide a cable 838 (Figure 33) leading from a control panel 839, of suitable known type, mounted at the front of the main frame 50. The cable 838 is secured in a clamp 840 at the lower end of an arm 841 fixed to and extending downward from a cross rod 842 fixed in frame 50. A wheeled carriage 843 travels on rod 842 and normally is disposed adjacent the right hand end thereof, as viewed from in front of the machine. A sheave 844, mounted in the lower end of an arm 845 extending downward from carriage 843, receives the cable 838, which is passed about sheave 844. From the sheave 844 the cable 838 is led over a second sheave 844a mounted in a bracket 846 fixed to and extending inward from bracket 847 on which the main motor 149 is mounted. From the sheave 844a the cable 838 is led downward and is secured to plate 461 of table 283 by a suitable clamp 848. The wires or conductors of the cable 838 are appropriately connected to the various elements of the timer 851 and associated parts, as will be described presently. A plurality of compression springs 849 are disposed about cross rod 842, with intervening washers 850 and are confined between the upper end of arm 841 and the inner end of carriage 843. From what has been said, it will be clear that, in the downward movement of table 283 the cable 838 is drawn over the sheaves 844 and 844a. The carriage 843 is then moved along cross rod 842 toward arm 841, compressing the springs 849. That insures that the cable 838 is maintained taut during down travel of table 283, thereby avoiding the possibility of objectionable slack in cable 838. Likewise, in the upward travel of table 283 the carriage 843 is moved, by the compression springs 849, along rod 842 away from arm 841, so that the cable 838 is kept under desirable tension sufficient to avoid objectionable slack therein.

The timer 851, previously referred to, is shown in Figure 50, in which the associated terminal blocks and certain other parts have been omitted, and certain parts have been in part broken away and shown in section, for clearness of illustration. It comprises a mounting base 852 suitably secured on plate 461 of the pin setting table 283. The base 852 is provided with upwardly extending front and back flanges 853 and with upwardly extending side flanges 854 and 854a shaped as shown. A shaft 855 is rotatably mounted in bearing blocks 856 secured to the side flanges 854 and 854a. A spur gear 857, fixed on the inner end (Figure 19) of shaft 855, meshes with a spur pinion 858 fixed on the left hand end, as viewed from in front, of the front one of the cross-threaded shafts 466. It will be recalled that, in the operation of the machine, the shafts 466 are driven in opposite directions, at appropriate times, by the timer motor 473, previously referred to. Accordingly, the timer shaft 855 also is driven in opposite directions, at appropriate times, when the shafts 466 are so driven. In Figure 50 the timer is shown with the shaft 855 in the angular position which it occupies when the pin gripping members 465a and 465b are closed. At that time, the shaft 855 is at the limit of its turning movement in counterclockwise direction, as viewed in Figure 50.

A plurality of micro-switches 859, 638, 622, 860, 861, 862, 863, 742, 603, 864, and 865 are mounted side by side, with intervening insulating strips 866, on two vertically spaced rods 867 mounted in fingers 868 extending upward from the flanges 854 and 854a, and in uprights 869 secured to base 852. The micro-switches just referred to, certain of which have been previously mentioned, are thus disposed in a line adjacent and parallel with shaft 855. In the description of the timer, to follow, the legends accompanying the various detail sectional views thereof refer to the condition of the pin grippers and the direction of turning of the timer shaft and the movement of the switch operating members to reverse that condition. For example, "open" indicates that the pin grippers 465a and 465b are open, and "to close" and the accompanying arrow indicate the direction in which the timer shaft is turned and the switch actuating member is moved, for closing the pin grippers. The legend "closed" indicates that the pin grippers are closed, and "to open" the accompanying arrow indicates the direction of turning of the timer shaft and the direction of movement of the switch actuating member for opening the pin grippers.

The pin setting table 283 normally is in its fully raised position (Figures 1 and 3) with the pin gripping members 465a and 465b fully open (Figure 19) and micro-switch 1023 held open by finger 746 (Figures 47 and 48). At that time the shaft 855 has been turned into its extreme angular position clockwise as viewed in Figure 53, the fields of the motor 473 having been reversed and the motor stopped, as above explained. In order to initiate a resetting operation, the reset button 362 (Figure 42) is pressed, thus starting the motor 473, for closing the pin gripping members 465a and 465b and setting the timer in operation. The shaft 855 is then driven counterclockwise, as previously stated. A cam 870 (Figures 50, 53 and 53A) fixed on shaft 855 is in contact with the operating lever of the micro-switch 742, then held open, when the pin gripping members 465a and 465b are in fully open position (Figure 53A). As shaft 855 turns counterclockwise the cam 870 passes out of contact with the operating lever of micro-switch 742, which then closes. Closing of the micro-switch 742 energizes the solenoid 734 and sets the sweep into operation, in the manner previously explained. It will be recalled that the micro-switch 742 is connected in series with the micro-switch 764 (Figures 38 and 39) so that, when the shift rod 796 is moved toward the right, as viewed in Figure 38, the micro-switch 764 is opened and the solenoid 734 is deenergized, as and for the reasons previously stated. At about the same time that micro-switch 742 is released and closes, a multilated cam disc 871 (Figures 50, 55 and 55A) fixed on shaft 855 contacts the roller of the actuating lever of the normally closed micro-switch 622 and opens it, it being noted that micro-switch 622 is connected in series with micro-switch 599 adjacent the left dashpot 284 (Figures 47 and 48). When the shaft 855 is in the angular position it occupies when the pin gripping members 465a and 465b are fully open, the roller of the operating lever of the micro-switch 622 is disposed in notch 871a in disc 871, as shown in Figure 55A.

In the continued turning of shaft 855 in counterclockwise direction, in the closing of the pin grippers 465a and 465b, a clutch tooth 872, of a collar 873 fixed on shaft 855 picks up a clutch tooth 874 (Figures 50, 54, 54A, 54B and 54C) of a sleeve 875 loose on shaft 855. The sleeve 875 is then turned in counterclockwise direction, as viewed in Figure 50—clockwise as viewed in Figure 54C, with shaft 855, thereby moving in like direction a U-shaped cam member 876 fixed to sleeve 875. The arms of the cam member 876 hold the micro-switches 862 and 863 closed, when the pin gripper members are open and until near the end of the operation of the closing of those members. When the tooth 872 picks up tooth 874, as just above stated, the sleeve 875 is turned with shaft 855, carrying with it the cam member 876 and releasing the actuating levers of the micro-switches 862 and 863 which then open. Immediately after opening of the micro-switches 862 and 863, the micro-switches 860 and 861 are closed by a second U-shaped cam member 877 fixed on sleeve 875. That reverses the starting fields of the motor 473, preparatory to a succeeding operation in which the pin grippers are opened.

At the same time that the micro-switches 860 and 861 are closed by the cam member 877, the micro-switch 638 (Figures 50 and 56) is closed by a cam 878 fixed on shaft 855. It will be recalled that the micro-switch 638 is connected in series with the micro-switch 639 and the micro-switch 613 (Figures 47 and 48) and the motor starter 640 (Figure 10) for the main motor 149. At about the same time that the micro-switches 860, 861, and 638 are closed, the normally open micro-switch 603 is closed by a cam finger 879 (Figures 50, 52, 52A and 52B) fixed to a collar 880 loose on shaft 855, between two collars 881 and 882 fixed on shaft 855. The collar 881 carries a pin 883 extending inward therefrom which, in the counterclockwise rotation of shaft 855, picks up the cam finger 879 (Figure 52) and turns it into position to close micro-switch 603, as just stated. This switch 603 is closed but momentarily and is, at this time, ineffective to energize the solenoid 604 (Figure 14), through micro-switch 1023 (Figures 47 and 48), which is now held open by finger 746, for raising the pin setting table as previously described. As will be understood, the micro-switch 603 is connected in series with the micro-switch 1023 and the solenoid 604. The collar 882 carries a pin 883a, which, in the clockwise rotation of timer shaft 855, in the opening of the pin grippers 465a and 465b, picks up the cam finger 879, which momentarily closes micro-switch 603 at the proper time, as will appear more fully presently.

Shortly after closing of the micro-switches 860 and 861, the normally open micro-switches 864 and 865 are momentarily closed by a U-shaped cam member 884 (Figures 50, 51, 51A and 51B) loose on shaft 855. The cam member 884 is provided with a pin 886 which is picked up by a stud 887 fixed in collar 888 fixed on shaft 855 adjacent inner arm 885 of cam member 884. When the micro-switches 864 and 865 are thus closed, the motor starter 1022 (Figure 58A) is dropped out stopping the motor 473. That stops the timer shaft 855 and the pin gripping members 465a and 465b are then in fully closed position about the pins, as has been previously explained. As the shaft 855 reaches the limit of its turning movement counterclockwise, a latch roller 889 (Figures 54, 54A, 54B and 54C), carried by an arm 890 pivoted on one of the uprights 869 and urged upward by a tension spring 891, enters one of two notches 892 in a disc 893 fixed to the outer end of sleeve 875, latching the latter in the position which it is occupies at the end of the operating of closing the pin gripping members 465a and 465b.

In the normal operation of the timer, the motor 473 should be stopped when the roller 889 enters notch 892 of disc 893. At that time, the micro-switch 859 normally is closed, roller 899 then being in a notch 901 (Figures 50, 57A and 57B) of a mutilated disc 894 loose on shaft 855, between two collars 895 (Figure 57) and 896 (Figures 50, 57, 57A and 57B) fixed on shaft 855. The disc 894 has secured therein a pin 897 which is picked up by a stud 898 fixed in collar 896, in the rotation of shaft 855 counter-clockwise, for opening the pin grippers 465a and 465b. When roller 889 enter notch 892 of disc 893, the disc 894 is so positioned that roller 899 of the actuating lever 900 of micro-switch 859 is disposed at about the midlength of the arcuate recess 901 in disc 894. In the event that the motor 473 does not stop, for any reason, when the pin gripping member 465a and 465b have been completely closed in the manner previously described, the shaft 855 will continue to turn a short distance in counterclockwise direction, with corresponding turning movement of disc 894. When that occurs, the roller 899 will be contacted by disc 894 and moved thereby away from the timer shaft 855, into its position shown in Figure 57B. That opens the micro-switch 859 which, under normal operating conditions, is normally closed. The micro-switch 859 is connected in series with the timer motor 473 so that, upon opening of micro-switch 859 the motor is stopped thus guarding against damage which might otherwise occur.

In the resetting operation, closing of the micro-switch 742 energizes solenoid 734 and sets the sweep in operation, as previously explained. The operation of the sweep is so timed that it releases table 283 soon after the pin gripping members 465a and 465b have been closed. The timer shaft 855 is then in its position in which the pin gripping members are fully closed, above described in detail. At that time, the micro-switches 638, 742, 859, 860, 861, 864, and 865 (Figure 50) are closed, and the micro-switches 603, 622, 862, and 863 are open. The table 283, when released, moves downward by gravity to its reset position (Figure 34). When it reaches that position, the micro-switch 394 is closed by the pass-by pawl 396 (Figures 47 and 48) and the timer motor 473 is started, setting the timer into operation for opening the pin gripping members 465a and 465b, the timer shaft 855 then rotating in clockwise direction as viewed in Figure 50. As the shaft 855 turns clockwise, the micro-switch 638, which is in series with the two micro-switches 613 and 639, is opened thus conditioning the circuit for raising of the table 283 after the pin gripping members 465a and 465b have been opened sufficiently to release the pins. The micro-switch 603 is then closed by cam 879 energizing the relay 604, through micro-switch 1023 which is now closed, for throwing in the clutch for raising the table 283, the pin gripping members 465a and 465b being then opened sufficiently to release the pins. While the table 283 is being raised, the timer continues in operation. The tooth 872 of collar 873 then picks up the tooth 874 of sleeve 875 and cam 877 is moved out of contact with the actuating levers of the micro-switches 860 and 861, which then open. Immediately after that, the cam 876 contacts the rollers of the actuating levers of the micro-switches 862 and 863, thereby closing them. That reverses the fields of the motor 473, as has been explained. At about the same time that the micro-switches 860 and 861 are opened, the cam 870 opens the micro-switch 742. That opens the circuit of the solenoid 734 thus guarding against the sweep being again operated at this time. At about the same time that the micro-switch 742 is opened, a stud 902 (Figures 50, 51, 51A and 51B) fixed in a collar 903, which is fixed to shaft 855, picks up a pin 904 fixed in the outer arm 905 of the cam member 884. The cam member 884 then momentarily opens the two micro-switches 864 and 865. That de-energizes the motor starter 1022 (Figures 58 and 58A), which then drops out stopping the timer motor 473, the table 283 then traveling upward and the micro-switch 394 being open. At the same time that the micro-switches 864 and 865 are opened, the cam disc 871 (Figure 55A) passes out of contact with the roller of the actuating arm of the micro-switch 622, which then closes. This micro-switch 622 is now, as will appear more fully later, connected in series with the micro-switch 599 (Figure 58A) and, when closed, conditions the circuit for a deadwood operation. The pin setting table 283 is then in its normal fully raised position, with the pin gripping members 465a and 465b fully opened, and the machine is conditioned for either a resetting operation or a deadwood operation. In the event the motor starter 1022 fails to open, for any reason, when the pin gripping members 465a and 465b reach their full open position, the mutilated disc 894 will be turned into such position that it will contact the roller 899 of the actuating arm 900 of the micro-switch 859. That moves arm 900 toward micro-switch 859, opening the latter and thus opening the circuit of the motor 473, thereby stopping operation of the timer and guarding against possible damage.

In the resetting operation, when the table 283 starts downward, it releases the micro-switch 1023 (Figures 47, 48 and 58A), which then closes. That conditions the circuit of the solenoid 604 (Figures 14 and 58A) so that the latter can be energized at the proper time. In the continued downward travel of table 283, the pass-by pawl 611 (Figures 47, 48 and 58A) passes by the normally open micro-switch 639 and then by the normally open micro-switch 613, without actuating either of them. In the further downward travel of table 283, the pass-by pawl 396 closes the then open side of the micro-switch 599. The pass-by pawl 396 moves the micro-switch 599 into position such that when the then open micro-switch 622 is closed, the motor starter will be energized. Also, at the same time that the micro-switch 599 is actuated by the pass-by pawl 396, the micro-switch 745 (Figure 58A) is closed momentarily by the finger 746. This closing of the micro-switch 745 is ineffective, since the micro-switch 744, on the sweep rail 52 and connected in series with micro-switch 745, is then open. When the table 283 reaches its full lowered reset position, the clamp 428 at the upper end of tube 285, closes the then open micro-switch 394a and also closes the normally open micro-switch 394 similar to switch 394a and mounted adjacent thereto on the bracket 600 (Figures 47 and 48). The micro-switch 394, when thus closed, sets the timer motor 473 and the timer, driven thereby, into operation for opening the pin gripping members 465a and 465b. The micro-switch 394a, when thus closed, energizes the solenoid 392 for raising the pit elevator, as has been previously described.

The table 283 is now in its fully lowered position and the pin gripping members 465a and 465b are being opened. When the pin gripping members 465a and 465b have been opened to a predetermined extent, sufficient to release the pins so that they will remain upon the alley, the table raising clutch 300 (Figure 14) is thrown in, in the manner previously described, and the table 283 starts upon its return upward travel. As the table 283 starts upward, the micro-switches 394 and 394a are released and opened. As the table, in its continued up travel, reaches its deadwood position, the pass-by pawl 396 (Figures 47, 48 and 58A) passes by the micro-switch 599 without actuating it and, at the same time, the finger 746 momentarily closes the micro-switch 745, which is then ineffective due to the fact that the micro-switch 744 is still open. In the continued upward travel of table 283, the pass-by pawl 611 momentarily closes the micro-switch 613, connected in series with the micro-switch 638 (Figure 58A) which is then open, so that closing of micro-switch 613 is ineffective. The pass-by pawl 611 then momentarily closes the micro-switch 639, also connected in series with micro-switch 638, without effect. The table 283 is then returned to its normal raised position, and the finger 746 opens the then closed micro-switch 1023, which is connected in series with the then open micro-switch 603 and the solenoid 604, and holds it open. That guards against energizing the solenoid 604 and attempted throwing in of the clutch for raising the table 283, when the pin gripping members 465a and 465b reach their fully closed position in a succeeding resetting operation. This completes the resetting operation, and the table 283 is now in its normal fully raised position, with the pin gripping members 465a and 465b fully open, the machine being then conditioned for either a resetting operation or a deadwood operation.

In performing a deadwood operation, the deadwood button 570 (Figures 42 and 58) is pressed, thus releasing the table 283 for downward movement, as has been explained. As the table 283 moves downward, the pass-by pawl 611 (Figures 47, 48 and 58A) passes by the micro-switches 639 and 613 without actuating them, these two switches remaining open. When the table 283 reaches its deadwood position, the micro-switch 599 is moved from its position shown in Figure 58A to its other closed position and held closed, by the pass-by pawl 396, thus setting the timer motor 473 and the timer driven thereby into operation. At the same time, the micro-switch 745 is closed and held closed by the finger 746, but is then ineffective, under normal operating conditions, since the micro-switch 744 is then open. The then open micro-switch 744 provides a safe-guard with respect to the sweep in the event of improper operation thereof, as has been previously explained. With the table 283 remaining in its deadwood position, the pin gripping members are closed about the pins standing on the alley, the micro-switch 638 of the timer, connected in series with the normally open micro-switch 613 and the solenoid 614 is closed, and the micro-switch 603 of the timer is closed momentarily, throwing in the table raising clutch 300 (Figure 14), by energizing solenoid 604 through the then closed micro-switch 1023 (Figure 58A). The table 283 then moves upward with the pins held between the pin gripping members 465a and 465b, slightly above its intermediate position. During this upward travel of table 283, the operating lever of micro-switch 599 is released, and that switch returns to its normal closed position shown in Figure 58A. When the table 283 reaches its intermediate position, the pass-by pawl 611 (Figures 14, 47, 48 and 58A) closes the micro-switch 613, thus energizing the solenoid 614. That throws out the table raising clutch, and the table 283 then moves downward a short distance to its intermediate position, in which it is held in the manner previously described.

Pressing of the deadwood button 570 also sets the sweep into operation. The table 283 is lowered into deadwood position, picks up the pins and returns to intermediate position, while the sweep travels toward the pit end of the alley and before it reaches the pin block thereof. The sweep then passes rearward under the table 283 while the latter is in its intermediate position, the sweeping operation is performed, and the table is released by the sweep as the latter approaches the limit of its rearward travel. The sweeping operation is then completed and the table 283, being released, as noted, moves downward so as to be again returned to its deadwood position. In this second downward movement of table 283, to its deadwood position, the pass-by pawl 396 (Figures 47 and 48) moves the microswitch 599 from its normal closed position of Figure 58A to its other closed position. This energizes the motor starter 1022, again setting into operation the timer motor 473 and the timer driven thereby. The pin gripping members 465a and 465b are then opened and the table 283 is returned to its normal fully raised position in the same manner as in the resetting operation, leaving the pins sitting upon the alley in precisely the same positions which they occupied prior to being picked up therefrom.

In any bowling game in which less than three balls are used in a frame, the machine will not perform the resetting operation automatically, in which case the reset button 362 is pressed for performing the resetting operation. The machine is then under manual control and not automatic control. Also, if for any reason the light source 1005 (Figures 58 and 59), the photoelectric cell 1003, or the sequence relay 1008 to be described more fully presently, fails, so that the machines does not operate automatically, the machine may still be operated satisfactorily as to the resetting operation, by pressing the reset button 362. Under normal conditions the machine may be controlled fully automatically as to the resetting operation. As to the deadwood operation, that is effected by pressing the deadwood button 570, as has been explained in detail. It is preferable to have the deadwood operation controlled by a button or switch operated by the player, since the player can then determine for himself when the deadwood should be removed from the alley, avoiding any question in respect to removing the deadwood before a moving down pin on the alley has had full opportunity to knock down the standing pins.

When the machine is to be used for playing ten-pins, the pin handling parts of the machine are, of course, made of suitable size and shape to handle ten-pins. In the use of the machine, after each ball has been thrown, unless a strike has been made, the deadwood button is pressed and a deadwood operation is performed. If a strike is made, the reset button is pressed and a reset operation is performed in the manner which has been described. The machine is thus well suited for playing ten-pins in which use it is under manual control rather than automatic control. If desired, by replacing the three-step sequence relay 1008 by a two-step sequence relay, the machine may be made automatic in its operation when used for handling tenpins.

In the explanation, to follow, of the circuit diagram the various control and actuating members are indicated by the reference numbers thereof, the energized conductors which are connected to a suitable source of alternating current are indicated by the letters L and LL, the conductors energized from the secondary of the transformer are indicated by the letters S and SS, and the leads to and from the respective control and actuating members are indicated by the reference numbers of such members preceded by a letter indicating the circuit in which that member is included.

Referring to the diagram of Figures 58 and 58A, the primary of the transformer T is connected directly in the lead LT and LLT and is energized from the conductors L and LL in an obvious manner. In the diagram, the various control and actuating members are shown in the positions they occupy when the key switch 770 is open and the machine is out of operation. To condition the machine for operation, the key switch 770 is closed. That closes a circuit through the coil of a normally open relay 1002, which circuit may be traced as follows—from the secondary of transformer T, conductor S, switch 770, coil of relay 1002, lead SS1002, and conductor SS to the secondary of the transformer T. The relay 1002 is thus closed, energizing the various circuits of the machine, which is now ready for use.

Closing of the relay 1002 closes a circuit including the coil of the then open circuit breaker 769, which circuit may be traced as follows—conductor L, lead L1002, the lower bar of relay 1002, lead L1, L769, the coil of circuit breaker 769, and lead LL-769 to conductor LL. The circuit breaker 769 closes the circuit of the main motor 149, which circuit may be traced as follows—conductor L, the contact bar of circuit breaker 769, lead L-149, the contact bar of the normally closed motor starter 640, motor 149, and lead LL-149 to conductor LL.

When the relay 1002 closes, it also closes the circuit of an incandescent lamp 1005, which circuit may be traced as follows—from the secondary of transformer T, lead S1002, the upper contact bar of relay 1002, lead S1005, lamp 1005, lead SS1005, lead LL1019 and conductor SS to the transformer secondary. The lamp 1005 provides a light source for a photo-electric cell 1003 mounted, with and above lamp 1005, in the separator strip 53 at one side of the alley A. An appropriately disposed mirror 1004, mounted in the separator strip 53 at the opposite side of the alley, receives a beam of light from the lamp 1005 and reflects it upward, at a slight angle, into the photo-electric cell 1003, as in Figure 59. In this manner, two light beams are provided—a lower beam substantially parallel with and but a short distance above the floor of the alley, and an upper beam a somewhat greater distance above the floor of the alley and inclined slightly upward toward the photo-electric cell. The lower beam of light is sufficiently low to assure that it will be cut or interrupted by a ball b rolling along either gutter g, as well as by a ball rolling down the floor of the alley, and the upper beam of light is at such a height, for a substantial portion of its length at least, to assure that it will be cut by a ball passing down the floor of the alley A. Assurance is thus had the beam of light passing from the lamp 1005 to the photo-electric cell 1003 will be interrupted by a ball passing down the alley A, either on the floor of the alley or in one of the gutters. The photo-electric cell 1003, lamp 1005 and mirror 1004 are, of course, disposed an appropriate distance in front of the pin area or block of the alley A, preferably sufficient to avoid risk of any thereof being struck by flying pins.

The photo-electric cell 1003 is connected in series with the switch 770 and the coil of a normally open relay 1006, by lead S1003, lead S1006, and lead SS1006, the last named lead being connected to the lead SS1005 for the lamp 1005 (Figure 58). It will be seen that when the relay 1002 is closed, the circuit of the photo-electric cell 1003 is also closed and may be traced as follows— the secondary of transformer T, lead S, switch 770, lead S1003, photo-electric cell 1003, lead S1006, coil of relay 1006, lead SS1006, and the remaining portion of the circuit of lamp 1005, previously traced, to the secondary of the transformer. The relay 1006 is under control of the photo-electric cell 1003, normally is open, and is closed responsive to interruption of the beam of light from lamp 1005 to that cell.

Passage down the alley of the first ball of a frame interrupts the light beam to the photo-electric cell 1003, which causes closing of the relay 1006, thereby closing a circuit through the operating coil 1007 of a sequence relay or switch 1008. This circuit may be traced as follows— conductor L, the lower contact bar of relay 1002, lead LI, contact bar of relay 1006, lead L1007, coil 1007, lead LL1007, lead LL1017, lead LL1009, and lead LL1027 to conductor LL. Closing of switch 1008 by passage of the first ball closes the first pair of contact points 1008a of that switch, thereby closing the circuit of an incandescent lamp 1009, which I term the ball number one light and also energizing one side of the incandescent lamps 1010, 1011, and 1012, which I term the strike lights. The circuit of lamp 1009 may be traced as follows—lead LI, lead L820, micro-switch 820, lead L763, lead L1008a, contact points 1008a and the first contact bar of switch 1008, lead L1009, lamp 1009, lead LL1009, and lead LL1027 to conductor LL.

When the second ball passes down the alley, it interrupts the beam of light to the photo-electric cell 1003. The sequence switch 1008 is then again actuated and closes the second pair of contact points 1008b thereof and opens the first pair of contact points 1008a. Opening of the contact points 1008a extinguishes lamp 1009 and deenergizes the side of the lamps 1010, 1011 and 1012 formerly energized. Closing of the contact points 1008b closes the circuit of a lamp 1013, which I term the number two ball light, and energizes one side of three incandescent lamps 1014, 1015 and 1016, which I term spare lights. The circuit of lamp 1013 may be traced as follows—from lead L1008a of the previously traced circuit of lamp 1009, contact points 1008b, lead L1013, lamp 1013, and leads LL1009 and LL1027 to conductor LL.

Passage of the third ball down the alley causes the sequence switch 1008 to be actuated a third time thereby closing a third pair of contact points 1008c and a fourth pair of contact points 1008d, and opening the second pair of contact points 1008b. The lamp 1013 is extinguished, and the formerly energized side of the lamps 1014, 1015 and 1016 is de-energized, by opening of the contact points 1008b. Closing of the contact points 1008c closes the circuit of an incandescent lamp 1017, which I term the ball number three light. The circuit of lamp 1017, so far as it has not been previously traced, may be traced as follows—lead L1008a, contact points 1008c, lead L1017, and lead LL1017 to lead LL1009. Closing of the contact points 1008c energizes the reset circuit and the machine then automatically performs a resetting operation, as will be explained more fully presently. It has been assumed, in the above description, that neither a strike nor a spare has been made, and that three balls have been rolled successively down the alley. After the first ball has been rolled, and after the second ball has been rolled, a deadwood operation is performed by the machine, if, as has been assumed, there are live pins left on the alley, as will be understood, which deadwood operation will be described more fully later.

The switch 1008 is of conventional type and may be any one of numerous switches commercially available. For example, any suitable known rotary switch could be used in the circuit disclosure of Figure 58. The switch need merely be operative to advance one step from a given starting point responsive to each closure of an energizing circuit to the energizing coil 1007 and to be returned to the starting point responsive to closure of the energizing circuit to the release coil 1024. In Figure 58 the switch 1008 has been shown diagrammatically only, with no attempt to show its particular construction, and its manner of operation has not been described in detail; in the interests of clearness of illustration of the diagram and in view of the fact that the switch 1008 is of conventional type, as noted. Such switches are commercially available from various sources, one of such sources being Automatic Electric Inc., of Chicago, Illinois.

If a strike is made with the first ball, the reset button 362 is pressed. That energizes the reset circuit and a resetting operation is performed, in which the alley is swept and a new set of pins is placed upon the alley. Also, when the reset button 362 is closed, a circuit is closed through the coil of a three pole relay 1018, by means of a relay 1019, as will appear more fully presently. The circuit of the coil of relay 1018 may be traced as follows—lead L820, micro-switch 820, lead L763, micro-switch 763, lead LL763, the top contact bar and points of relay 1019, lead L1018, the coil of relay 1018, and lead LL1018 to conductor LL. The top contact bar of relay 1018 closes a circuit through the lamps 1010, 1011 and 1012, which circuit may be traced as follows—from the first pair of contact points 1008a, now closed, of sequence switch 1008, lead L1009, lead L1010, lead LL1010, lead L1018a, the top contact points and bar of relay 1018, and lead LL1018a to conductor LL. The third contact bar of relay 1018 closes a holding circuit through the coil of that relay, which circuit may be traced as follows—from lead LI, lead L393, micro-switch 393, lead L1018c, the third contact bar of relay 1018, lead LL1018c, the coil of relay 1018, and lead LL1018 to the conductor LL. The strike lights 1010, 1011 and 1012 are then illuminated, and the ball number one light 1009, the circuit of which has previously been traced, is also illuminated, indicating that a strike has been made. The resetting operation is then completed and play may be resumed.

If a spare is made on the second ball, the reset button 362 is pressed to initiate the resetting operation. That closes the relay 1018, it being noted that at this time the first pair of contact points 1008a of the sequence switch 1008 is open, and the second pair of contact points 1008b of that switch is closed. The second contact bar of relay 1018 then closes a circuit through the spare lights 1014, 1015 and 1016, which circuit may be traced as follows—lead L1008a, the second pair of contact points 1008b of sequence switch 1008, lead L1013, lead L1014, lamps 1014, 1015 and 1016, lead LL1014, lead L1018b, the second pair of contact points and contact bar of relay 1018, lead LL1018b, and lead LL1018a to conductor LL. The spare lights 1014, 1015 and 1016 are then illuminated as is the ball number two light 1013, the circuit of which has previously been traced, indicating that a spare has been made. The holding circuit of the relay 1018 includes in series therein the micro-switch 393, as has been explained, which normally is in its position shown in Figure 58. When the pit elevator reaches the limit of its up travel, in the resetting operation, it moves the micro-switch 393 from its normal closed position into its other closed position. That opens the holding circuit of the relay 1018, which then drops out and returns to its normal open condition shown. The micro-switch 393 when in its other closed position, just above referred to, closes a circuit through solenoid 390, thereby throwing out the pit elevator clutch, and also closes a circuit through resetting coil 1024 of sequence switch 1003, returning the latter to its normal fully open condition. The circuit of the solenoid 390, with the micro-switch 393 in its closed position alternative to its shown position, may be traced as follows—from micro-switch 393, lead LL393, lead L390, solenoid 390, and lead LL390 to conductor LL. The circuit of the resetting coil, with micro-switch 393 in its closed position last mentioned, may be traced as follows—from micro-switch 393, lead LL393, coil 1024, lead LL1024 to lead LL1017 and thence to conductor LL as previously traced.

In order to initiate the resetting operation, previously referred to, after a strike or a spare, the reset button 362 is pressed. Closing of the reset button or switch 362 energizes the coil of a normally open two bar relay 1019, the circuit of the coil of which may be traced as follows—from lead S1003, lead S570, micro-switch 570, lead S362, switch 362, lead SS362, the coil of relay 1019, lead LL1019 and lead SS to the secondary of the transformer T. The relay 1019 then closes and establishes its own holding circuit, which may be traced as follows—from lead S570, lead L771, normally closed micro-switch 771, lead LL771, the lower contact bar of relay 1019 to and through the coil of that relay, and thence to the transformer secondary as previously traced. At this time, the micro-switches 763 and 820 are closed, the former held closed by the corresponding pass-by pawl associated with the shift rod 706 of the sweep control mechanism and the latter held closed by the foul line barrier structure, and the micro-switch 393 is in its closed position shown in Figure 58, the pit elevator being then in its lowered position. Closing of the relay 1019 closes a circuit through the coil of relay 1018, which circuit may be traced as follows—from lead LL763, the top contact bar of relay 1019 and lead L1018 to conductor LL, as previously traced. The relay 1018 then closes, establishes its own holding circuit, and closes a circuit through the "strike" lights or the "spare" lights, as the case may be, and through the associated number one or number two ball light, as previously described.

When the normally open micro-switch 772 is closed, incident to the operation of dumping a set of pins from the distributor rolls into the buckets of the pin receiving table, with the relay 1019 still held closed, it closes a circuit through the coil of a two bar relay 1020. The circuit of the coil of relay 1020 may be traced as follows—from the top bar of relay 1019, lead L772, micro-switch 772, lead LL772, lead L1020c, the coil of relay 1020 and lead LL1020 to conductor LL. When the relay 1020 closes it establishes its own holding circuit, which may be traced as follows—lead L1, lead L1021b, the second contact bar of a relay 1021 normally in its position shown, lead LL1021b, the lower bar of relay 1020, the coil of relay 1020 and lead LL1020 to conductor LL. The relay 1020 now remains held in, as does the relay 1019. The micro-switch 772 also closes a circuit through solenoid 774, which circuit may be traced as follows—from the top bar of relay 1019, lead L772, micro-switch 772, lead LL772, lead L774, solenoid 774 and lead LL774 to conductor LL. The solenoid 774 is then energized and raises its core thereby releasing the plunger 778 of the distributor rolls interlock means. Plunger 778 is then projected to its rearward position and the normally closed micro-switch 771 is momentarily opened. That opens the holding circuit of relay 1019, which then drops out, the relays 1020 and 1018 remaining held in. The relay 1020 closes a circuit through the pusher clutch solenoid 358, which circuit may be traced as follows—lead L820, lead L1020a, the upper contact bar of relay 1020, lead L358, solenoid 358 and lead LL358 to conductor LL. The solenoid 358, when energized, throws in the pusher clutch, as and for the purposes previously described.

The relay 1019 is a holding relay and establishes its own holding circuit, when closed, as above noted. That assures performance of the resetting operation if the reset button 362 is pressed at a time when there is not a set of pins in the buckets of the pin receiving table 207 of the machine. In such case, the plunger 778 of the interlock means is in its projected rearward position and the micro-switch 772 is then open. Closing of the relay 1019, responsive to closing of the reset switch 362, is then ineffective for closing the relay 1020. In that case, however, the relay 1019 holds in until a pin dumping operation is performed and micro-switch 772 is closed in the forward movement of plunger 778. That closes the circuit through the coil of relay 1020, as above explained. If a pin dumping operation has been performed prior to closing of the reset switch 362, and there is a set of pins in the pin receiving table, the plunger 778 is then held in its forward retracted position and the micro-switch 772 is closed. Under such conditions, closing of the relay 1019 is immediately effective for actuating the relay 1020 and energizing the solenoid 774, the latter releasing plunger 778, which is then returned to its projected rearward position. By providing the holding relay 1019 I thus assure that the relay 1020 will be actuated responsive to pressing of the reset button or switch 362, whether the micro-switch 772 be open or closed when reset button 362 is pressed, and also assure that a resetting operation will be initiated only when there is a complete set of pins in the pin setting table, as will appear more fully presently.

With the relay 1019 closed or held in and the micro-switch 772 closed, as above, a circuit is closed through the coil of a motor starter 1022 (Figure 58A.) This circuit may be traced as follows—from micro-switch 722, lead L1020c, micro-switch 599 then in its closed position shown, the coil of motor starter 1022 and lead LL1022 to conductor LL. That closes the motor starter 1022, which closes its own holding circuit, which may be traced as follows—lead L1, lead L865, micro-switch 865, lead L864, micro-switch 864, lead LL864, lead L1022b, the lower contact points and bar of motor starter 1022, the coil of motor starter 1022 and lead LL1022 to conductor LL. The top contact bar of the motor starter 1022 closes the circuit of the pin setting table motor 473, which circuit may be traced as follows—conductor L, lead L859, micro-switch 859, lead L1022a, the upper contact points and bar of motor starter 1022, lead LL1022a, lead L863, the now closed reversing micro-switches 863 and 862 and the starting field of motor 473, and lead LL862 to conductor LL. When the relay 1020 closes, as above, the upper contact bar thereof closes a circuit through solenoid 358, which circuit may be traced as follows—from lead L820, lead L1020a, the upper contact points and bar of relay 1020, lead L358, solenoid 358 and lead LL358 to conductor LL. The solenoid 358, when thus energized, throws in the pusher clutch thereby conditioning the pusher for operation upon subsequent descent of the pin setting table 283.

Closing of the circuit of the timer motor 473, as above, sets the timer in operation and the pin grippers 465a and 465b are then moved from open position to closed position about the necks of the pins in the buckets of the pin receiving table, as previously described. When the pin grippers are closed, the timer opens the micro-switches 862 and 863 and closes the micro-switches 860 and 861, thereby reversing the starting field of motor 473. Shortly thereafter, the timer momentarily opens the micro-switches 864 and 865, which are then returned to their normally closed position. Opening of the micro-switches 864 and 865 interrupts the circuit of the coil of the motor starter 1022, which then drops out, opening the circuit of timer motor 473, which then stops.

The micro-switch 742, held open by the timer when the pin grippers 465a and 465b are open, closes when those members move inward into closed position. The micro-switch 742 is connected in series with micro-switch 764 which normally is held closed by the corresponding pass-by pawl associated with the shift rod 706 of the sweep control mechanism previously described, when rod 706 is in its normal or neutral position. The micro-switch 742, when closed, closes the circuit of solenoid 734, which circuit may be traced as follows—from lead Ll, lead L742, micro-switch 742, lead L764, micro-switch 764, lead L734, solenoid 734 and lead LL734 to conductor LL. The solenoid 734 is thus energized and actuates the sweep clutch, thereby setting the sweep in operation, as previously described. When the sweep clutch is thrown in, the shift rod 706 is moved lengthwise into position releasing the micro-switch 764, which then opens and remains open until shift rod 706 is returned to its neutral position upon completion of the sweeping operation. Also, when the sweep clutch shift rod 706 is moved lengthwise incident to throwing in of the sweep clutch, the micro-switches 762 and 763, which are held closed by the corresponding pawls associated with the shift rod 706, in the normal neutral position of the latter, are released and then open. Opening of the micro-switch 763 deenergizes the solenoid 774, preparatory to latching plunger 778, now in its projected rearward position, in its forward position when again moved thereto. The relays 1018 and 1020 remain held in by their respective holding circuits, so that if the reset button were now pressed it would be ineffective for initiating an attempted resetting operation. That avoids possibility of confusion and is desirable for obvious reasons. Opening of the micro-switch 762 prevents an attempted deadwood operation, if the deadwood button 570 be inadvertently pressed while a deadwood operation is in progress, as will appear more fully later. Also, the micro-switch 765, which is held open in the normal position of shift rod 706, is closed when that rod is shifted lengthwise incident to throwing in the sweep clutch. Micro-switch 765 is connected in shunt with key switch 770, by a lead S765 from lead S, and a short lead SS765 to lead S1003. That guards against the possibility of interrupting the operation of the machine—either resetting or deadwood—after the sweep clutch has been initially thrown in, by inadvertent opening of the key switch 770.

When the timer is set in operation for closing the pin grippers 465a and 465b, the micro-switch 603 (Figure 58A), which at that time is open, momentarily closed by the timer. The micro-switch 603 is connected in series in the circuit of the solenoid 604 for throwing in the clutch for raising the pin setting table 283, which circuit includes the micro-switch 1023 and, when both of the micro-switches 1023 and 603 are closed, may be traced as follows—from lead Ll, lead L1023, micro-switch 1023, lead L603, micro-switch 603, lead L604, solenoid 604 and lead LL604 to conductor LL. As the sweep approaches the end of its stroke toward the pit end of the alley, it releases the table 283 which then travels downward by gravity. That releases the micro-switch 1023, which then closes, but at that time, the micro-switch 603, which was closed but momentarily by the timer, is open. The provision of the micro-switch 1023 in series with the micro-switch 603 thus guards against attempted throwing in of the table raising clutch while the table 283 is in its normal raised position.

The table 283 moves downward to its fully lowered or reset position, with the pins contacting the alley and still held loosely in the respective pairs of pin grippers 465a and 465b. During the downward travel of table 283, the sweep continues its rearward travel and momentarily closes the normally open micro-switch 746 (Figure 58A.) That closes a circuit through solenoid 734, which circuit may be traced as follows—from lead Ll, lead L746, microswitch 746, lead LL746 and lead L734 to conductor LL as previously traced. That throws in the sweep clutch for reversing the travel of the sweep, which then travels toward the front or post end of the alley. In the downward movement of table 283, the pusher is projected and discharges the pins and balls from the pit into the pit elevator, then in its lowered position. When the table is raised to its normal position, the pusher is returned, by the cushion, supplemented by gravity, to its normal forward retracted position.

In the forward travel of the sweep—the term "sweep" including the sweep members and associated parts at both sides of the alley—the normally open micro-switch 754 (Figure 58A) is momentarily closed. Closing of the micro-switch 754 closes circuits through the two solenoids 695. The circuit through one of the solenoids 695 may be traced as follows—from lead Ll, micro-switch 754, a portion of lead L695, solenoid 695, lead LL695, and a portion of lead LL392 to conductor LL. The circuit through the other solenoid 695 may be traced as follows—from micro-switch 754, the remainder of lead L695, solenoid 695 and lead LL695 to conductor LL. When the solenoids 695 are thus energized, the gates 684 (Figures 35 and 36) are released and are returned to their normal open position, as previously described. When the sweep members or sweeps reach their normal forward position, or approximately so, the pass-by pawl 753 on one of the sweep carriages 617 momentarily closes the normally open micro-switch 760 (Figure 58A) thereby closing a circuit through the solenoid 734, which circuit may be traced as follows—from lead Ll, lead L760, micro-switch 760 and lead L734 to conductor LL as previously traced. The solenoid 734 is thereby again energized and is then effective for throwing out the sweep clutch and returning the shift rod to neutral position, thus stopping the sweeps, which are then releasably held in their normal forward position, with the sweep blades disposed adjacent and substantially parallel with the separator strips, as previously described. With the sweeps in their normal forward position, the micro-switches 762, 763 and 764 are held closed, and the microswitch 765 is released and is then open, as explained above.

The return of the sweeps to their forward position, as described just above, occurs while the table 283 is traveling downward. When the table reaches its lowermost position, the microswitch 394 (Figure 58A) is closed by clamp 428 at the top of the dashpot tube 285, as has been explained. The micro-switch 394, when closed, closes a circuit through the solenoid 714, which circuit may be traced as follows—from lead L1, lead L394, micro-switch 394, lead L1022c and micro-switch 599 to conductor LL as previously traced. The solenoid is thus energized but is then ineffective since the plunger 718 has previously been released and returned to its normal rearward projected position. Closing of the micro-switch 394 also closes a circuit through the coil of the motor starter 1022, which circuit may be traced as follows—from micro-switch 394, lead L1022c, the coil of motor starter 1022, and lead LL1022 to conductor LL. The motor starter 1022 then closes, establishes its own holding circuit as before, micro-switches 864 and 865 being now closed, and also closes the circuit of the timer motor 473. The latter circuit may be traced substantially as before, except that the reversing micro-switches 862 and 863 are now open and the reversing micro-switches 860 and 861 are closed. Accordingly, the circuit of the starting field of motor 473 is now closed through lead L861, the micro-switches 861 and 860 and the associated reversing leads, lead LL860 and a portion of lead LL862 to conductor LL.

The motor 473 now drives the timer in proper direction for opening the pin grippers 465a and 465b, which then release the pins and leave them standing on the alley. In the opening of the pin grippers 465a and 465b the timer again momentarily closes the micro-switch 603. The micro-switch 1023 is now closed, having been released by the downward travel of table 283. Accordingly, when micro-switch 603 is closed, a circuit, previously traced, is closed through the solenoid 604 and the table raising clutch is thrown in. That occurs when the pin grippers 465a and 465b have been opened sufficiently to release and clear the pin. In the upward travel of table 283 the pin grippers continue to open and they are fully opened before the table reaches its normal raised position. In the opening of the pin grippers 465a and 465b, the reversing micro-switches 860 and 861 are opened, and the micro-switches 862 and 863 are closed, reversing the starting field of the timer motor 473. At about the same time as that occurs, the timer momentarily opens the micro-switches 864 and 865, opening the holding circuit of the motor starter 1022, which drops out and opens the circuit of timer motor 473 stopping the latter. Shortly thereafter, the table 283 reaches its full raised position, in which it is releasably supported in the manner previously described. In that manner, I assure that the pin gripping members 465a and 465b are in their full open position when the table 283 reaches its full raised position, thereby avoiding risk of damage to the pin buckets of the main pin receiving table by the pin gripping members, or damage to the latter by the buckets, in the raising of the pin setting table 283.

During the resetting operation, the micro-switch 622 is held open so long as the pin gripping members 465a and 465b are closed. As the table 283, in its down travel, reaches a position, which I term its deadwood position, somewhat above its fully lowered position, it momentarily moves the micro-switch 599 from its closed position shown (Figure 58A) to its other closed position in series with the micro-switch 622. Since the latter switch is then open, as noted, that has no effect on the motor starter 1022. Also, during the resetting operation, the micro-switch 638 is held closed by the timer when the pin gripping members 465a and 465b are closed, and is opened in the opening of those members. The micro-switch 638 is in series with the normally open micro-switch 613 mounted on the upright 304 (Figures 47 and 48). The micro-switch 613 is momentarily closed by the passby pawl 611, in the up travel of the table 283 from its lowermost or resetting position. Since the pin gripping members 465a and 465b are open in the up travel of the table 283, in the resetting operation, momentary closing of micro-switch 613 is then ineffective.

When the pin setting table 283 reaches its lowermost position, the normally open micro-switch 394a (Figure 58A) is closed by clamp 428, at the same time as the normally open micro-switch 394 is closed. The closing of micro-switch 394a closes a circuit through solenoid 392, which circuit may be traced as follows—lead L1, lead L394a, micro-switch 394a lead L392, solenoid 392, and lead LL392 to conductor LL. Solenoid 392 is then energized thereby throwing in the pit elevator clutch, and the pit elevator is raised to dumping position. As the pin elevator approaches full raised position, finger 400 (Figure 32) of hook 398 moves the micro-switch 393 (Figure 58) from its closed position shown to its other closed position. The micro-switch 393, when in its latter closed position, closes a circuit through solenoid 390, which circuit may be traced as follows—from lead L1, lead L393, micro-switch 393, lead LL393, lead L390, solenoid 390 and lead LL390 to conductor LL. The solenoid 390 is thus energized and throws out the pit elevator clutch, the pit elevator being then held in raised position, as previously described. The micro-switch 393, when in its last mentioned closed position, also closes a circuit through the reset coil 1024 of the sequence relay 1008, which circuit may be traced as follows— from micro-switch 393, lead LL393, coil 1024, lead LL1024, lead LL1017, lead LL1009, and lead LL1027 to conductor LL. When coil 1024 is thus energized, the sequence switch 1008 is restored to normal condition and all of the contact bars thereof are then open. That extinguishes the number one ball light 1009 or the number two ball light 1012, as the case may be, depending upon whether a strike or a spare has been made. The micro-switch 393, when it is moved to its position in which it closes the circuit of coil 1024, also opens the circuit of the coil of the relay 1018. This relay 1018 then drops out thereby extinguishing the "strike" lights, or the "spare" lights, as the case may be. That completes the resetting operation after a strike or a spare.

If neither a strike nor a spare is made, the sequence switch 1008 is actuated, as previously described, responsive to passage of the third ball down the alley. When that occurs the contact points 1008c of sequence switch 1008 are closed by the third contact bar of that switch, and the contact points 1008d are closed by the fourth contact bar thereof. Closing of the contact points 1008c establishes a circuit through the number three ball light 1017, which circuit may be traced as follows—from lead L1008a, contact points 1008c and the corresponding contact bar of switch 1008, lead L1017, light or lamp 1017, lead LL1017 and thence to conductor LL as previously traced. Closing of the contact points 1008d establishes a circuit through the coil of relay 1018, which circuit may be traced as follows—from lead LL763, lead L1008d, contact points 1008d and the corresponding contact bar of sequence switch 1008, lead LL1008d, lead L1018 and thence to conductor LL as previously traced. The coil of relay 1018 is thus energized and that relay closes, thereby initiating the resetting operation, which then progresses as above described. It will be seen that when a third ball is thrown or rolled down the alley, the machine automatically goes into the resetting operation, without necessity of pressing the reset button.

When the relay 1020 has once been closed, it remains in as long as the machine is in use, unless a deadwood operation is performed. Accordingly, the solenoid 358 remains energized and the pusher clutch remains engaged so long as the machine is in use, unless a deadwood operation is performed, in which latter case the solenoid 358 is temporarily deenergized and the pusher clutch is disengaged, as will appear more fully presently. Referring further to Figure 58A, when three pins have been fed forward along the forward feed roll units 80 (Figures 6 and 8) beyond the pin gate member, the micro-switch 189 is closed. When the micro-switch 189 is closed, it closes a circuit through solenoid 100, which circuit may be traced as follows—lead L1, lead L189, micro-switch 189, lead L100, solenoid 100, and lead LL100 to conductor LL. The solenoid 100 is thereby energized and the rearward sections 84 of the roll units 80 are moved to their rearward position, as previously described. When the pins of a full set have been properly disposed upon the two pairs of distributor rolls (Figure 15) 105 and 106 and 107 and 108, the two normally open micro-switches (Figure 58A) 225 and 227 are closed. Closing of the micro-switches 225 and 227 establishes a circuit through solenoid 228, which circuit may be traced as follows—lead L1, lead L225, micro-switch 225, lead L227, micro-switch 227, lead L228, solenoid 228 and lead LL228 to conductor LL. The solenoid 228 is then energized and throws in the clutch of the one revolution shaft 157 whereby the set of pins is dumped from the distributor rolls into the buckets of the pin receiving table, as has been previously described in detail.

In performing a deadwood operation, with the key switch 770 closed and the machine conditioned for use, as above described, the deadwood switch 570 is moved from its normal closed position shown (Figure 58) into its other or alternative closed position. In its latter closed position, deadwood switch 570 closes a circuit through the coil of relay 1021, which circuit may be traced as follows—from lead S1003, lead S570, deadwood switch 570, lead S1021, lead SS1021, and lead SS1005 to conductor SS as previously traced. The core of relay 1021 is thereby raised and the last or bottom contact bar thereof is moved to closed position and closes a circuit through solenoid 734, which circuit may be traced as follows—from lead L1, lead L762, micro-switch 762, lead L1021c, the bottom pair of contact points and the bottom contact bar of relay 1021, lead LL1021c, solenoid 734 and lead LL734 to conductor LL. That sets the sweep in operation, as has been explained. Also the next to the bottom contact bar of relay 1021 then establishes a circuit through solenoid 571, which circuit may be traced as follows—lead L1, lead L762, micro-switch 762, lead L1021c, the contact points and bar of relay 1021, lead L571, solenoid 571 and lead LL571 to conductor LL. The solenoid 571 is thus energized and the pin setting table 283 is thereby released for downward movement. When the contact bars of relay 1021 are raised or moved upward, the next to the top bar opens the holding circuit of the relay 1020, which then drops out and opens the circuit of solenoid 358 thereby disengaging the pusher clutch. That guards against operation of the pusher during the deadwood operation. Also, when the second bar of relay 1021 is raised the first or top bar of that relay is moved to raised position and extinguishes the foul lights 1025, 1026 and 1027, if illuminated at that time, as will appear more fully later.

The pin setting table 283 moves downward by gravity to its deadwood position, which is somewhat higher than its reset position, and is held there by the means previously described. As the table 283 reaches its deadwood position, the micro-switch 599 is moved, by pass-by pawl 396, from its closed position shown in the diagram to its alternative closed position, being then in series with the micro-switch 622 of the timer, which is now closed, since the pin gripping members 465a and 465b are open. Movement of the micro-switch 599 into its position just mentioned, energizes the motor starter 1022, which closes and establishes its own holding circuit through the micro-switches 864 and 865 which are now closed, these switches being normally closed and but momentarily opened by the timer, as has been explained. Closing of the motor starter 1022 closes the circuit of the motor 473 and sets the timer into operation, the starting field of this motor having previously been reversed by closing of the reversing micro-switches 862 and 863, as has been explained. That sets the motor 473 and the timer into operation for closing the pin gripping members 465a and 465b about the pins standing on the alley. The micro-switch 742 on the timer, held open when the pin gripping members are in open position, is permitted to close in the operation of the timer for closing the pin gripping members. The micro-switch 742 is connected in series with the micro-switch 764 which normally is held closed by the corresponding pawl associated with the shift rod 706 of the sweep control mechanism, as previously explained. Accordingly, closing of micro-switch 742 at this time is effective for energizing the solenoid 734 and initiating operation of the sweep means.

When the pin gripping members 465a and 465b start their movement in closing direction, the then closed micro-switch 622 (Figure 58A) is opened by the timer and is thereafter held open during the closing of the pin gripping members and while such members remain closed. As the pin gripping members reach their fully closed position about the pins then standing on the alley, the timer momentarily opens the normally closed micro-switches 864 and 865, thereby de-energizing the motor starter 1022, which drops out and stops the motor 473. It will be recalled that the micro-switch 622 is now held in its open position by the timer, so that when the motor starter 1022 opens there is no risk of restarting of the motor after the micro-switches 864 and 865 have been momentarily opened and then closed, as described. At about the same time that the micro-switches 864 and 865 are momentarily opened, the micro-switch 603, now open, is momentarily closed by the timer, it being remembered that the micro-switch 1023 is now closed. That energizes the solenoid 604, thus throwing in the table raising clutch and raising the table 283 a short distance above its intermediate position. As the table 283 reaches this latter position, the normally open micro-switch 613 is closed by the pass-by pawl 611. That energizes the solenoid 614, which throws out the clutch for raising the table 283, which then descends a short distance to its intermediate position, in which it is held in the manner previously stated. The circuit of solenoid 614, when energized, may be traced as follows—lead L1, lead L638, micro-switch 638, lead L613, micro-switch 613, lead L614, solenoid 614 and lead LL614 to conductor LL. The micro-switch 613 is connected in series with the micro-switch 638 on the timer, this latter switch being closed when the pin gripping members are closed and open when those members are open. Accordingly, in the deadwood operation, when the pin gripping members are closed about the pins in the deadwood position of table 283, closing of the micro-switch 613 will energize solenoid 614, as and for the reasons stated, but will be ineffective for energizing the solenoid 614 in the resetting operation, since in the latter operation the pin gripping members are open during the upward movement of table 283.

If, for any reason, the clutch for raising the table 283 is not thrown out by closing of the micro-switch 613, the pass-by pawl 611 will close a normally open micro-switch 639, when table 283 passes a short distance upward beyond the position to which it should be raised in the deadwood operation. Since the micro-switch 638 is then closed, closing of the micro-switch 639, which is in series with the micro-switch 638, energizes the coil of motor starter 640 opening the latter, and thus stopping the main motor 149. That stops operation of the machine before damage occurs. Assuming that the machine operates in its intended manner, the pin setting table 283 is now supported in its intermediate position, as above noted. The sweep means, properly timed to that end, now passes rearward beneath the table 283, sweeps the alley and then releases the table 283 for downward movement into its deadwood position, in which the pins seat upon the alley, as has been explained. Closing of the micro-switch 613 also establishes a circuit through the coil of a relay 1028, which circuit may be traced as follows—from micro-switch 613, lead L1028c, the lower contact bar of relay 1028, the coil of relay 1028 and lead LL1028 to conductor LL. The relay 1028 is a holding relay and when it is closed its lower bar closes a holding circuit therefor, which circuit may be traced as follows—from micro-switch 638, lead L1028b, the lower contact bar of relay 1028 to the coil thereof and thence to conductor LL as before. The upper bar of relay 1028, when closed, closes a circuit to one side of the micro-switch 599, which at this time occupies its position shown in the diagram. When the table moves down to its deadwood position, just referred to, the micro-switch 599 is moved from its closed position of the diagram to its alternative closed position. That closes a circuit through the coil of motor starter 1022, traced as follows—from lead L1, lead L622, micro-switch 622, lead L599, micro-switch 599 and thence to conductor LL as previously traced. The motor starter 1022 is thereby closed setting into operation the motor 473 and the timer driven thereby, in the manner previously described. When the motor starter 1022 is actuated for closing the circuit of motor 473, it establishes its own holding circuit, as has been explained above. The pin gripping members are then opened and leave the pins sitting upon the alley in precisely the same position which they occupied before they were picked up in the deadwood operation.

When the pin grippers 465a and 465b have been opened about halfway, the micro-switch 603 on the timer is momentarily closed by the latter, the micro-switch 1023 adjacent the top of the tube 285 being then still closed. That energizes the solenoid 604, effective for throwing in the clutch for raising the table 283, as previously explained. In the operation of the timer for opening the pin gripping members, the then closed micro-switch 638 is opened. That opens the holding circuit of the relay 1028, which then drops out. The holding circuit of the motor starter 1022 is then closed through micro-switches 864 and 865, and the motor starter 1022 remains in. As the table 283 moves upward a short distance beyond its intermediate position, the micro-switch 613 is closed, as stated previously. Since the micro-switch 638 is then open, closing of switch 613 has no effect on the solenoid 614. In the upward travel of table 283, the micro-switch 599 is returned to its closed position shown. Also, the micro-switch 622 is closed by the timer, in the opening of the pin grippers, and the micro-switches 862 and 863 are closed and the micro-switches 860 and 861 are opened, as the pin grippers reach full open position, thereby reversing the starting field of motor 473, and the micro-switches 864 and 865 are then opened stopping the motor 473. The table 283 is then supported in raised position, with the pin grippers fully open, and the machine is conditioned for a succeeding operation—either resetting or deadwood—as above described. In the deadwood operation the sweep is operated in the same manner as in the resetting operation, and further description thereof here is unnecessary.

As the sweep travels rearward, in the deadwood operation, the normally open micro-switch 744 is momentarily closed by pass-by pawl 743 on the sweep carriage 617. If at that time the table 283 is in its deadwood position, the normally open micro-switch 745 is held closed so that, when the sweep closes the normally open micro-switch 744, the motor starter 640 will be energized thus stopping the main motor 149. The energizing circuit of the motor starter 640 may then be traced as follows—from lead L1, lead L745, micro-switch 745, lead L744, micro-switch 744, lead LL744, the coil of motor starter 640 and lead LL769 to conductor LL. That guards against injury to either the sweep or the pin setting table 283 and the parts carried thereby if for any reason the table 283 is not raised in good time from its deadwood position.

When the pins of a complete set are properly disposed on the distributor rolls, the microswitches 225 and 227 are closed and shaft 157 turns through one complete revolution, as previously explained. That momentarily opens the micro-switch 771 thus opening the holding circuit of the relay 1019, which then drops out. The resetting of the distributor rolls interlock also closes the then open micro-switch 772, so that the reset circuit may then be energized for a resetting operation.

In the event of a foul, the foul line switch 836 (Figure 58) is closed energizing relay 1029, the energizing circuit of which may be traced as follows—from lead S1003, foul line switch 836, lead S1029, the lower contact points and bar of relay 1029, the coil of relay 1029, lead SS1029, and lead SS1002 to lead SS and the secondary of transformer T. This relay 1029, when closed, establishes its own holding circuit which may be traced as follows—lead S1003, lead S579, the top contact points and bar of relay 1021, then in its position shown, lead SS1021a, the center contact points and the lower contact bar of relay 1029, and the coil of relay 1029 to the secondary of transformer T as previously traced. Also, the upper bar of relay 1029 closes the circuit of the foul lights 1025, 1026, and 1027, which circuit may be traced as follows—from lead L1, lead L1029, the top contact points and bar of relay 1029, lead LL1029, lamps 1025, 1026 and 1027, and lead LL1027 to conductor LL. Closing of the foul line switch 836 also energizes a relay 1030, provided a manually operated foul barrier switch 1031 is then closed. The energizing circuit of relay 1030 may be traced as follows—from lead S1029, lead S1031, switch 1031, the coil of relay 1030, and lead SS1002 to the secondary of the transformer T as previously traced. Closing of the relay 1030 energizes solenoid 796 thus releasing the foul barrier which drops into its operative position, as has been explained. The enerative circuit of the solenoid 796 may be traced as follows—from conductor L, lead L1002, the lower contact points and bar of relay 1002, then in, lead L796, the contact points and bar of relay 1030, lead LL1030, solenoid 796 and lead LL796 to conductor LL. When the foul barrier drops, the normally closed micro-switch 820 opens so as to prevent energizing of the resetting circuit, as has been explained previously. In order to return the foul barrier to its normal raised position, a deadwood operation is performed, as previously explained. When the deadwood button 570 is pressed, the relay 1021 is energized, as explained above, and the top bar of that relay opens the holding circuit of the relay 1029, which then drops out, thus opening the circuit of the foul lights 1025, 1026 and 1027, thereby extinguishing them. If it is desired to bowl without using the foul barrier, the manually operated foul barrier cut-out switch 1031 is opened. With that switch open, the foul barrier structure will not be released when a player's foot crosses the foul line, but the foul lights 1025, 1026, and 1027 will be illuminated. The machine is then operated in the manner previously described, except that the foul barrier is not used.

It will be understood that numerous changes in detail may be made without departing from the field and scope of my invention, and I intend to include all such variations, as fall within the scope of the appended claims, in this application in which the preferred form only of my invention has been disclosed.

I claim:

1. In a pin setting machine for bowling alleys, a pair of spaced parallel pin distributor rolls and means thereon for distributing pins therealong in predetermined spaced relation, said rolls normally being disposed substantially horizontally for reception of pins delivered thereto from above and being mounted to swing about a substantially horizontal axis for dumping the pins therefrom, means for delivering pins to said rolls, a table comprising pin receiving members disposed for reception of pins dumped from said rolls, and means for swinging said rolls from pin receiving position to pin dumping position.

2. In a pin setting machine for bowling alleys, a pair of spaced parallel pin distributor rolls having spaced pin retaining areas and means therebetween for moving pins along said rolls into said areas, said rolls normally being disposed substantially horizontally for reception of pins delivered thereto from above and being mounted to swing about a substantially horizontal axis for dumping the pins therefrom, means for delivering pins to said rolls, a table comprising pin receiving members, pin chutes respectively aligned with said pin retaining areas leading to the respective pin receiving members, and means for swinging said rolls from pin receiving position to pin dumping position effective for dumping the pins into said chutes.

3. In a pin setting machine for bowling alleys, a plurality of spaced parallel pin distributor units each comprising a pair of spaced parallel distributor rolls having spaced pin retaining areas and means therebetween for moving pins along said rolls into said areas, the respective units being normally disposed substantially horizontally for reception of pins delivered thereto from above and being mounted to swing about a substantially horizontal axis for dumping the pins therefrom, means for delivering to said units successively pins corresponding in number to the pin retaining areas of the respective units, a table comprising pin receiving members, pin chutes respectively aligned with said pin retaining areas leading to the respective pin receiving members, and means for swinging said rolls from pin receiving position to pin dumping position effective for dumping the pins into said chutes.

4. In a pin setting machine for bowling alleys, a plurality of spaced parallel pin distributor units each comprising a pair of spaced parallel distributor rolls having spaced pin retaining areas and means therebetween for moving pins along said rolls into said areas, the pin retaining areas of said unit corresponding in number to the number of pins in a set, the respective units being normally disposed substantially horizontally for reception of pins delivered thereto from above and being mounted to swing about a substantially horizontal axis for dumping the pins therefrom, means for delivering to said units successively pins corresponding in number to the pin retaining areas of the respective units, a table comprising pin receiving members, pin chutes respectively aligned with said pin retaining areas leading to the respective pin receiving members, normally ineffective power means for swinging said units from pin receiving position to pin dumping position, and control means connected to said power means and actuated by the pins at one end of all of said units when a complete set of pins is on said units, said control means when actuated by said end pins rendering said power means effective.

5. In a pin setting machine for bowling alleys, a plurality of spaced parallel pin distributor units each comprising a pair of spaced parallel distributor rolls having spaced pin retaining areas and means for moving pins therealong into said areas, the pin retaining areas of said units corresponding in number to the number of pins in a set, the respective units being normally disposed substantially horizontally for reception of pins delivered thereto from above and being mounted to swing about a substantially horizontal axis for dumping the pins therefrom, means for delivering to said units successively pins corresponding in number to the pin retaining areas of the respective units, a table comprising pin receiving and retaining structures disposed to receive pins dumped from said units, means for delivering to said structures pins dumped from said units, normally ineffective power means for swinging said units from pin receiving position to pin dumping position, and normally open switches adjacent one end of all of said units disposed to be closed by the adjacent end pins on said units and effective when closed for rendering said power means effective.

6. In a pin setting machine for bowling alleys, a pair of spaced parallel pin distributor units each comprising a pair of spaced parallel distributor rolls having spaced pin retaining areas and means for moving pins therealong into said areas successively, the pin retaining areas of said units corresponding in number to the number of pins in a set, the respective units being normally disposed substantially horizontally for reception of pins delivered thereto from above and being mounted to swing about a substantially horizontal axis for dumping the pins therefrom, means for delivering to said units successively pins corresponding in number to the pin retaining areas of the respective units, said delivering means comprising a pair of spaced parallel helically grooved pin feed rolls substantially perpendicular to and overlying said distributor rolls of said units adjacent one end thereof, said feed rolls having therebetween pin delivery openings respectively overlying said adjacent ends of said distributor units, a table comprising pin receiving and retaining structures disposed to receive pins dumped from said units, normally ineffective power means for swinging said units from pin receiving position to pin dumping position, and means actuated by the end pin at one end of said distributor units when all of the pin retaining areas thereof are occupied by pins and effective for rendering said power means effective.

7. In a pin setting machine for bowling alleys, a frame substantially rectangular in plan having a front and a back and sides, a pair of spaced parallel helically grooved pin cross feed rolls having adjacent one end a pin delivery opening therebetween, a pair of spaced parallel pin distributor units substantially parallel with said rolls each comprising a pair of spaced parallel distributor rolls having spaced pin retaining areas and means for moving pins therealong into said areas successively, the respective units being normally disposed substantially horizontally for reception of pins delivered thereto from above and mounted to swing about a substantially horizontal axis for dumping the pins therefrom, means for delivering to said units successively pins corresponding in number to the pin retaining areas of the respective units, said delivering means comprising a pair of spaced parallel helically grooved pin forward feed rolls underlying said pin delivery opening and extending forward therefrom with their forward end portions overlying said units adjacent one end thereof, said feed rolls having therebetween openings overlying said units for delivery of pins thereto, a table comprising pin receiving and retaining structures disposed to receive pins dumped from said units, and means for swinging said units from pin receiving position to pin dumping position.

8. In a pin setting machine for bowling alleys, a frame substantially rectangular in plan having a front and a back and sides, a pair of spaced parallel helically grooved pin cross feed rolls having adjacent one end a pin delivery opening therebetween, a pair of spaced parallel pin distributor units substantially parallel with said rolls each comprising a pair of spaced parallel distributor rolls having spaced pin retaining areas and means for moving pins therealong into said areas successively, the respective units being normally disposed substantially horizontally for reception of pins delivered thereto from above and mounted to swing about a substantially horizontal axis for dumping the pins therefrom, a pair of spaced parallel helically grooved pin forward feed rolls underlying said pin delivery opening and extending forward therefrom with their forward end portions overlying said units adjacent one end thereof, each of said forward feed rolls comprising a first section restrained against endwise movement and a second section rotatable with said first section normally in close endwise proximity thereto providing an effective continuation thereof and movable endwise away from said first section to a position providing a gap between the adjacent ends of said sections, said first sections having aligned areas of reduced effective diameter providing a first pin delivery opening therebetween overlying one of said units, and the gaps between said sections, when said second sections are moved away from said first sections, being aligned and providing a second pin delivery opening overlying the other of said units, means for moving said second sections of said forward feed shafts away from said first sections when pins corresponding in number to the pin retaining areas of said one unit have traveled along said forward feed rolls beyond said adjacent ends of said sections thereof, means for thereafter blocking travel of pins to said second delivery opening when pins corresponding in number to the pin retaining areas of said other unit have traveled along said forward feed rolls to said second opening, a table comprising pin receiving and retaining structures disposed to receive pins dumped from said units, and means controlled by the end pins on said units at one end thereof for swinging the latter from pin receiving position to pin dumping position.

9. In a pin setting machine for bowling alleys, a frame substantially rectangular in plan having a front and a back and sides, a pair of forwardly extending spaced parallel helically grooved pin feed rolls each comprising a forward section restrained against endwise movement and a rearward section rotatable with said forward section normally in close endwise proximity thereto providing an effective continuation thereof and movable endwise away from said forward section into position providing a gap between the adjacent ends of said sections, said forward sections having aligned areas of reduced effective diameter providing therebetween a forward pin delivery opening, the gaps in said rolls, when the rearward sections thereof are in their rearward position, being aligned and providing a rearward pin delivery opening between said rolls, forward and rearward pin distributor units respectively underlying at one end portion thereof said forward opening and said rearward opening, each of said units comprising a pair of spaced parallel rolls having spaced pin retaining areas and means for moving pins therealong from said one end thereof into said areas successively, the respective units being normally disposed substantially horizontally for reception of pins delivered thereto from above and mounted to swing about a substantially horizontal axis for dumping the pins therefrom, means for moving said rearward sections of said rolls to rearward position when pins corresponding in number to the retaining areas of said forward unit have traveled along said rolls beyond said adjacent ends of said sections thereof, means for thereafter blocking travel of pins to said rearward delivery opening when pins corresponding in number to the pin retaining areas of said rearward unit have traveled along said rolls to said rearward opening, a table comprising pin receiving and retaining structures disposed to receive pins dumped from said units, and means controlled by the end pins on said units at one end thereof for swinging the latter from pin receiving position to pin dumping position.

10. In a pin setting machine for bowling alleys, a frame substantially rectangular in plan having a front and a back and sides, a pair of parallel pin feed rolls each comprising a forward section and a rearward section rotatable with said forward section normally in close endwise proximity thereto providing an effective continuation thereof and movable endwise away from said forward section into position providing a gap between the adjacent ends of said sections, said forward sections having aligned areas of reduced effective diameter providing therebetween a forward pin delivery opening and said gaps, when said rearward sections are in their rearward position, being aligned and providing a rearward pin delivery opening, forward and rearward pin distributor units respectively underlying at one end said pin delivery openings each comprising spaced pin retaining areas and means for propelling pins therealong from said one end thereof into said areas successively, said units being normally disposed substantially horizontally for reception of pins delivered thereto from above and mounted to swing about a substantially horizontal axis for dumping the pins therefrom, means for moving said rearward sections of said rolls to rearward position when pins corresponding in number to the retaining areas of said forward unit have traveled along said rolls beyond said adjacent ends of said sections thereof, means for thereafter blocking travel of pins to said rearward delivery opening when pins corresponding in number to the pin retaining areas of said rearward unit have traveled along said rolls to said rearward opening, a table comprising pin receiving and retaining structures disposed to receive pins dumped from said units, and means controlled by the end pins on said units at one end thereof for swinging the latter from pin receiving position to pin dumping position.

11. In a pin setting machine for bowling alleys, a frame substantially rectangular in plan having a front and a back and sides, a pair of pin feed rolls each comprising a forward section and a rearward section rotatable with said forward section normally in close endwise proximity thereto providing an effective continuation thereof and movable endwise away from said forward section into position providing a gap between the adjacent ends of said sections, said forward sections having aligned areas of reduced effective diameter providing therebetween a forward pin delivery opening and said gaps, when said rearward sections are in their rearward position, being aligned and providing a rearward pin delivery opening, forward and rearward pin receiving and distributor units respectively underlying at one end said delivery openings normally in pin receiving position and movable therefrom to pin dumping position each adapted to support a plurality of pins in predetermined spaced relation and the total number of pins supported by said units corresponding to a set of ten pins, a rotatably mounted gate member adjacent the rearward ends of said forward sections of said rolls having elements extending across the path of travel of pins along said rolls to said openings whereby said gate member is rotated by such pins, means actuated by said gate member for moving the rearward sections of said rolls to rearward position when pins corresponding in number to the pins supported by said forward unit have passed through said gate member, means for locking said gate member against rotation when a further number of pins corresponding to the number of pins supported by said rearward unit have passed through said gate member, a table comprising pin receiving and retaining structures disposed to receive pins dumped from said units, and means controlled by the end pins on said units at one end thereof for moving the latter from pin receiving to pin dumping position, when a complete set of pins has been delivered to and distributed on both of said units, and returning said rearward roll sections to forward position and releasing said gate member.

12. In a pin setting machine for bowling alleys, a pair of pin feed rolls each comprising a first section and a second section rotatable with said first section normally in close endwise proximity thereto providing an effective continuation thereof and movable endwise away from said first section into position providing a gap between said sections, said first sections having aligned areas of reduced effective diameter providing therebetween a first pin delivery opening and said gaps, when said second sections are moved away from said first sections, being aligned and providing a second pin delivery opening, pin receiving and dumping means underlying said pin delivery openings, a rotatably mounted gate member adjacent the inner ends of said first sections of said rolls having elements extending across the path of travel of pins along said rolls to said openings whereby said gate member is rotated by such pins, means actuated by said gate member for moving said second sections of said rolls away from said first sections when a predetermined number of pins have passed through said gate member to said first delivery opening, means for locking said gate member against rotation when a further predetermined number of pins have passed therethrough to said second delivery opening, and means controlled by pins on said receiving and dumping means for dumping the pins therefrom and returning said second roll sections to normal position and releasing said gate member.

13. In a pin setting machine for bowling alleys, a pair of pin feed rolls each comprising a first section and a second section rotatable with said first section normally in close endwise proximity thereto providing an effective continuation thereof and movable endwise away from said first section into position providing a gap between said sections, said first sections having aligned areas of reduced effective diameter providing therebetween a first pin delivery opening and said gaps, when said second sections are moved away from said first sections, being aligned and providing a second pin delivery opening, a rotatably mounted gate member adjacent the inner end of said first sections of said rolls having elements intercepting the path of travel of pins along said rolls to said openings whereby said gate member is rotated by such pins, means actuated by said gate member for moving said second sections of said rolls away from said first sections when a predetermined number of pins have passed through said gate member to said first delivery opening, means for locking said gate member against rotation when a further predetermined number of pins have passed therethrough to said second delivery opening, and means for returning said second roll sections to normal position and releasing said gate member.

14. In a pin setting machine for bowling alleys, a pair of spaced parallel helically grooved pin feed rolls each comprising a first section and a second section rotatable with said first section normally in an inner position in close endwise proximity thereto providing an effective continuation thereof and movable endwise away from said first section to an outer position providing a gap between said sections, said first sections having aligned areas of reduced effective diameter providing therebetween a first pin delivery opening and said gaps, when said second sections are in their outer position, being aligned and providing a second pin delivery opening, first and second pin straightening deflectors respectively disposed adjacent said openings, said first deflector being disposed for contact by pins entering said first opening and effective for positioning such pins substantialy perpendicular to said rolls, said second deflector being normally in inoperative position disposed to clear pins passing along said rolls to said first opening, pin actuated means for moving said second sections to outer position and said second deflector into operative position to be contacted by pins entering said second opening and effective for positioning such pins substantially perpendicular to said rolls, when a predetermined number of pins have traveled along said rolls beyond the adjacent ends of said sections thereof to said first opening, means for blocking travel of pins to said second opening when a further predetermined number of pins have traveled to the latter opening, and means for returning said second sections of said rolls to their inner position and said second deflector to its inoperative position.

15. In a pin setting machine for bowling alleys, a pin receiving and distributor unit comprising a pair of rotatably mounted spaced parallel rolls having interrupted helical threads providing unthreaded spaced pin retaining areas and threaded areas therebetween cooperating for propelling pins along said rolls and disposing the pins in said pin receiving areas and spaced apart lengthwise of said rolls, the latter normally being in pin receiving position and movable therefrom to pin dumping position, and means for moving said unit to pin dumping position and returning it to pin receiving position.

16. In a pin setting machine for bowling alleys, a plurality of parallel pin receiving and distributor units each comprising a pair of rotatably mounted spaced parallel rolls having interrupted helical threads providing unthreaded spaced pin retaining areas and threaded areas therebetween cooperating for propelling pins along said rolls and disposing the pins in said pin receiving areas and spaced apart lengthwise of said rolls, said units normally being in pin receiving position and movable therefrom to pin dumping position, and means controlled by the end pins at one end of all said units for moving said units to pin dumping position when all of said pin retaining areas of said units are occupied by pins and returning them to pin receiving position.

KENNETH C. SHERMAN.

References Cited in the file of this patent
UNITED STATES PATENTS

| Number | Name | Date |
|---|---|---|
| 1,059,211 | Rishebegar et al. | Apr. 15, 1913 |
| 1,153,689 | Hobbs | Sept. 14, 1915 |
| 1,190,646 | Hedenskoog | July 11, 1916 |
| 1,302,897 | Butler | May 6, 1919 |
| 1,573,643 | Proch | Feb. 16, 1926 |
| 1,784,084 | Williams | Dec. 9, 1930 |
| 1,911,436 | Cone | May 30, 1933 |
| 1,994,411 | Thomas | Mar. 12, 1935 |
| 2,014,306 | Barker | Sept. 10, 1935 |
| 2,231,473 | Kaufman | Feb. 11, 1941 |
| 2,250,503 | Rundell | July 29, 1941 |
| 2,346,189 | Schmidt | Apr. 11, 1944 |
| 2,353,189 | Rundell | July 11, 1944 |
| 2,361,233 | Parra et al. | Oct. 24, 1944 |
| 2,383,017 | Rundell | Aug. 21, 1945 |
| 2,388,708 | Bates | Nov. 13, 1945 |
| 2,388,709 | Rundell | Nov. 13, 1945 |
| 2,389,643 | Schmidt | Nov. 27, 1945 |
| 2,450,249 | Murphy | Sept. 28, 1948 |